(12) United States Patent
Oguz et al.

(10) Patent No.: US 6,771,703 B1
(45) Date of Patent: Aug. 3, 2004

(54) EFFICIENT SCALING OF NONSCALABLE MPEG-2 VIDEO

(75) Inventors: Seyfullah H. Oguz, Framingham, MA (US); Sorin Faibish, Newton, MA (US); Wayne W. Duso, Shrewsbury, MA (US)

(73) Assignee: EMC Corporation, Hopkinton, MA (US)

( * ) Notice: Subject to any disclaimer, the term of this patent is extended or adjusted under 35 U.S.C. 154(b) by 859 days.

(21) Appl. No.: 09/608,050

(22) Filed: Jun. 30, 2000

(51) Int. Cl.⁷ .................................................. H04N 7/12

(52) U.S. Cl. .................................................. 375/240.03

(58) Field of Search ...................... 375/240.03, 240.04, 375/240.05, 240.13, 240.2, 240.23, 240.16, 240.24, 240.28; 348/699, 700, 845.3; 382/236, 238, 248; H04N 7/12

(56) References Cited

U.S. PATENT DOCUMENTS

| | | | |
|---|---|---|---|
| 5,231,484 A | | 7/1993 | Gonzales et al. |
| 5,231,487 A | * | 7/1993 | Hurley et al. ........... 375/240.01 |
| 5,534,944 A | | 7/1996 | Egawa et al. |
| 5,675,384 A | | 10/1997 | Ramamurthy et al. |
| 5,691,770 A | * | 11/1997 | Keesman et al. ....... 375/240.04 |
| 5,812,778 A | * | 9/1998 | Peters et al. ................... 725/86 |
| 5,838,678 A | | 11/1998 | Davis et al. |
| 5,859,660 A | | 1/1999 | Perkins et al. |
| 5,892,548 A | * | 4/1999 | Kim ........................ 375/240.04 |
| 5,892,915 A | | 4/1999 | Duso et al. |
| 5,959,690 A | | 9/1999 | Toebes, VIII et al. |
| 6,141,358 A | * | 10/2000 | Hurst et al. ................... 370/543 |
| 6,154,496 A | * | 11/2000 | Radha .................... 375/240.28 |
| 6,263,021 B1 | * | 7/2001 | Sethuraman et al. ... 375/240.03 |
| 6,480,547 B1 | * | 11/2002 | Chen et al. ............. 375/240.27 |

OTHER PUBLICATIONS

Boon–Lock Yeo, "On fast microscopic browsing of MPEG–compressed video," IBM T.J. Watson Research Center, Jan. 1998, Multimedia Systems 7, 1999, pp. 269–281.

Robert Mokry and Dimitris Anastassiou, "Minimal Error Drift in Frequency Scalability for Motion–Compensated DCT Coding," IEEE Transactions On Circuits And Systems For Video Technology, vol. 4, No. 4, Aug. 1994, pp. 392–406.

C. Ward, C. Pecota, X. Lee, and G. Hughes, "Seamless Splicing for MPEG–2 Transport Stream Video Servers, "SMPTE Journal, Dec. 1999, pp. 873–879.

Norm Hurst and Katie Cornog, "MPEG Splicing: A New Standard for Television—SMPTE 312M," SMPTE Journal, Nov. 1998, pp. 978–988.

(List continued on next page.)

*Primary Examiner*—Nhon Diep
(74) *Attorney, Agent, or Firm*—Howrey Simon Arnold & White LLP

(57) ABSTRACT

To reduce bandwidth of non-scalable MPEG-2 coded video, certain non-zero AC DCT coefficients for the 8×8 blocks are removed from the MPEG-2 coded video. In one implementation, high-frequency AC DCT coefficients are removed at the end of the coefficient scan order. This method requires the least computation and is most desirable if the reduced-bandwidth video is to be spatially sub-sampled. In another implementation, the smallest-magnitude AC DCT coefficients are removed. This method may produce an undesirable increase in the frequency of occurrence of escape sequences in the (run, level) coding. This frequency can be reduced by retaining certain non-zero AC DCT coefficients that are not the largest magnitude coefficients, and by increasing a quantization scale to reduce the coefficient levels. The reduced-bandwidth video can be used for a variety of applications, such as browsing for search and play-list generation, bit stream scaling for splicing, and bit-rate adjustment for services with limited resources and for multiplexing of transport streams.

21 Claims, 24 Drawing Sheets

OTHER PUBLICATIONS

Norm Hurst and Katie Cornog, "Splicing FAQ," http://www.mpeg.org/MPEG/splicing–FAW.html, 8 pages, published at least as early as Oct. 13, 1999.

SMPTE 312M–1999, SMPTE Standard for Television, "Splice Points for MPEG–2 Transport Streams," Approved April 8,1999, The Society Of Motion Picture And Television Engineers, White Plains, NY 20 pages.

"The Shape of MPEG," DV Magazine, vol. 4, No. 12, Dec. 1996, http://livedv.com/Mag/Dec96/Contents/mpeg/mpeg.html, 5 pages, published at least as early as Oct. 13, 1999.

"A Guide to MPEG Fundamentals and Protocol Analysis (Including DVB and ATSC)," Tektronix, Inc., Beaverton, Oregon, 1997, pp. 48 pages.

Leonardo Chiariglione, "MPEG and multimedia communications," CSELT, Torino Italy, http://www.cselt.stet.it/ufv/leonardo/paper/isce96.htm, 50 pages, published at least as early as Oct. 13, 1999.

Barry G. Haskell, Atul Puri, and Arun N. Netravali, *MPEG–2 Video Coding and Compression*, Chp. 8, pp. 156–182, and "Interactive Television," Chp. 13, pp. 292–306, Digital Video: An Introduction To MPEG–2, Chapman & Hall, New York, NY, 1997.

"MPEG–2: The basics of how it works," Hewlett Packard, published at least as early as Oct. 31, 1999, 17 pages.

Anil K. Jain, *Fundamentals of Digital Image Processing*, Prentice Hall, Inc., Englewood Cliffs, New Jersey, 1989, Chapter 4: Image Sampling and Quantization and Chapter 5: Image Transforms, pp. 80–188.

"Information technology—Generic coding of moving pictures and associated audio information: Systems," International Standard, ISO/IEC 13818–1:1996(E), 136 pages.

"Information technology—Generic coding of moving pictures and associated audio information: Video," International Standard, ISO/IEC 13818–3:1996(E), 211 pages.

"Information technology—Generic coding of moving pictures and associated audio information—Part 3: Audio," International Standard, ISO/IEC 13818–3:1995(E), 118 pages.

Jerry D. Gibson, Toby Berger, Tom Lookabaugh, Dave Lindbergh, and Richard L. Baker, *Digital Compression for Multimedia: Principles and Standards*, Morgan Kaufmann Publishers, Inc., San Francisco, CA, 1998, Chapter 9: JPEG Still–Image Compression Standard, pp.291–308, and Chapter 11: MPEG Compression, pp. 363–417.

Barry G. Haskell, Atul Puri, and Arun N. Netravali, Digital Video: An Introduction to MPEG–2, Chapman & Hall, New York, NY, 1997, pp. 1–279, 292–306, 369–421.

Y. Nakajima, H. Hori, and T. Kanoh, "Rate Conversion of MPEG Coded Video by Requantization Process," IEEE Proc. of ICIP–95, vol. III, Sept. 1995, pp. 408–411.

A.T. Erden and M.I. Sezan, "Multi–generation Characteristics of the MPEG Video Compression Standards," IEEE Proc. of ICIP–94, vol. II, 1994, pp. 933–937.

M. Perreira, and A. Lippman, "Re–codable video," IEEE Proc. of ICIP–94, vol. II, 1994, pp. 952–956.

M. Mohsenian, R. Rajagopalan, and C.A. Gonzales, "Single–pass constant–and variable–bit–rate MPEG–2 video compression," IBM J. Res. Develop., vol. 43, No. 4, Jul. 1999, pp. 489–509.

P.H. Westerink, R. Rajagopalan, and C.A. Gonzales, "Two-pass MPEG–2 variable–bit–rate encoding," IBM J. Res. Develop., vol. 43, No. 4, Jul. 1999, pp. 471–488.

Jill Boyce, John Henderson, and Larry Pearlstein, "An SDTV Decoder with HDTV Capability: An All–Format ATV Decoder," Hitachi America Ltd., *file://C:Fatima\67.gif*, pp. 67–75, published at least as early as Jan. 12, 2000.

*Encyclopedia of Computer Science*, Third Edition, International Thomson Computer Press, New York, N.Y., 1995, p. 235, 553–555, 1185–1191, 1249–1263.

\* cited by examiner

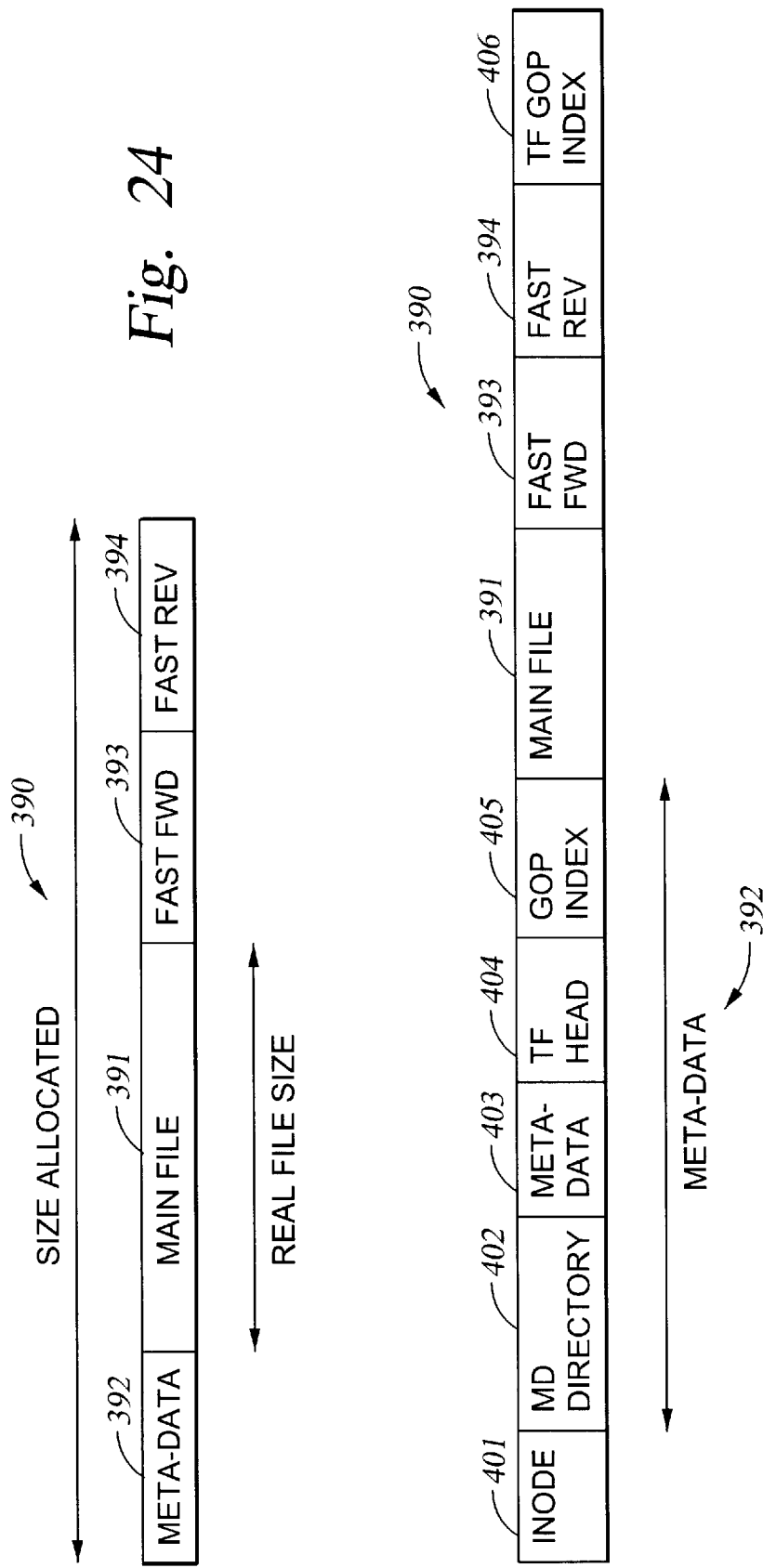

1- Play from start 1 sec
2- Pause
3- Fast Forward to 29 min
4- Pause
5- Play 1 sec
6- Pause
7- Fast Reverse to 1 sec
8- Pause
9- Play Normal

|  | READ | WRITE |
|---|---|---|
| COPY OF THE ASSET WITH ALL THE DATA | EMPEG2 | EMPEG2 |
| COPY ONLY THE MAIN ASSET | RAW | MPEG2 |
| ARCHIVE | EMPEG2 | EMPEG2 |
| PLAY | MPEG2 |  |
| RECORD |  | MPEG2 |

EFFICIENT SCALING OF NONSCALABLE MPEG-2 VIDEO

BACKGROUND OF THE INVENTION

1. Field of the Invention

The present invention relates to processing of compressed visual data, and in particular the processing of compressed visual data in order to reduce data storage requirements or data transmission bandwidth at the expense of decreased quality.

2. Background Art

It has become common practice to compress audio/visual data in order to reduce the capacity and bandwidth requirements for storage and transmission. One of the most popular audio/video compression techniques is MPEG. MPEG is an acronym for the Moving Picture Experts Group, which was set up by the International Standards Organization (ISO) to work on compression. MPEG provides a number of different variations (MPEG-1, MPEG-2, etc.) to suit different bandwidth and quality constraints. MPEG-2, for example, is especially suited to the storage and transmission of broadcast quality television programs.

For the video data, MPEG provides a high degree of compression (up to 200:1) by encoding 8×8 blocks of pixels into a set of discrete cosine transform (DCT) coefficients, quantizing and encoding the coefficients, and using motion compensation techniques to encode most video frames as predictions from or between other frames. In particular, the encoded MPEG video stream is comprised of a series of groups of pictures (GOPs), and each GOP begins with an independently encoded (intra) I frame and may include one or more following P frames and B frames. Each I frame can be decoded without information from any preceding and/or following frame. Decoding of a P frame requires information from a preceding frame in the GOP. Decoding of a B frame requires information from both a preceding and a following frame in the GOP. To minimize decoder buffer requirements, transmission orders differ from presentation orders for some frames, so that all the information of the other frames required for decoding a B frame will arrive at the decoder before the B frame.

In addition to the motion compensation techniques for video compression, the MPEG standard provides a generic framework for combining one or more elementary streams of digital video and audio, as well as system data, into single or multiple program transport streams (TS) which are suitable for storage or transmission. The system data includes information about synchronization, random access, management of buffers to prevent overflow and underflow, and time stamps for video frames and audio packetized elementary stream packets embedded in video and audio elementary streams as well as program description, conditional access and network related information carried in other independent elementary streams. The standard specifies the organization of the elementary streams and the transport streams, and imposes constraints to enable synchronized decoding from the audio and video decoding buffers under various conditions.

The MPEG-2 standard is documented in ISO/IEC International Standard (IS) 13818-1, "Information Technology-Generic Coding of Moving Pictures and Associated Audio Information: Systems," ISO/IEC IS 13818-2, "Information Technology-Generic Coding of Moving Pictures and Associated Audio Information: Video," and ISO/IEC IS 13818-3, "Information Technology-Generic Coding of Moving Pictures and Associated Audio Information: Audio," which are incorporated herein by reference. A concise introduction to MPEG is given in "A guide to MPEG Fundamentals and Protocol Analysis (Including DVB and ATSC)," Tektronix Inc., 1997, incorporated herein by reference.

MPEG-2 provides several optional techniques that allow video coding to be performed in such a way that the coded MPEG-2 stream can be decoded at more than one quality simultaneously. In this context, the word "quality" refers collectively to features of a video signal such as spatial resolution, frame rate, and signal-to-noise ratio (SNR) with respect to the original uncompressed video signal. These optional techniques are known as MPEG-2 scalability techniques. In the absence of the optional coding for such a scalability technique, the coded MPEG-2 stream is said to be nonscalable. The MPEG-2 scalability techniques are varieties of layered or hierarchical coding techniques, because the scalable coded MPEG-2 stream includes a base layer that can be decoded to provide low quality video, and one or more enhancement layers that can be decoded to provide additional information that can be used to enhance the quality of the video information decoded from the base layer. Such a layered coding approach is an improvement over a simulcast approach in which a coded bit stream for a low quality video is transmitted simultaneously with an independently coded bit stream for high quality video. The use of video information decoded from the base layer for reconstructing the high quality video permits the scalable coded MPEG-2 stream to have a reduced bit rate and data storage requirement than a comparable simulcast data stream.

The MPEG-2 scalability techniques are useful for addressing a variety of applications, some of which do not need the high quality video that can be decoded from a nonscalable coded MPEG stream. For example, applications such as video conferencing, video database browsing, and windowed video on computer workstations do not need the high quality provided by a nonscalable coded MPEG-2 stream. For applications where the high quality video is not needed, the ability to receive, store, and decode an MPEG-2 base-layer stream having a reduced bit rate or data storage capacity may provide a more efficient bandwidth versus quality tradeoff, and a more efficient complexity versus quality tradeoff. A scalable coded MPEG-2 stream provides compatibility for a variety of decoders and services. For example, a reduced complexity decoder for standard television could decode a scalable coded MPEG-2 stream produced for high definition television. Moreover, the base layer can be coded for enhanced error resilience and can provide video at reduced-quality when the error rate is high enough to preclude decoding at high quality.

The MPEG scaling techniques are set out in sections 7.7 to 7.11 of the MPEG-2 standard video encoding chapter 13818-2. They are further explained in Barry G. Haskell et al., *Digital Video: An Introduction to MPEG-2*, Chapter 9, entitled "MPEG-2 Scalability Techniques," pp. 183–229, Chapman & Hall, International Thomson Publishing, New York, 1997, incorporated herein by reference. The MPEG scalability techniques include four basic techniques, and a hybrid technique that combines at least two of the four basic techniques. The four basic techniques are called data partitioning, signal-to-noise ratio (SNR) scalability, spatial scalability, and temporal scalability.

Data partitioning is a method of partitioning a single layer coded bit-stream into two classes, including a base layer "partition 0" and an enhancement layer "partition 1". Partition 0 contains all high level header information as well as some low frequency discrete cosine transform (DCT) coefficients. Partition 1 contains all remaining higher frequency DCT coefficients and end-of-block (EOB) markers. Some syntax elements belonging to partition 0 are redundantly copied to partition 1 to facilitate error recovery. This duplicated information includes the sequence_header, GOP_header, picture_header, sequence_end_code, sequence_extension, picture_extension, and sequence_scalable_extension. This duplication ensures that there is proper synchronization and recovery following a bit-stream error in the low priority enhancement layer (partition 1) and introduces very little overhead. With respect to the single layer coded bit-stream, the separation point between the syntax elements to be included in the base and enhancement layers is indicated by a priority breakpoint (PBP) marker. The PBP can be adjusted at every picture slice. The PBP marker partitioning granularity is at the (run, level) DCT event level of the coded block data. Data partitioning is especially useful for error resilient video transmission over asynchronous transfer mode (ATM) networks and other networks where data prioritization is possible. Data partitioning has a number of shortcomings, including limited flexibility for PBP adjustment (in terms of partitioning granularity and update frequency), and the accumulation of drift errors over P pictures due to partially available coefficient information from a damaged enhancement layer.

SNR scalability is a method of generating a multiplex of bit-streams representing individual layers including a base layer which contains DCT coefficients quantized at a basic moderate quality level, and one or more SNR enhancement layers that contain DCT refinement coefficients intended to enhance the precision of quantized DCT coefficients reconstructed based on the content of all lower layers. Consequently, SNR scalability is also referred to as "Quantization Noise Scalability." The layers in SNR scalability are all at the same spatial and temporal resolutions but cumulatively produce increasing quality levels starting with the lowest quality at the base layer. The base layer includes all high level header information, all motion compensation and macroblock (MB) type information, and coarse quantized DCT coefficient information. The enhancement layers include quantized DCT refinement coefficient information, and some amount of overhead information. The slice structure should be the same for all layers. Use of different quantization matrices in the base and enhancement layers is allowed. The overhead required by SNR scalability results in a decreased bandwidth utilization efficiency compared to data partitioning. SNR scalability is especially useful for simultaneous distribution of standard definition television and high-definition television, error-resilient video services over ATM and other networks, and multi-quality Video On Demand (VOD) services. SNR scalability has a number of shortcomings, including increased complexity and overhead as compared to data partitioning, inflexibility in bandwidth distribution among the layers primarily due to the fact that all motion information has to be carried in the base layer, and the shortcoming that no single SNR scalable codec can eliminate drift errors and also be reliable under lossy enhancement layer transmission.

There are two variations to SNR scalability, namely, chroma simulcast and frequency domain SNR (FDSNR) scalability. Chroma simulcast provides a means for simultaneous distribution of video services that use 4:2:0 and 4:2:2 chroma subsampling formats. The associated bit-stream structure has three layers, including a base layer, an enhancement layer, and a simulcast layer. The base layer is a distribution of video in the 4:2:0 format. The enhancement layer provides SNR enhancement for the luminance component of the base layer. The simulcast layer includes chrominance components of the 4:2:2 format.

Frequency domain SNR scalability provides a transform domain method to achieve spatial resolution scalability. The base layer is intended for display at reduced spatial resolution and includes video encoded by a quantization matrix that allows a proper subset of normal size DCT transform coefficients to be selected and included in the base layer for use in conjunction with a smaller size DCT at the base layer decoder. The enhancement layer is the set of remaining normal size DCT transform coefficients.

Spatial scalability provides an ability to decode video at different spatial resolutions without first having to decode an entire (full-size) frame and then decimating it. The base layer carries the lowest spatial resolution version of the video obtained by decimating the original (full-size) video. Enhancement layers carry the differential information required to generate successively higher spatial resolution versions of the video. Spatial scalability supports interoperability between different video resolution and formats, such as support for simultaneous transmission of high definition television and standard definition television, and backward compatibility of MPEG-2 with different standards such as H.262 or MPEG-1. Spatial scalability supports error-resilient video transmission on ATM and other networks. Decoder complexity can scale with channel bandwidth. Spatial scalability has the advantages of a high degree of flexibility in video resolution and formats to be used for each layer, and a high degree of flexibility in achieving bandwidth partitioning between layers. There are no decoder drift problems because there are independent coding loops that are only loosely coupled. Spatial scalability, however, requires significantly increased complexity as compared to data partitioning and SNR scalability.

Temporal scalability provides an ability to decode video at different frame rates without first having to decode every single frame. The base layer carries the lowest frame rate version of the video coded by itself at the basic temporal rate. This version of the video is obtained from the original full frame rate version by a temporal down-sampling operation. The enhancement layers carry the information to construct the additional frames required to generate successively higher temporal resolution versions of the video. Additional frames in each enhancement layer are coded with temporal prediction relative to the frames carried by lower layers. Temporal scalability provides simultaneous support for different frame rates in the form of downward compatibility with lower-rate services, such as migration from first generation interlaced high definition television to high temporal resolution progressive high-definition television. Temporal scalability supports error-resilient video transmission on ATM and other networks. Decoder complexity can scale with channel bandwidth. Temporal scalability has the advantages of providing flexibility in achieving bandwidth partitioning between layers. There are no decoder drift problems because there are independent coding loops that are only loosely coupled. Temporal scalability has less complexity and higher efficiency than spatial scalability. Temporal scalability, however, provides a bandwidth partitioning flexibility that is more limited than spatial scalability because temporal scalability uses the same spatial resolution in all layers.

Hybrid scalability combines two scalabilities at a time from among SNR, spatial and temporal scalabilities. A base layer carries a basic quality, spatial and temporal resolution version of the intended video content. A first enhancement layer carries differential information required to implement one of the two intended enhancements on the base layer. A second enhancement layer carries differential information required to implement the second intended enhancement on the combination of the base and the first enhancement layers. Hybrid scalability is useful in more demanding applications requiring scalability in two video quality aspects within three or more bit-stream layers.

SUMMARY OF THE INVENTION

The basic objective of the present invention is to provide efficient SNR scaling of video originally present in a high-quality and nonscalable MPEG-2 transport stream. In other words, the present invention provides methods for processing nonscalable MPEG-2 transport stream to produce a lower bandwidth stream of video at lower quality levels. Software based implementations can operate in real-time upon the nonscalable MPEG-2 transport stream to support a variety of applications, such as browsing and review of stored MPEG-2 clips for search and play-list generation, bit stream scaling for splicing, bit-rate adjustment via video quality alteration for services with limited resources, and bit rate control of multiplexed transport streams.

In accordance with one aspect, the invention provides a method of scaling non-scalable MPEG-2 coded video to produce reduced-bandwidth, reduced-quality MPEG-2 coded video. The non-scalable MPEG-2 coded video includes a set of non-zero AC discrete cosine transform (DCT) coefficients for 8×8 blocks of the non-scalable MPEG-2 coded video. The method includes removing non-zero AC DCT coefficients from the non-scalable MPEG-2 coded video so that there are no more than a selected number of non-zero AC DCT coefficients in the reduced-quality MPEG-2 coded video for each of the 8×8 blocks.

In accordance with another aspect, the invention provides a method of scaling non-scalable MPEG-2 coded video to produce reduced-bandwidth, reduced-quality MPEG-2 coded video. The non-scalable MPEG-2 coded video includes a set of non-zero AC discrete cosine transform (DCT) coefficients for 8×8 blocks of the non-scalable MPEG-2 coded video. The method includes removing non-zero AC DCT coefficients from the non-scalable MPEG-2 coded video by selecting an initial set of the non-zero AC DCT coefficients to include in the reduced-quality MPEG-2 coded video, (run, level) coding the initial set of the non-zero AC DCT coefficients, and upon finding an escape sequence in the (run, level) coding of the initial set of the non-zero AC DCT coefficients, searching for a non-zero AC DCT coefficient of the non-scalable MPEG-2 coded video that is not in the initial set of the non-zero AC DCT coefficients and that would eliminate the escape sequence when included in the reduced-quality MPEG-2 coded video, and upon finding such a non-zero AC DCT coefficient of the non-scalable MPEG-2 coded video, including such a non-zero AC DCT coefficient in the reduced-quality MPEG coded video.

BRIEF DESCRIPTION OF THE DRAWINGS

Other objects and advantages of the invention will become apparent upon reading the following detailed description with reference to the accompanying drawings, in which:

FIG. 24 is a simplified block diagram of a volume containing a main file, a corresponding fast forward file for trick mode operation, and a corresponding fast reverse file for trick mode operation;

FIG. 25 is a more detailed block diagram of the volume introduced in FIG. 24;

Figure 1:
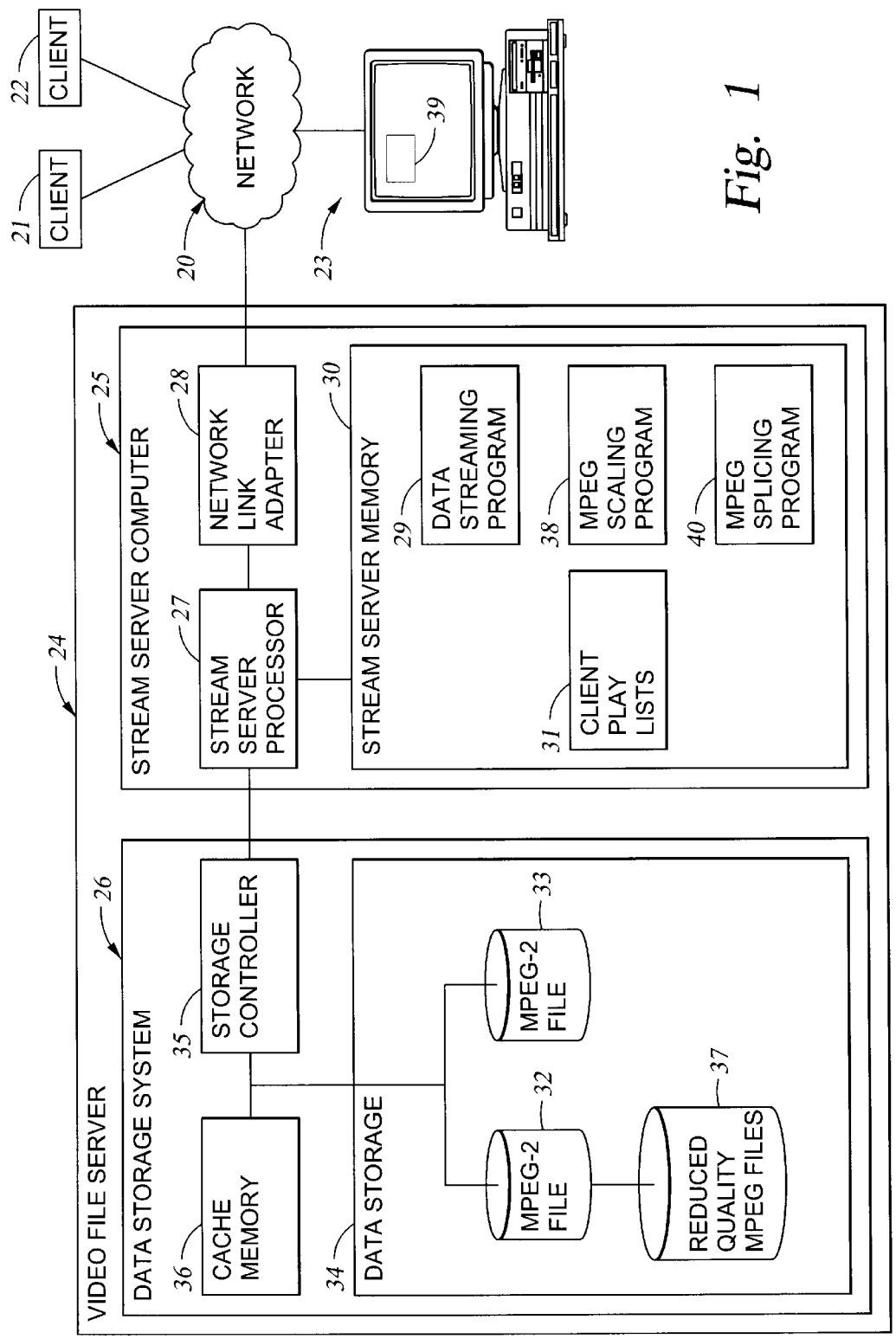
FIG. 1 is a block diagram of a data network including a video file server implementing various aspects of the present invention.

While the invention is susceptible to various modifications and alternative forms, specific embodiments thereof have been shown by way of example in the drawings and will be described in detail. It should be understood, however, that it is not intended to limit the form of the invention to the particular forms shown, but on the contrary, the intention is to cover all modifications, equivalents, and alternatives falling within the scope of the invention as defined by the appended claims.

DESCRIPTION OF ILLUSTRATIVE EMBODIMENTS

With reference to FIG. 1, there is shown a block diagram of a data network 20 linking a number of clients 21, 22, 23 to a video file server 24 implementing various aspects of the present invention. The video file server 24 includes at least one stream server computer 25 and a data storage system 26. The stream server computer 25 has a processor 27 and a network link adapter 28 interfacing the processor to the data network 20. The processor 27 executes a data streaming program 29 in memory 30 in order to stream MPEG coded video in real-time to the clients.

Client requests for real-time video are placed in client play lists 31 in order to schedule in advance video file server resources for the real-time streaming of the MPEG coded video. The play lists 31 specify a sequence of video clips, which are segments of MPEG-2 files 32, 33 in data storage 34 of the data storage system 26. The stream server processor 27 accesses a client play list in advance of the time to begin streaming MPEG coded video from a clip, and sends a video prefetch command to a storage controller 35 in the data storage system 26. The storage controller responds to the video prefetch command by accessing the clip in the data storage 34 to transfer a segment of the clip to cache memory 36. When the video data of the segment needs to be sent to the client, the stream server processor 27 requests the data from the storage controller 35, and the storage controller immediately provides the video data from the cache memory 36. Further details regarding a preferred construction and programming of the video file server 24 are disclosed in Duso et al., U.S. Pat. No. 5,892,915 issued Apr. 6, 1999, entitled "System Having Client Sending Edit Commands to Server During Transmission Of Continuous Media From One Clip in Play List for Editing the Play List," incorporated herein by reference.

In accordance with an aspect of the invention, the stream server computer 25 executes an MPEG scaling program 38 to produce reduced-quality MPEG coded video from non-scalable MPEG-2 coded video by truncating discrete cosine transform (DCT) AC coefficients from the coded blocks in the MPEG-2 coded video data. The reduced-quality MPEG coded video can be produced during ingestion of an MPEG-2 file 32 from the network 20, and stored in one or more associated files 37. Alternatively, the reduced-quality MPEG coded video in the files 37 could be produced as a background task from the MPEG-2 file 32. Reduced-quality MPEG coded video could also be produced in real-time from an MPEG-2 file 33 during streaming of the reduced-quality MPEG coded video from the stream server computer 25 to the network 20. The reduced-quality MPEG coded video is useful for a variety of applications, such as browsing and review of stored MPEG-2 assets for search and play-list generation, bit stream scaling for splicing, and bit-rate adjustment via video quality alteration for services with limited resources.

A typical example of browsing for play-list generation involves searching stored assets in a multi-media data base for segments of a desired content to be included in the play list, and in particular selecting the beginning frame and ending frame of each segment to be included. Such editing occurs often in the broadcast environment for inserting commercials and news clips into pre-recorded television programming, and for editing movies for content and time compression. The decoding technique of the present invention permits a PC workstation 23 to perform the decoding and display in real-time by execution of a software program. An operator can view the video content in a display window 39 in a fast-forward or fast-reverse mode, stop at and resume from freeze frames that are valid "in points" and "out points" for seamless splicing, and select an in-point and out-point for a next segment to be included in the play list. The stream server computer 25 could also include a seamless splicing program 40 providing seamless transitions between video segments that are contiguous in a play list and are from different video clips.

For seamless splicing, it is often necessary to reduce the bitrate for one or more frames at the end of a first segment prior to splicing to a second segment. In this case the bitrate must be reduced to avoid buffer overflow as a result of displaying the original frames at the end of the first segment. One method of reducing the bitrate is to insert a freeze frame at the end of the first segment, but this has the disadvantage of introducing distortion in the temporal presentation of the frames and precluding frame accuracy. A less disruptive method is to use the present invention for reducing the bitrate for a lower-quality presentation of one or more frames at the end of the first segment.

The present invention can also reduce the bit transmission rate and storage requirements for MPEG-2 applications by altering the video quality. For example, different clients may present different bandwidth access requests for video from nonscalable MPEG-2 files 32, 33 in the video file server. Also, temporary network congestion may limit the bandwidth available to satisfy a request for real-time streaming of video data. In each case, the present invention can alter the video quality to meet the desired or available bandwidth to satisfy the request.

Figure 2:
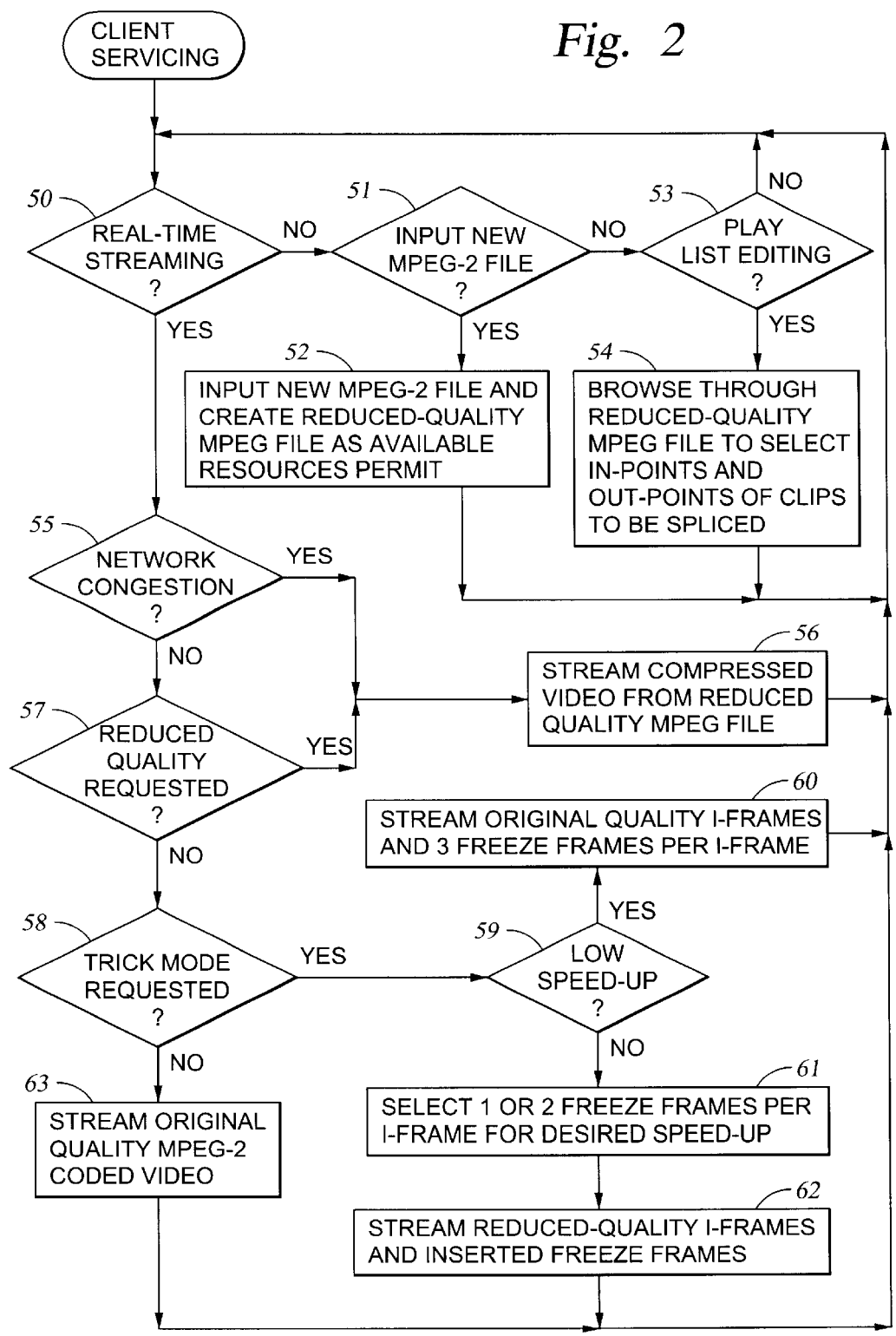
FIG. 2 is a flowchart of a procedure executed by a stream server computer in the video file server of FIG. 1 to service client requests.

With reference to FIG. 2, there is shown a flowchart of a procedure executed by a stream server computer in the video file server of FIG. 1 to service client requests. In a first step 50, execution branches to step 51 when a client request is not a request for real-time streaming. If the request is a request to input a new MPEG-2 file, then execution branches to step 52 to input the new MPEG-2 file and to create a reduced-quality version of the MPEG-2 file as available resources permit. If the request is not a request to input a new MPEG-2 file, then execution continues from step 51 to step 53. In step 53, execution branches to step 54 if the request is for play list editing. In step 54, the client may browse through the reduced-quality MPEG file to select in-points and out-points of clips to be spliced.

In step 50, when the request is for real-time streaming, then execution branches to step 55. In step 55, if there is network congestion so that there is insufficient bandwidth to transmit a stream of original-quality MPEG-2 coded video, then execution branches to step 56 to stream compressed video from the reduced-quality MPEG file. If no reduced-quality MPEG file is available for the desired clip, then the reduced-quality MPEG coded video to be streamed is produced in real-time from the original-quality MPEG-2 coded video. There are also applications, such as the display of spatially down-sampled video in a small display window (39 in FIG. 1), for which the client may request reduced-quality MPEG coded video. In this case, in the absence of network congestion, execution will continue from step 55 to step 57, and branch from step 57 to step 56 for streaming of reduced-quality MPEG coded video to the client.

Reduced-quality MPEG coded video is also useful for "trick-mode" operation. Trick-mode refers to fast forward or fast reverse display of video, in a fashion analogous to the fast forward and fast reverse playback functions of a video cassette recorder (VCR). The problem with trick-mode operation is that the speed of the MPEG stream cannot simply be speeded up because the transmission bandwidth would be excessive and a conventional MPEG-2 decoder will not be able to handle the increased data rate or even if the decoder would have been able to support the increased data rate, such a change in the original operating conditions is not allowable. For this reason, in trick-mode, neither the original display rate of 29.97 frames per second (for NTSC or 25 frames per second for PAL) nor the original transport stream (TS) multiplex rate should change. Nor is it possible to simply decimate frames since only the I frames are independently coded, and the P frames and B frames need the content of certain other frames for proper decoding. The I frames typically occur once for every 15 frames. Assuming that this convention is followed in the encoding process, it would be possible to preserve and play each I frame from each and every group of pictures (GOP), resulting in a 15 times slower temporal sampling rate, or a 1 to 15 speeding up of motion if the I frames only are played back at the nominal NTSC rate of approximately 30 frames per second. Consequently, the content of a 60 minutes duration clip will be covered in 4 minutes. Unfortunately the average information content per frame for the I frames is more than four times the average information content of the P and B frames. Therefore, the trick-mode cannot be implemented simply by transmitting only the I frames for a speed-up by a factor of 15, because this would need an increase in the TS multiplex rate over the nominal rate.

In particular, the average information content of an I frame has been measured to be about 56374.6 bytes. If the I frames only are transmitted at the standard NTSC rate, then the bit transmission rate would be: 8(bits per byte)*56,374.6 (bytes per frame)*29.97(frames per sec.) or about 13,516, 374.1 bits per second only for the video stream, which is significantly above—almost 3.38 times—the original rate of 4 megabits per second used in this test. This calculation, being based on an average quantity, is ignoring the indispensable need for an actually higher transport rate to provide some safety margin to handle short-term-sustained large size I frame chains (bursts) which practically always happen. Clearly, some form of modification in the trick-mode operation definition is required to handle this problem and pull the bit-rate requirement down to the nominal 4 megabits per second.

Two degrees of freedom are available to achieve such a reduction in the required bit-rate for trick-mode operation. The first is I frame compression quality and the second is a motion speed-up ratio. With respect to compression quality, it is well known that human observers' perception of image detail degrades with increasing motion speed of objects in the scene. Based on this fact, the type of D pictures were introduced in MPEG-1 video syntax for fast visible (forward or reverse) search purposes. (See ISO/IEC 11172-2: 1993 Information Technology—Coding of moving pictures and associated audio for digital storage media at up to about 1.5 Mbits/s—Part 2: Video, Annex D.6.6. Coding D-Pictures, p. 102). D pictures make use of only the DC coefficients in intra coding to produce very low quality (in terms of SNR) reproductions of desired frames which were judged to be of adequate quality in fast search mode.

In order to provide support for enhanced quality trick-mode operation, the quality of the original I frames can be reduced by the preservation of just a sufficient number of AC DCT coefficients to meet the bit-rate limitation. Based on experiments with two standard video test sequences (one encoded at 15 Mbits/sec. and the other at 24 Mbits/sec. and both with I frames only), it is observed that the bandwidth for I frames can be scaled to one half by keeping about 9 lowest order AC coefficients and eliminating the rest. This scheme provides good quality even at the full spatial and temporal resolution, much better than D pictures.

The inherent speed-up ratio lower bound imposed by the GOP structure can be relaxed and further lowered by freeze (P) frame substitution in between genuine (SNR scaled or non-scaled) I frames. The maximum number of freeze frames that can be inserted before visually disturbing motion jerkiness occurs, is very likely to depend heavily on the original GOP structure (equivalently the separation between I frames of the original sequence) and the original amount of motion in the clip. However, 1, 2 or 3 freeze frame substitutions in between genuine I frames present reasonable choices which will yield speed-up ratios of 1 to 7.5, 1 to 5 and 1 to 3.75 respectively instead of the 1 to 15 speed-up ratio provided by the genuine I frames only implementation. (These ratios are computed by a first-order approximation that neglects a slight increase in bandwidth required by the consecutive freeze frames, which are inserted in between genuine I frames and can typically be made very small in size in comparison to the average size of a genuine I frame. Therefore, the insertion of 1, 2, 3 freeze frames will result in bandwidth reductions of 2 to 1, 3 to 1 and 4 to 1 respectively. The accuracy of this approximation degrades as more consecutive freeze frames and/or SNR scaling is employed.) An easy way to see the validity of these approximate figures is to note for example that in the case of I freeze frame insertion, the total presentation time of the trick-mode clip for an originally 60 minutes duration asset will increase from 4 minutes to 8 minutes. Since due to the underlying assumption of the first-order approximation stated above, the same amount of data (I frames only) will be transmitted in this doubled time interval, the bandwidth requirement will be halved. The final choice for trick-mode implementation should reflect a balanced trade-off along these two degrees of freedom. For example, SNR scaling of I frames down to 9 AC coefficients can be used along with single freeze frame insertion between I frames. These two choices, both of which are individually capable of providing a 2 to 1 bandwidth reduction as discussed before, will yield a combined 4 to 1 bandwidth reduction which will comfortably bring the non-scaled I frame-only bit-rate of 13516374.1 bits/sec. down to below the 4 Mbits/sec. quota. If the visual quality provided by 9 AC coefficients is not considered adequate, then SNR scaling could be tuned to keep more AC coefficients at the expense of a smaller bandwidth reduction. This, however, could be compensated consequently by increasing the number of freeze frames to be used in between I frames. Coarser quantization (and therefore poorer visual quality) can be tolerated at high trick-mode speeds and better visual quality should be retained at lower trick-mode speeds.

With reference to FIG. 2, if the client has requested trick-mode operation, execution branches from step 58 to step 59. In step 59, execution branches to step 60 for a low value of speed-up. In step 60, the trick-mode stream is produced by streaming original-quality I frames and inserting three freeze frames per I frame, to yield a speed-up factor of 15/4=3.75 based on an original MPEG-2 coded stream having one I frame for every 15 frames. For a higher speed-up factor, execution branches from step 59 to step 61. In step 61, either one or two freeze frames are selected per I frame to provide a speed-up factor of 15/2=7.5, or 15/3=5 respectively. Then in step 62 the trick-mode stream is produced by streaming reduced-quality I frames and inserting the selected number of freeze frames between the reduced-quality I frames. If a trick-mode operation is not requested in step 58, then execution continues from step 58 to step 63. In step 63, the stream server computer streams original-quality MPEG-2 coded data to the client. Further details regarding trick-mode operation are described below with reference to FIGS. 7 to 10.

FIGS. 3 to 6 show further details regarding use of the present invention for MPEG splicing. In particular, reduced-quality frames are substituted for the freeze frames used in the seamless splicing procedure found in the common disclosure of Peter Bixby et al., U.S. application Ser. No. 09/539,747 filed Mar. 31, 2000; Daniel Gardere et al., U.S. application Ser. No. 09/540,347 filed Mar. 31, 2000; and John Forecast et al. U.S. application Ser. No. 09/540,306 filed Mar. 31, 2000; which are all incorporated by reference herein. The common disclosure in these U.S. applications considered pertinent to the present invention is included in the written description below with reference to FIGS. 3 to 6 in the present application (which correspond to FIGS. 19, 22, 23, and 24 in each of the cited U.S. applications).

Figure 3:
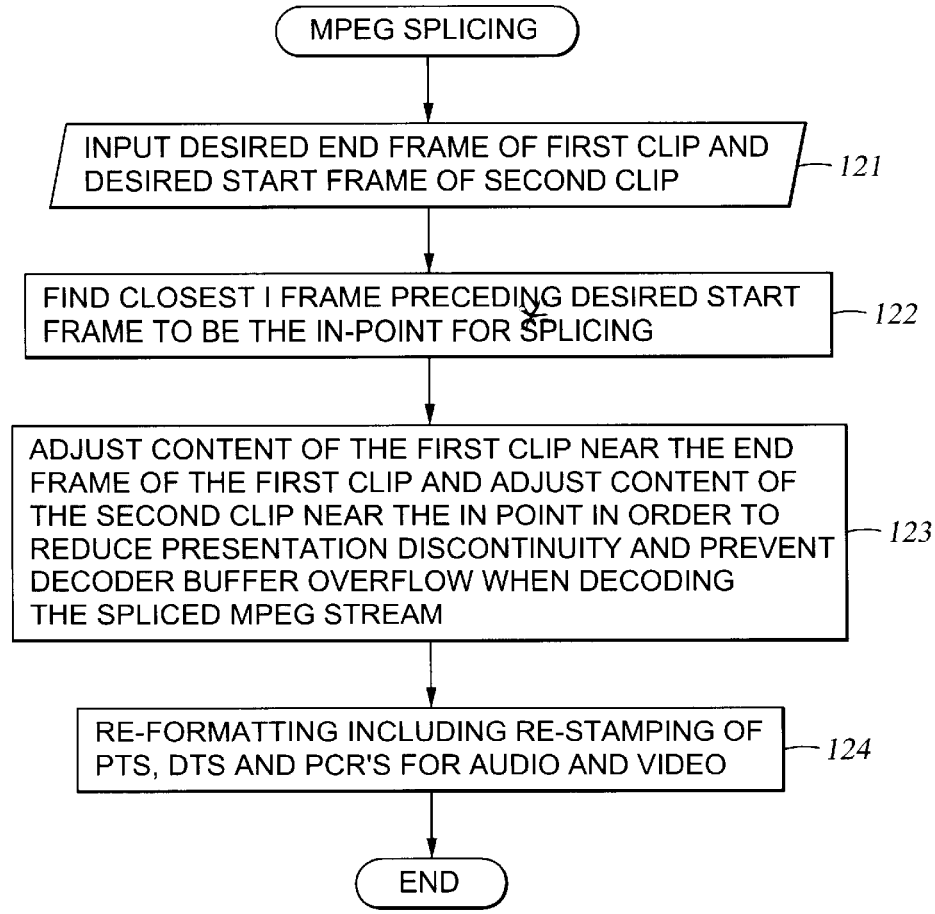
FIG. 3 is a flowchart of a procedure for splicing MPEG clips.

FIG. 3 shows a basic procedure for MPEG splicing. In the first step 121, the splicing procedure receives an indication of a desired end frame of the first clip and a desired start frame of the second clip. Next, in step 122, the splicing procedure finds the closest I frame preceding the desired start frame to be the In Point for splicing. In step 123, the splicing procedure adjusts content of the first clip near the end frame of the first clip and adjusts content of the second clip near the in point in order to reduce presentation discontinuity (due to decoder buffer underflow) and also to prevent decoder buffer overflow when decoding the spliced MPEG stream. Finally, in step 124, the concatenation of the first clip up to about the Out Point and the second clip subsequent to about the In Point is re-formatted, including re-stamping of the presentation time stamps (PTS), decoding time stamps (DTS), and program clock reference (PCR) values for the audio and video streams in the second clip.

Considering now video splicing, the splicing procedure should ensure the absence of objectionable video artifacts, preserve the duration of the spliced stream, and if possible, keep all of the desired frames in the spliced stream. The duration of the spliced stream should be preserved in order to prevent any time drift in the scheduled play-list. In some cases, it is not possible to keep all of the original video frames due to buffer problems.

Management of the video buffer is an important consideration in ensuring the absence of objectionable video artifacts. In a constant bit rate (CBR) and uniform picture quality sequence, subsequent pictures typically have coded representations of drastically different sizes. The encoder must manage the decoder's buffer within several constraints. The buffer should be assumed to have a certain size defined in the MPEG-2 standard. The decoder buffer should neither overflow nor underflow. Furthermore, the decoder cannot decode a picture before it receives it in full (i.e. completely). Moreover, the decoder should not be made to "wait" for the next picture to decode; this means that every 40 ms in PAL and $1/29.97$ second in NTSC, the decoder must have access to a full picture ready to be decoded.

The MPEG encoder manages the video decoder buffer through decode time stamps (DTS), presentation time stamps (PTS), and program clock reference (PCR) values. When splicing the end of a first clip to the beginning of a second clip, there will be a problem of video buffer management if a duration of time $DTS_{L1}-T_e$ is different from a duration of time $DTS_{F2}-PCR_{e2}$ minus one video frame (presentation) interval, where $DTS_{L1}$ is the DTS at the end of the first clip and indicates the time at which the video decoder buffer is emptied of video data from the first clip, $T_e$ is the time at which the last video frame's data is finished being loaded into the video decoder buffer, $DTS_{F2}$ is the DTS of the first frame of the second clip, and $PCR_{e2}$ is the PCR of the second clip extrapolated from the value of the most recent received genuine PCR record, to the first byte of the picture header sync word of the first video frame in the clip to start. The extrapolation adjusts this most recently received genuine PCR record value by the quotient of the displacement in data bits of the clip from the position where it appears in the second clip to the position at which video data of the first frame of the second clip begins, divided by the data transmission bit rate for transmission of the clip to the decoder. Because the time $PCR_{e2}$ must immediately follow $T_e$, there will be a gap in the decoding and presentation of video frames if $DTS_{F2}-PCR_{e2}$ is substantially greater than $DTS_{L1}-T_e$ plus one video frame interval. In this case, the buffer will not be properly full to begin decoding of the second clip one video frame interval after the last frame of the first clip has been decoded. Consequently, either the second clip will be prematurely started to be decoded or the decoder will be forced to repeat a frame one or more times after the end of the display of the last frame from the first clip to provide the required delay for the second clip's buffer build-up. In the case of a premature start for decoding the second clip, a video buffer underflow risk is generated. On the other hand, in case of repeated frames, the desired frame accuracy for scheduled play-lists is lost besides the fact that neither a precise timing adjustment can be achieved through this procedure.

If $DTS_{F2}-PCR_{e2}$ is substantially less than $DTS_{L1}-T_e$ plus one video frame interval, then the decoder will not be able to decode the first frame of the second clip at the specified time $DTS_{F2}$ because the last frame of the first clip will not yet have been removed from the video buffer. In this case a video buffer overflow risk is generated. Video buffer overflow may present a problem not only at the beginning of the second clip, but also at a subsequent location of the second clip. If the second clip is encoded by an MPEG-2 compliant encoder, then video buffer underflow or buffer overflow will not occur at any time during the decoding of the clip. However, this guarantee is no longer valid if the $DTS_{F2}$-$PCR_{e2}$ relationship at the beginning of the second clip is altered. Consequently, to avoid buffer problems, the buffer occupancy at the end of the first clip must be modified in some fashion. This problem is inevitable when splicing between clips having significantly different ending and starting buffer levels. This is why the Society of Motion Picture and Television Engineers (SMPTE) has defined some splice types corresponding to well-defined buffer levels. (See SMPTE Standard 312M, entitled "Splice Points for MPEG-2 Transport Streams," SMPTE Journal, Nov. 1998.) In order to seamlessly splice the first clip to the second clip, the content of the first clip (towards its end) is modified so that $PCR_{e2}$ can immediately follow $T_e$ (by one byte transmission time) and $DTS_{F2}$ can just follow $DTS_{L1}$ (by one video frame presentation interval).

Figure 4:
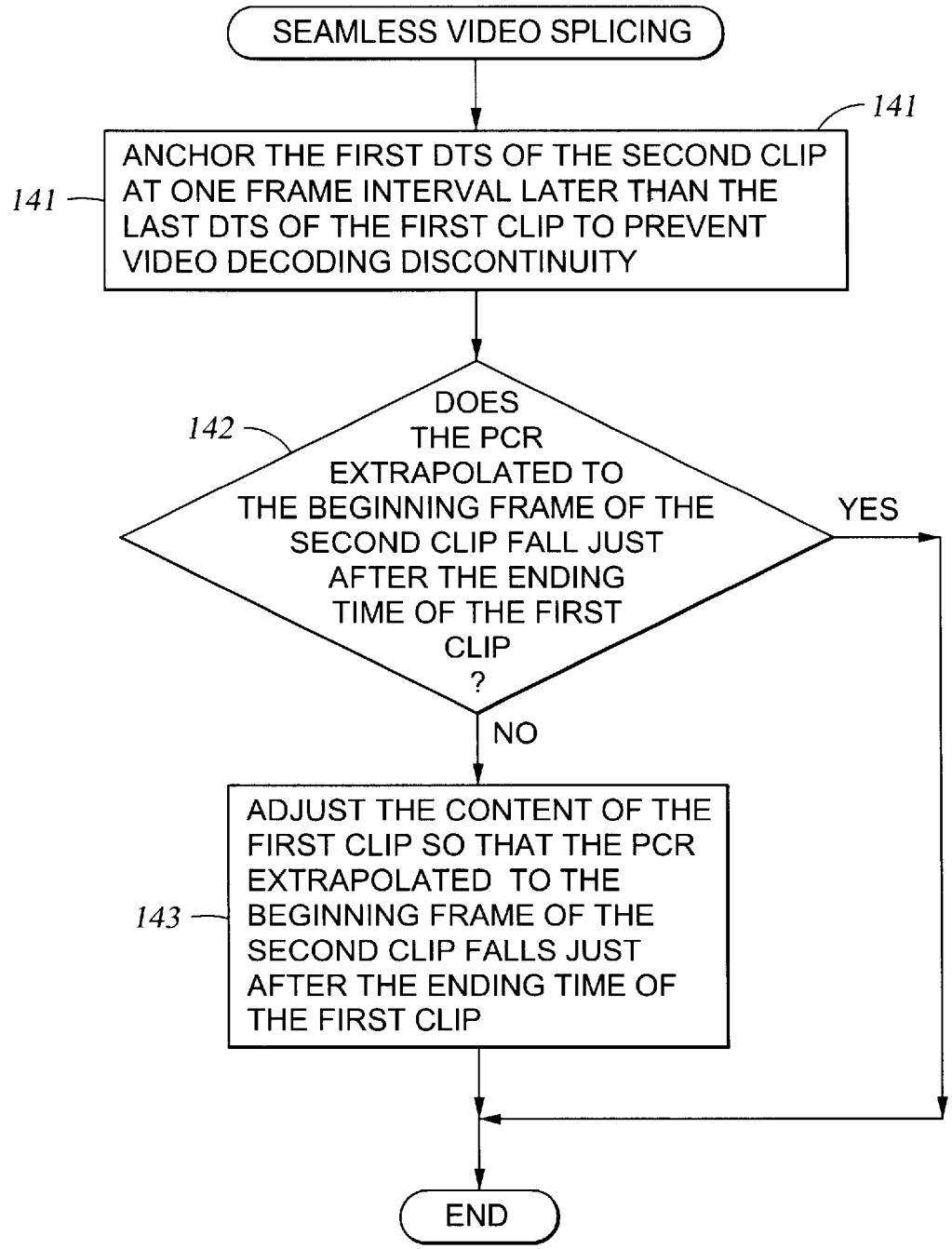
FIG. 4 is a flowchart of a procedure for seamless video splicing of MPEG clips.

FIG. 4 shows a flow chart of a seamless video splicing procedure that attains the desired condition just described above. In a first step 141, the first DTS of the second clip is anchored at one frame interval later than the last DTS of the first clip in order to prevent a video decoding discontinuity. Then, in step 142, the procedure branches depending on whether the PCR extrapolated to the beginning frame of the second clip falls just after the ending time of the first clip. If so, then the splice will be seamless with respect to the original video content. Otherwise, the procedure branches to step 143. In step 143, the content of the first clip is adjusted so that the PCR extrapolated to the beginning frame of the second clip falls just after the ending time of the first clip. Therefore the desired conditions for seamless video splicing are achieved.

Figure 5:
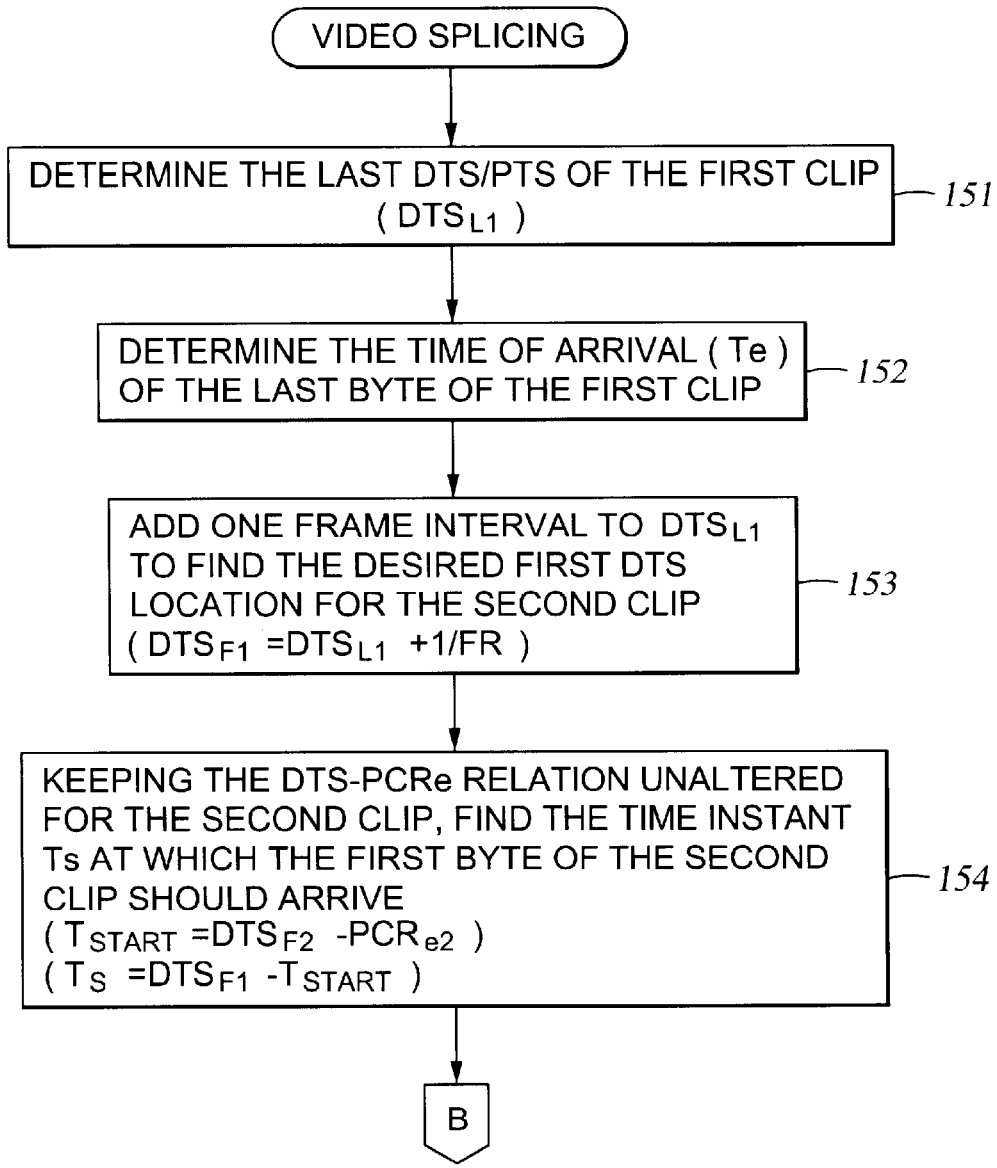
FIG. 5 is a more detailed flowchart of the procedure for seamless video splicing of MPEG clips.

With reference to FIG. 5, there is shown a more detailed flow chart of a seamless video splicing procedure. In a first step 151, the procedure inspects the content of the s first clip to determine the last DTS/PTS of the first clip. This last DTS/PTS of the first clip is designated $DTS_{L1}$. Next, in step 152, the procedure inspects the content of the first clip to determine the time of arrival ($T_e$) of the last byte of the first clip. In step 153, the procedure adds one frame interval to $DTS_{L1}$ to find the desired first DTS location for the second clip. The sum, designated $DTS_{F1}$, is equal to $DTS_{L1}+1/FR$, where FR is the video frame rate. In step 154, while keeping the DTS-$PCR_e$ relationship unaltered for the second clip, the procedure finds the time instant, designated $T_S$, at which the first byte of the second clip should arrive at the decoder buffer. This is done by calculating $$T_{START}=DTS_{F2}-PCR_{e2}, \text{ and } T_S=DTS_{F1}-T_{START}.$$

Figure 6:
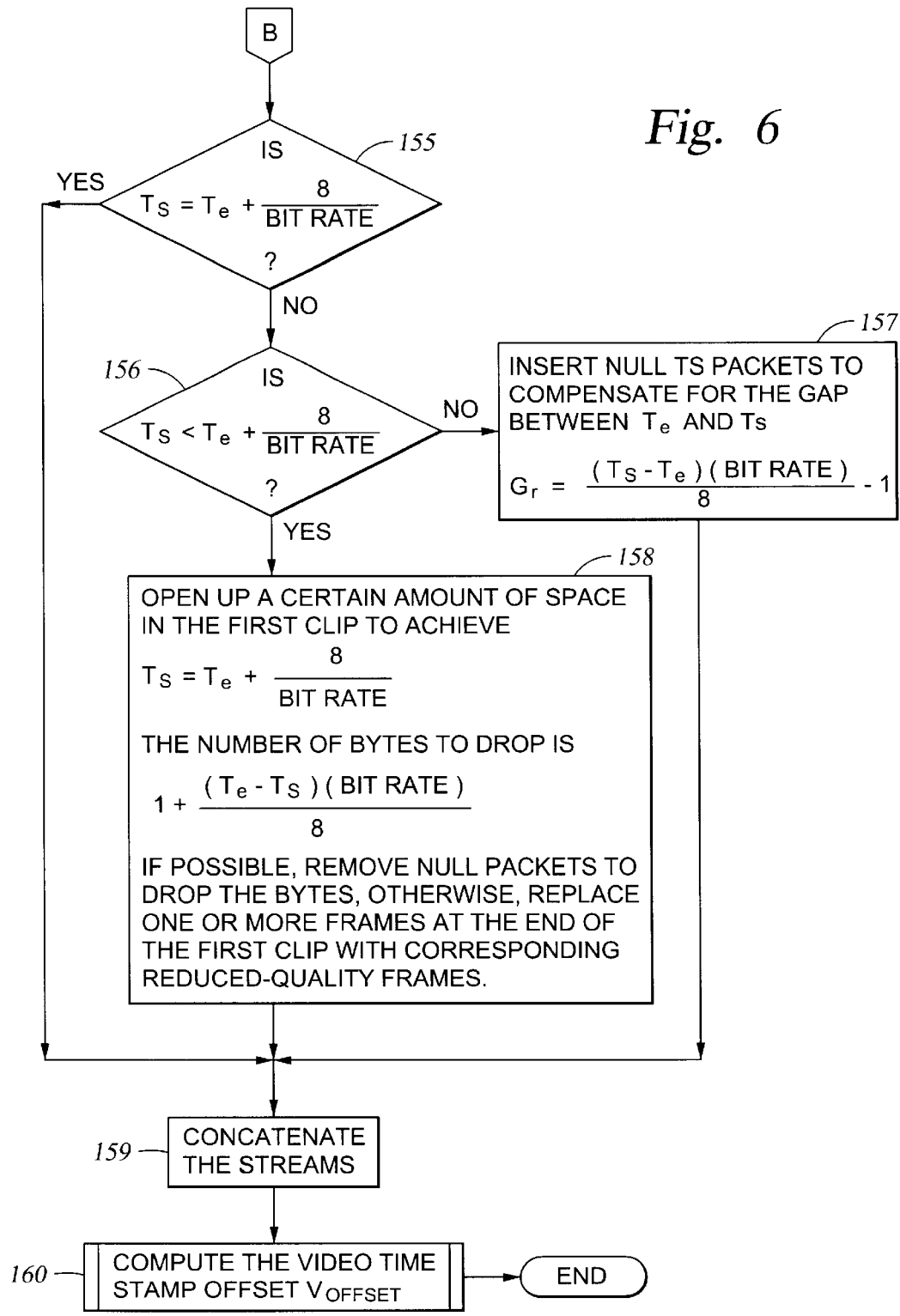
FIG. 6 is a continuation of the flowchart begun in FIG. 5.

Continuing in FIG. 6, in step 155, execution branches depending on whether $T_S$ is equal to $T_e$ plus 8 divided by the bit rate. If not, then the clips to be spliced need modification before concatenation, and execution branches to step 156. In step 156, execution branches depending on whether $T_S$ is less than $T_e$ plus 8 divided by the bit rate. If not, then there is an undesired gap in between the clips to be spliced, and execution branches to step 157. In step 157, null packets are inserted into the clips to be spliced to compensate for the gap. The gap to be compensated has a number of bytes, designated $G_r$, equal to $(T_S-T_e)(BIT RATE)/8$ minus one. If in step 156, $T_S$ is less than $T_e$ plus 8 divided by the bit rate, then execution continues from step 156 to step 158 to open up a certain amount of space in the first clip to achieve $T_S=T_e+8/(BIT RATE)$. The number of bytes to drop is one plus $(T_e-T_S)(BIT RATE)/8$. If possible, the bytes are dropped by removing null packets. Otherwise, one or more frames at the end of the first clip are replaced with corresponding reduced-quality frames, which have fewer bytes than the original-quality frames at the end of the first clip.

If in step 155 $T_S$ is found to be equal to $T_e$ plus 8 divided by the bit rate, then execution continues to step 159. Execution also continues to step 159 from steps 157 and 158. In step 159, the transport streams from the two clips are concatenated. Finally, in step 160, a subroutine is called to compute a video time stamp offset, designated as $V_{OFFSET}$. This subroutine finds the DTS of the last video frame (in decode order) of the first clip. This DTS of the last video frame of the first clip is denoted $DTS_{VL1}$. Then the subroutine finds the original DTS of the first frame to be decoded in the second clip. This DTS of the first frame to be decoded in the second clip is denoted $DTSV_{F2}$. Finally, the subroutine computes the video time stamp offset $V_{OFFSET}$ as $DTS_{VL1}-DTS_{VF2}$ plus one video frame duration.

Figure 7:
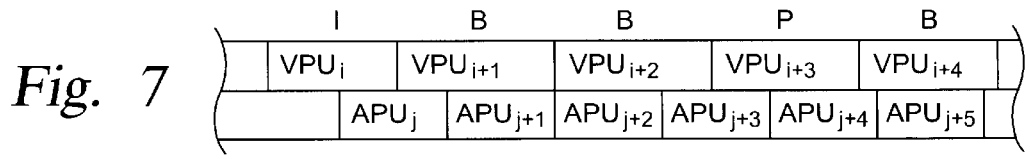
FIG. 7 is a timing diagram showing a timing relationship between video presentation units (VPUs) and associated audio presentation units (APUs) in an original MPEG-2 coded data stream.
Figure 8:
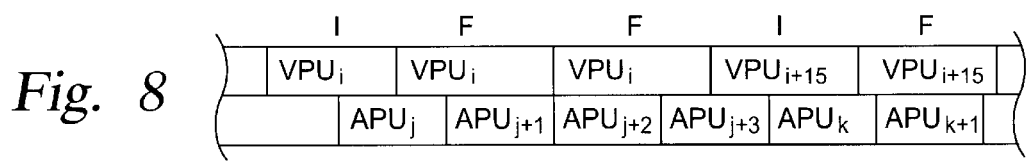
FIG. 8 is a timing diagram showing a timing relationship between video presentation units (VPUs) and associated audio presentation units (APUs) for a fast-forward trick-mode stream.

FIGS. 7 to 10 show further details regarding trick-mode operation. FIG. 7 shows a timing relationship between video presentation units (VPUs) and associated audio presentation units (APUs) in an original MPEG-2 coded data stream, and FIG. 8 shows similar timing for the fast-forward trick-mode stream produced from the original data stream of FIG. 7. (The fast-forward trick-mode stream is an example of a trick-mode stream that could be produced in step 60 of FIG. 2.) The original data stream has successive video presentation units for video frames of type I, B, B, P, B respectively. The trick-mode stream has successive video presentation units for video frames of types I, F, F, I, F where "F" denotes a freeze P (or possibly B) frame. Each I frame and immediately following F frames produce the same video presentation units as a respective I frame in the original data stream of FIG. 7, and in this example, one in every frames in the original data stream is an I frame. Each freeze frame is coded, for example, as a P frame repeating the previous I frame or the previous P-type freeze-frame (in display order). In each freeze frame, the frame is coded as a series of maximum-size slices of macroblocks, with an initial command in each slice indicating that the first macroblock is an exact copy of the corresponding macroblock in the previous frame (achieved by predictive encoding with a zero valued forward motion compensation vector and no encoded prediction error), and two consequent commands indicating that the following macroblocks in the slice until and including the last macroblock of the slice are all coded in the same way as the first macroblock.

For trick-mode operation, there is also a problem of how to select audio presentation units (APU) to accompany the video presentation units that are preserved in the trick-mode stream. Because the video presentation units (VPU) have a duration of ($1/29.97$) sec. or about 33.37 msec. and the audio presentation units (APU) have a duration of 24 msec., there is neither a one-to-one correspondence nor alignment between VPUs and APUs. In a preferred implementation, the audio content of a trick-mode clip is constructed as follows. Given the total presentation duration ($1/29.97$) sec. or about 33.37 msec. for a single video frame, it is clear that always at least one and at most two 24 msec. long audio presentation units (APU) will start being presented during the end-to-end presentation interval of each video frame. This statement refers to the original clip and does not consider any audio presentation unit whose presentation is possibly continuing as the video frame under consideration is just put on the display. The first of the above mentioned possibly two audio presentation units will be referred to as the aligned audio presentation unit with respect to the video frame under consideration. For example, in FIG. 8, the $APU_j$ is the aligned audio presentation unit with respect to the $VPU_i$. Now, when the I frames are extracted and possibly SNR scaled and possibly further interleaved with a number of freeze P frames in between them to produce the trick-mode video packetized elementary stream (PES), the associated trick-mode audio stream is constructed as follows. For each I type video frame presentation interval (and for that matter also for freeze P type video frames) in this trick-mode clip, the above stated fact of at least one (and at most two) audio presentation unit being started, holds. Then for each I frame presentation interval in the trick-mode clip, once any possibly previously started and continuing audio presentation unit ends, insert its aligned audio presentation unit (from the original clip) and continue inserting APUs from the original clip subsequent to the aligned one until covering the rest of the I frame presentation interval and also any possibly following freeze P frame presentation intervals until crossing into and overlapping (or less likely aligning) with the next I frame's presentation interval. In FIG. 8, for example, the audio presentation units $APU_j$, $APU_{j+1}$, $APU_{j+2}$, and $APU_{j+3}$ are inserted, until crossing into and overlapping with the next I frame $VPU_{i+15}$. Following $APU_{j+3}$ is inserted APUk, which designates the APU aligned with $VPU_{i+15}$ in the original stream. Clearly, the final alignment of (the aligned and consequent) audio presentation units with respect to their associated I frames will be slightly different in the trick-mode clip as compared to the original clip. However, considering how the trick-mode audio component will sound like, this poses no problem at all.

Figure 9:
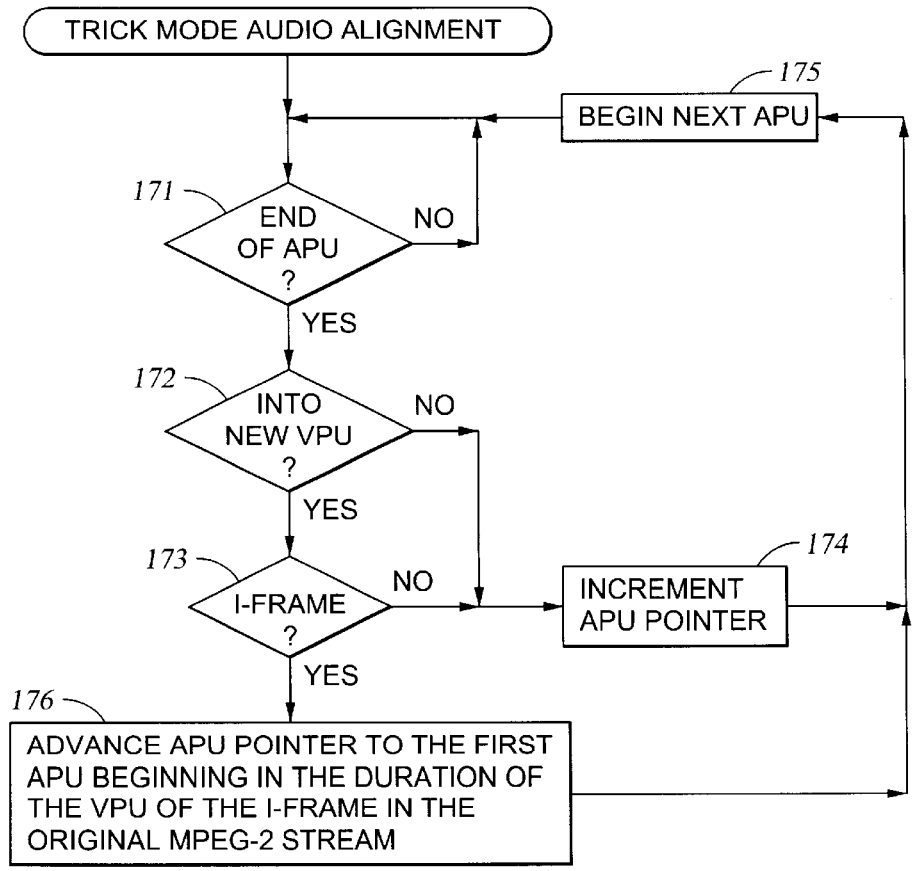
FIG. 9 is a flowchart of a procedure for selection and alignment of audio presentation units (APUs) in the fast-forward trick-mode stream.

FIG. 9 is a flowchart of a procedure for producing the desired sequencing of audio presentation units (APUs) in the fast-forward trick-mode stream. This procedure scans the audio elementary stream in the original MPEG-2 stream to determine the sequence of APUs in the original stream and their presentation-time alignment with the I frames in the video elementary stream of the original MPEG-2 transport stream, while selecting APUs to include in the trick-mode stream. In a first step 171, execution proceeds once the end of the current APU is reached. If the end of the current APU has not entered a new VPU (i.e., the beginning of the current APU is within the presentation time of one VPU and the end of the current APU is within the presentation time of the same VPU), or if it has entered a new VPU (i.e., the beginning of the current APU is within the presentation time of one VPU and the end of the current APU is within the presentation time of a new (next) VPU but the new VPU is not an I frame, then execution branches to step 174. In step 174, an APU pointer is incremented, and in step 175 execution proceeds into this next APU. If in step 173 the end of the current APU extends into an I frame, then in step 176 the APU pointer is advanced to point to the first APU beginning within the duration of the VPU of the I frame in the original MPEG-2 stream.

Figure 10:
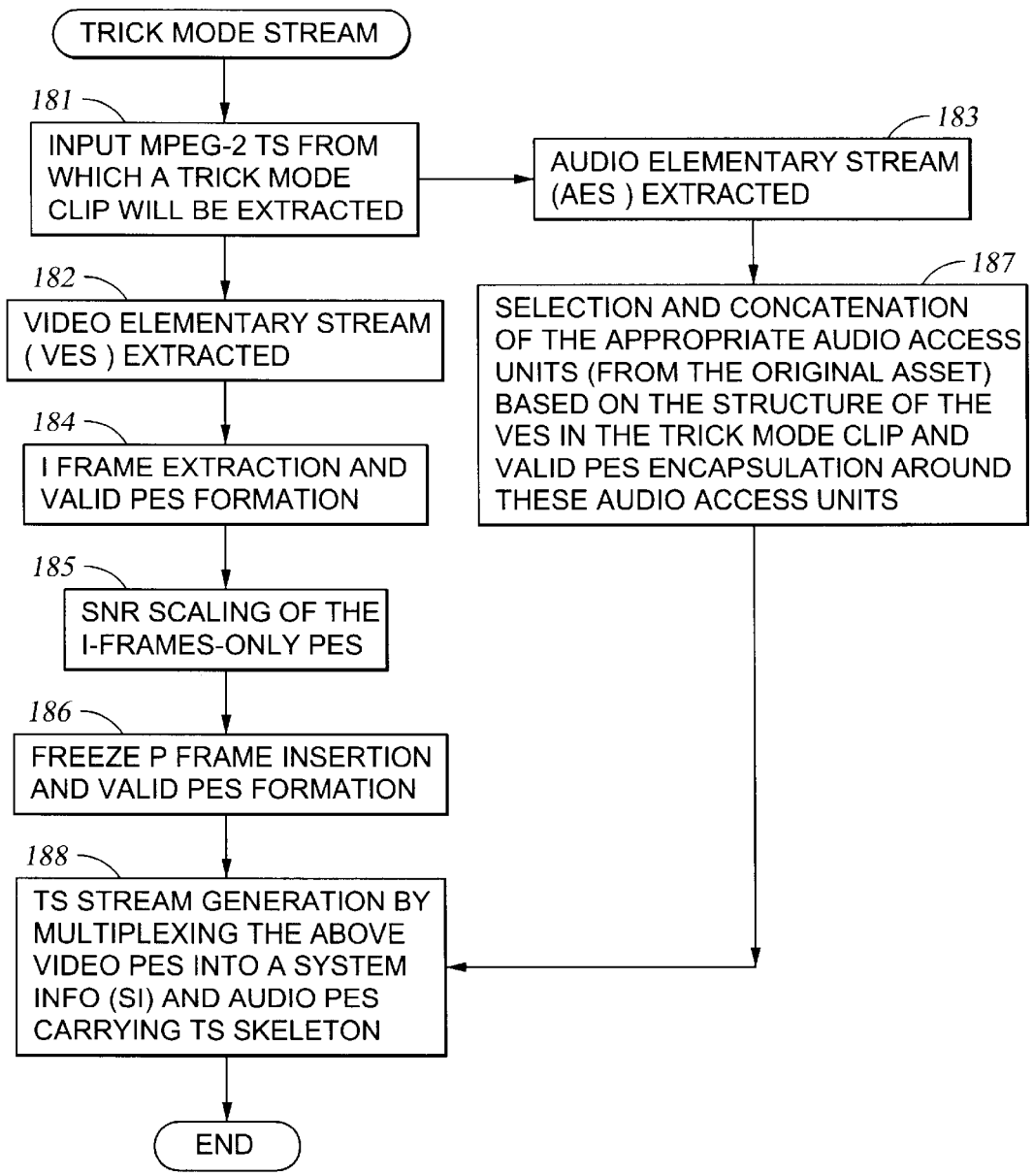
FIG. 10 is a flowchart of a procedure for producing a trick-mode MPEG-2 transport stream from a regular MPEG-2 transport stream (TS)

FIG. 10 is a flowchart of a procedure for producing a trick-mode stream from an MPEG-2 transport stream (TS). In a first step 181, the MPEG-2 TS is inputted. In step 182, the video elementary stream (VES) is extracted from the TS. In step 183, a concurrent task extracts the audio elementary stream (AES) from the TS. In step 184, I frames are extracted from the VES and valid packetized elementary stream (PES) packets are formed encapsulating the I frames.

In step 185, the I frames are SNR scaled, for the high speed cases of the trick-mode. In step 186, P-type freeze frames are inserted into the stream of SNR scaled I frames (in between the scaled I frames), and valid PES packets are formed for the trick-mode VES encapsulating the P-type freeze frames and the SNR scaled I frames. Concurrently, in step 187, appropriate audio access units (from the originally input MPEG-2 TS asset) are selected and concatenated based on the structure of the VES being formed for the trick-mode clip, as described above with reference to FIG. 9, and valid PES packet encapsulation is formed around these audio access units. Finally, in step 188, the trick-mode TS stream is generated by multiplexing the trick-mode VES from step 186 into a system information (SI) and audio PES carrying TS skeleton including the audio PES packets from step 187.

Figure 11:
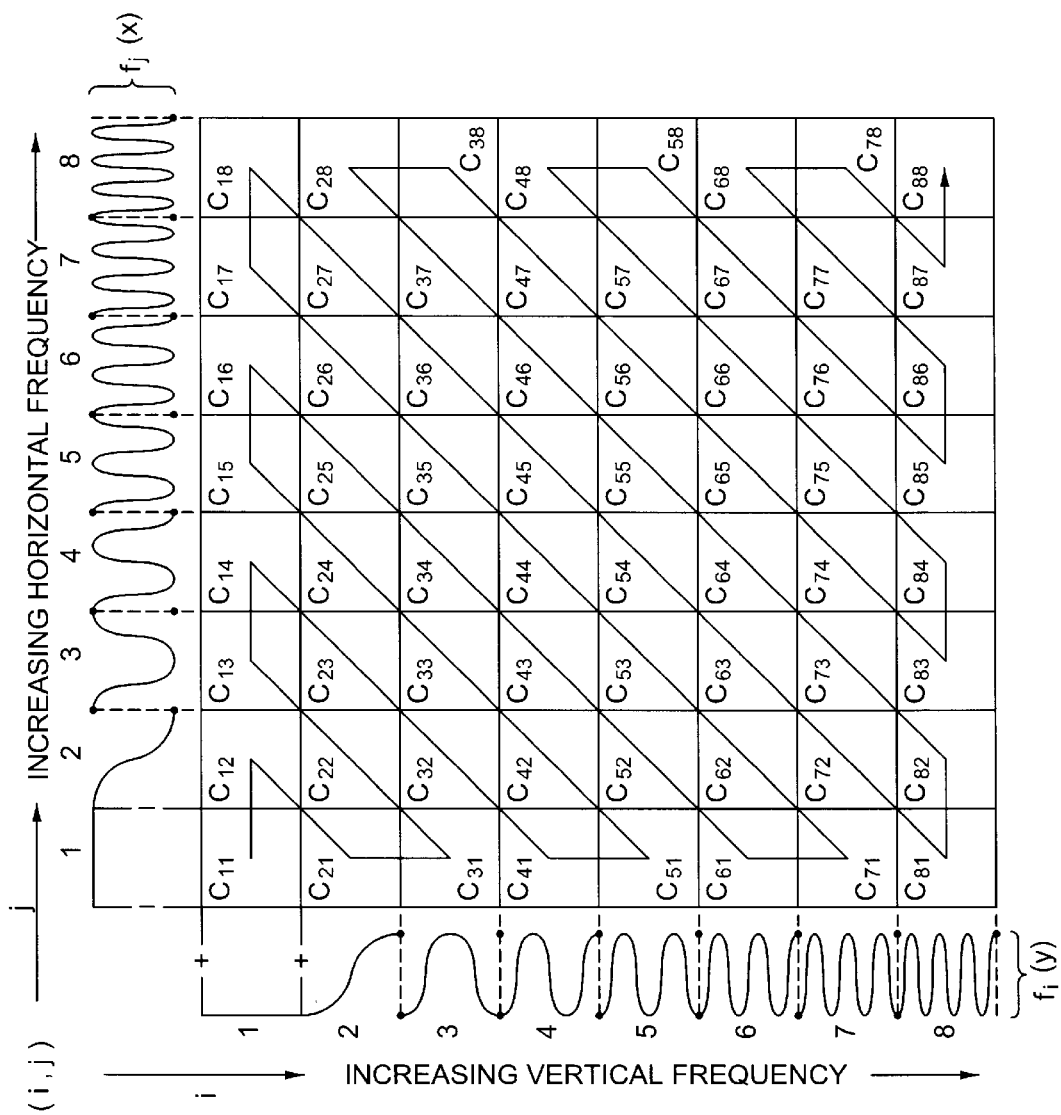
FIG. 11 is a diagram illustrating relationships between the MPEG discrete cosine transform (DCT) coefficients, spatial frequency, and the typical zig-zag scan order.

FIGS. 11 to 19 include details of the preferred techniques for truncating AC DCT coefficients for producing low-quality MPEG coded video from original-quality MPEG-2 coded video. Most of these techniques exploit the fact that in the typical (default) zig-zag scan order, the basis functions for the high-order AC DCT coefficients have an increasing frequency content. FIG. 11, for example, shows a matrix of the DCT coefficients $C_{ij}$. The row index (i) increases with increasing vertical spatial frequency in a corresponding 8×8 coefficient block, and the column index (j) increases with increasing horizontal spatial frequency in the corresponding 8×8 coefficient block. The coefficient $C_{11}$ has zero frequency associated with it in both vertical and horizontal directions, and therefore it is referred to as the DC coefficient of the block. The other coefficients have non-zero spatial frequencies associated with their respective basis functions, and therefore they are referred to as AC coefficients. Each coefficient has an associated basis function $f_{ij}(x,y)$ that is separable into x and y components such that $f_{ij}(x,y)=f_i(y)f_j(x)$. The x and y component functions $f_i(y)$ and $f_j(x)$ are shown graphically in FIG. 11 as cosine functions in order to illustrate their associated spatial frequencies. In practice, the component functions are evaluated at discrete points for the 64 pixel positions in the 8×8 blocks, so that each of the DCT basis functions is an 8×8 array of real numbers. In particular, the component functions are:

$$f_i(y)=\text{SQRT}((2-\delta_{i-1})/8)(\cos((\pi/8)(y-1/2)(i-1))) \text{ for } y=1, 2, 3, \ldots, 8$$

$$f_j(y)=\text{SQRT}((2-\delta_{j-1})/8)(\cos((\pi/8)(x-1/2)(j-1))) \text{ for } x=1, 2, 3, \ldots, 8$$

The heavy black line through the matrix of coefficients in FIG. 11 denotes the default zig-zag scan order typically used for MPEG-2 encoding. Listed in this order, the coefficients are $C_{11}$, $C_{12}$, $C_{21}$, $C_{31}$, $C_{22}$, $C_{13}$, $C_{14}$, $C_{23}$, $C_{32}$, $C_{41}$, ... $C_{86}$, $C_{77}$, $C_{68}$, $C_{78}$, $C_{87}$, $C_{88}$. The first coefficient in this zig-zag scan order is the DC coefficient $C_{11}$ providing the lowest spatial frequency content in the 8×8 block of pixels, and the last coefficient in this zig-zag scan order is the coefficient $C_{88}$ providing the highest spatial frequency content in the 8×8 block of pixels.

Figure 12:
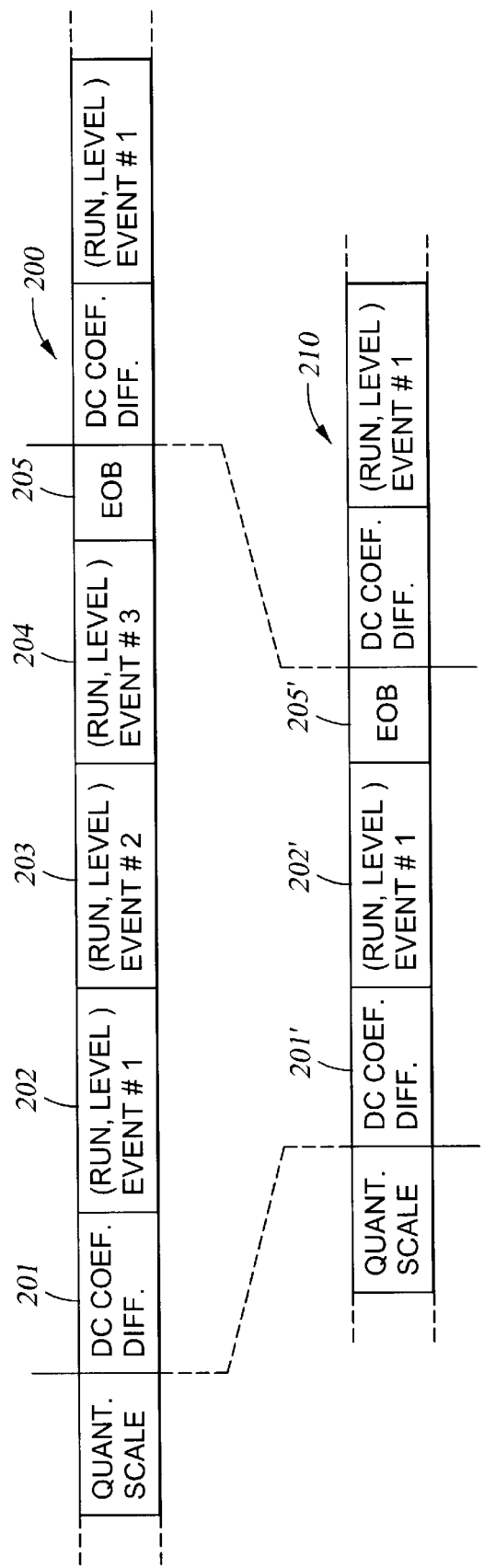
FIG. 12 is a diagram illustrating a relationship between an MPEG-2 coded bit stream and a reduced-quality MPEG-2 coded bit stream resulting from truncation of high-order DCT coefficients.

FIG. 12 is a diagram illustrating a relationship between an original MPEG-2 coded bit stream 200 and a reduced-quality MPEG-2 coded bit stream 210 resulting from truncation of high-order DCT coefficients from the original MPEG-2 coded bit stream. Shown in the original MPEG-2 coded bit stream 200 is a portion of a video PES packet including DCT coefficients for an 8×8 pixel block. The DCT coefficients include a differentially coded DC coefficient 201, and three (run, level) events 202, 203, 204 encoding three respective nonzero AC coefficients possibly along with some zero valued AC coefficients preceding the three nonzero valued ones. The DCT coefficients are ordered according to the zig-zag scan order shown in FIG. 11 (or possibly according to an alternate zig-zag scan pattern also supported by the MPEG-2 standard), and AC coefficients having zero magnitude are described in terms of total counts of consecutive zero valued coefficients lying in between two nonzero valued coefficients, in the MPEG-2 coded bit stream. An end-of-block (EOB) code 205 signals the end of the encoded DCT coefficients for the current block. The reduced-quality MPEG-2 coded bit stream 210 includes a DC coefficient 201' identical to the DC coefficient 201 in the original MPEG-2 coded bit stream 200, and a (run, level) event 202' identical to the (run, level) event 202 in the original MPEG-2 coded bit stream 200. Second and third (run, level) events, however, have been omitted from the reduced-quality MPEG-2 bit stream 210, because an EOB code 205' immediately follows the (run, level) event 202'. Therefore, the two nonzero high-order AC DCT coefficients encoded by the second and third (run, level) events 203, 204 have been omitted from the reduced-quality MPEG-2 bit stream 210.

Figure 13:
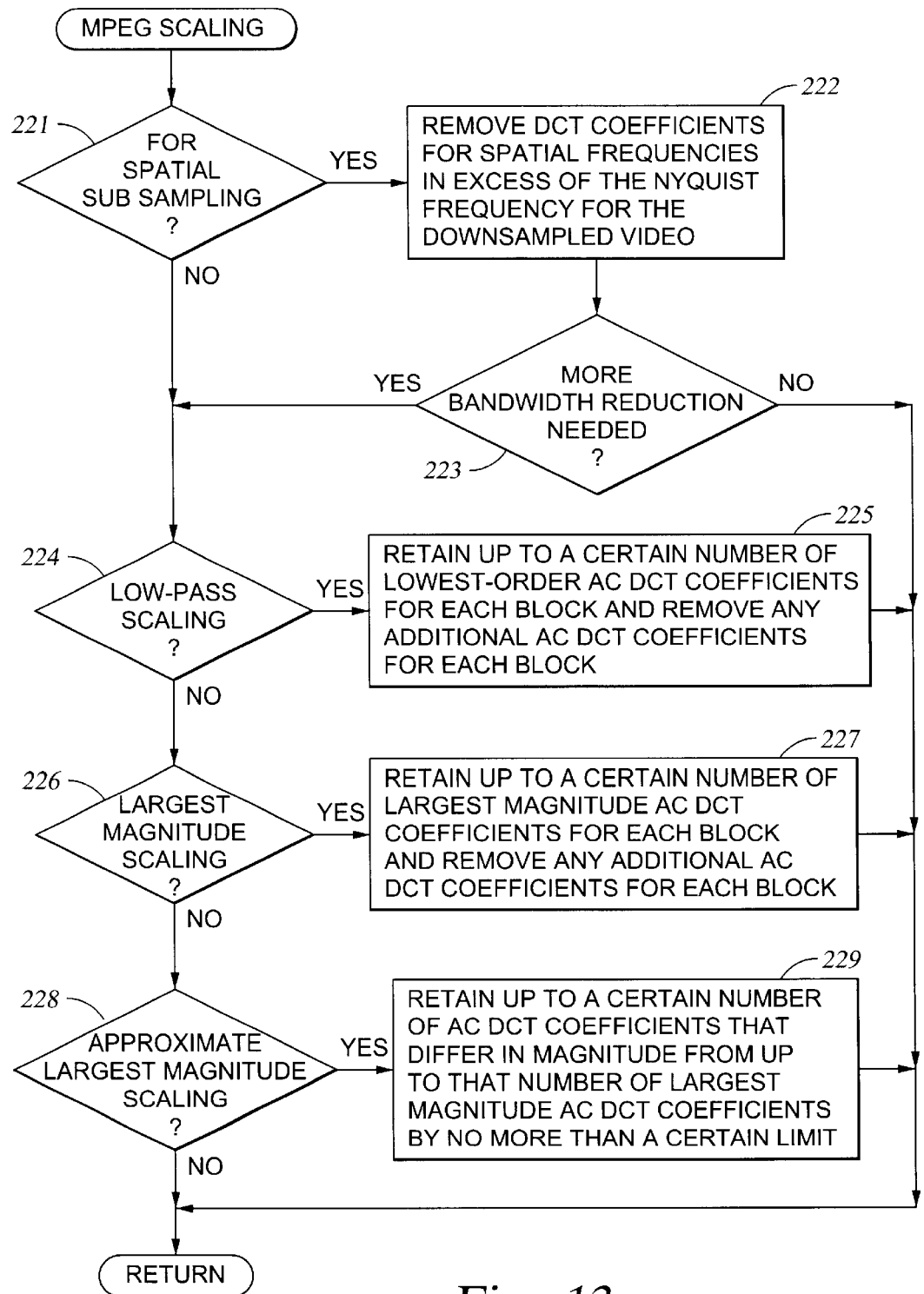
FIG. 13 is a flowchart of a procedure for scaling MPEG-2 coded video using a variety of techniques.

FIG. 13 is a flowchart of a procedure for scaling MPEG-2 coded video using a variety of techniques including the omission of AC DCT coefficients. The procedure operates upon an original-quality MPEG-2 coded video stream by removing AC DCT coefficients in this stream to produce a lower quality MPEG coded video stream. In a first step 221, execution branches to step 222 if the scaled MPEG coded video is to be spatially subsampled. In step 222, the procedure removes any and all DCT coefficients for spatial frequencies in excess of the Nyquist frequency for the downsampled video. For example, if the low-quality video stream will be downsampled by a factor of two in both the vertical and the horizontal directions, then the procedure removes any and all DCT coefficients having a row index (i) greater than four and any and all DCT coefficients having a column index (j) greater than four. This requires the decoding of the (run, level) coded coefficients to the extent necessary to obtain an indication of the coefficient indices. If a sufficient number of the original AC DCT coefficients are removed for a desired bandwidth reduction, then the scaling procedure is finished. Otherwise, execution branches from step 223 to step 224. Execution also continues from step 221 to step 224 if spatial downsampling is not intended.

In step 224, execution branches to step 225 if low-pass scaling is desired. Low-pass scaling requires the least computational resources and may produce the best results if the scaled, low-quality MPEG coded video is spatially downsampled. In step 225, the procedure retains up to a certain number of lowest-order AC DCT coefficients for each block and removes any additional DCT coefficients for each block. This is a kind of frequency domain signal-to-noise ratio scaling (FDSNR) that will be designated FDSNR_LP. A specific example of the procedure for step 225 will be described below with reference to FIG. 14.

Execution continues from step 224 to step 226 if low-pass scaling is not desired. In step 226, execution branches to step 227 if largest magnitude based scaling is desired. Largest magnitude based scaling produces the least squared error or difference between the original-quality MPEG-2 coded video and the reduced-quality MPEG coded video for a given number of nonzero AC coefficients to preserve, but it requires more computational resources than the low-pass scaling of step 225. More computational resources are needed because if there are more nonzero AC coefficients than the desired number of AC coefficients for a block, then the (run, level) events must be decoded fully to obtain the coefficient magnitudes, and additional resources are required to find the largest magnitude coefficients. In step 227, the procedure retains up to a certain number of largest magnitude AC DCT coefficients for each block, and removes any and all additional AC DCT coefficients for each block. This is a kind of frequency domain signal-to-noise ratio scaling (FDSNR) that will be designated FDSNR_LM. A specific example of the procedure for step 227 will be described below with reference to FIG. 15.

If in step 226 largest magnitude based scaling is not desired, then execution continues to step 228. In step 228, execution branches to step 229 to retain up to a certain number of AC DCT coefficients that differ in magnitude from up to that number of largest magnitude AC DCT coefficients by no more than a certain limit. This permits a kind of approximation to FDSNR_LM in which an approximate search is undertaken for the largest magnitude AC DCT coefficients if there are more nonzero AC DCT coefficients than the desired number of AC DCT coefficients in a block. The approximate search can be undertaken using a coefficient magnitude classification technique such as a hashing technique, and the low-pass scaling technique can be applied to the classification level that is incapable of discriminating between the desired number of largest magnitude AC DCT coefficients. A specific example is described below with reference to FIG. 19.

Figure 14:
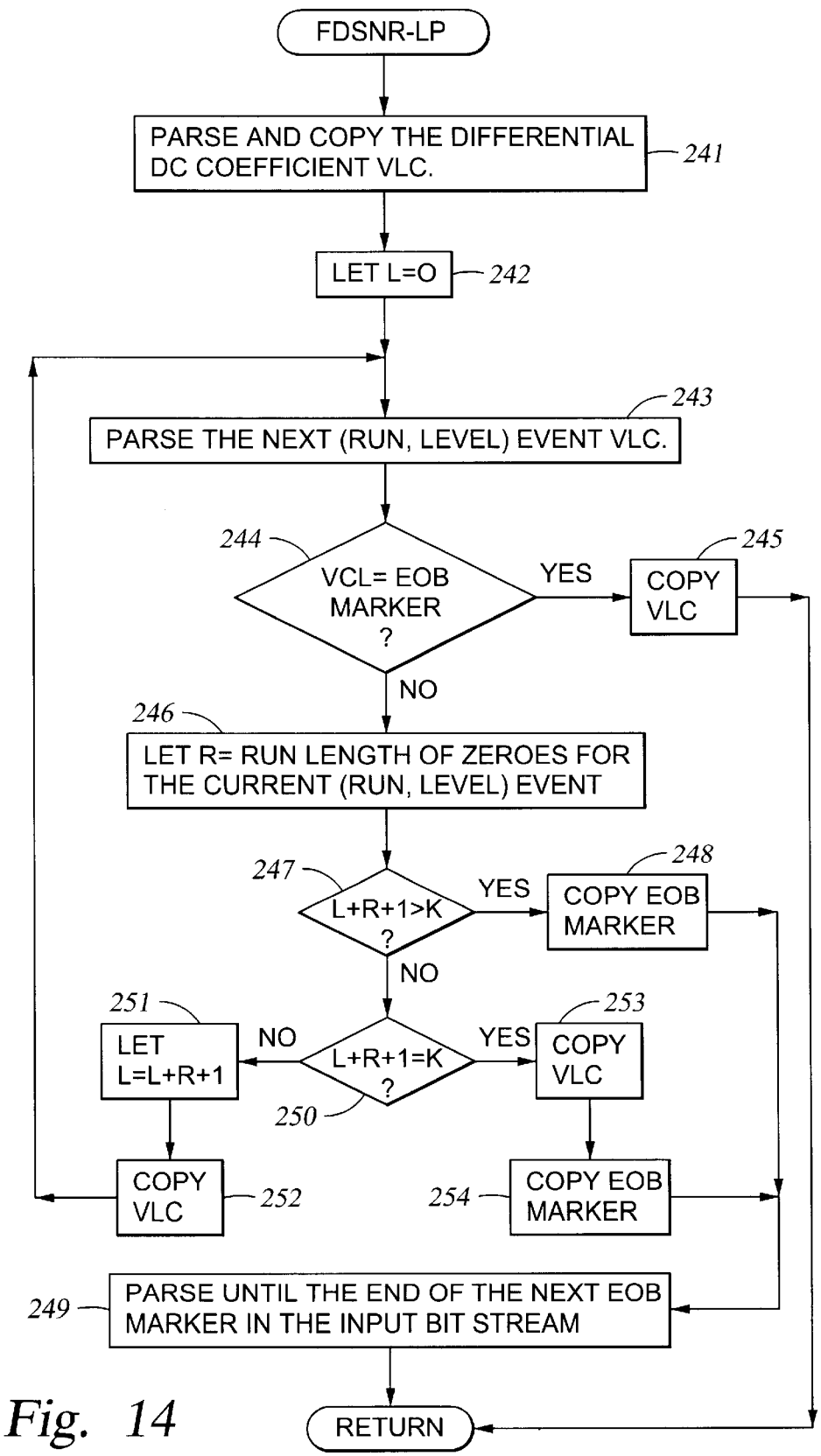
FIG. 14 is a flowchart of a procedure for signal-to-noise ratio scaling MPEG-2 coded video using a frequency-domain low-pass truncation (FDSNR_LP) technique.

With reference to FIG. 14, there is shown a flowchart of a procedure for scaling MPEG-2 coded video using the low-pass frequency-domain signal-to-noise (FDSNR_LP) scaling technique. This procedure scans and selectively copies components of an input stream of original-quality MPEG-2 coded data to produce an output stream of reduced-quality MPEG-2 coded video. The procedure is successively called, and each call processes coefficient data in the input stream for one 8×8 block of pixels. No more than a selected number "k" of coded lowest order (nonzero or zero valued) AC coefficients are copied for the block where the parameter "k" can be specified for each block.

In a first step 241 of FIG. 14, the procedure parses and copies the stream of original-quality MPEG-2 coded data up to and including the differential DC coefficient variable-length code (VLC). Next, in step 242, a counter variable "l" is set to zero. In step 243, the procedure parses the next (run, level) event VLC in the stream of original-quality MPEG-2 coded data. In step 244, if the VLC just parsed is an end-of-block (EOB) marker, execution branches to step 245 to copy the VLC to the stream of reduced-quality MPEG-2 coded video, and the procedure is finished for the current block.

In step 244, if the VLC just parsed is not an EOB marker, then execution continues to step 246. In step 246, a variable "r" is set equal to the run length of zeroes for the current (run, level) event, in order to compute a new counter value l+r+1. In step 247, if the new counter value l+r+1 is greater than the parameter "k", then the procedure branches to step 248 to copy an EOB marker to the stream of reduced-quality MPEG coded data. After step 248, execution continues to step 249, where the procedure parses the input stream of original-quality MPEG-2 coded data until the end of the next EOB marker, and the procedure is finished for the current block.

In step 247, if the new counter value l+r+1 is not greater than the parameter "k", then execution continues to step 250. In step 250, execution branches to step 251 if the new counter value l+r+1 is not equal to "k" (which would be the case if the new counter value is less than "k"). In step 251, the counter state l is set equal to the new counter value l+r+1. Then, in step 252, the VLC just parsed (which will be a VLC encoding a (run,level) event) is copied from the stream of original-quality MPEG-2 coded data to the stream of reduced-quality MPEG-2 coded data. After step 252, execution loops back to step 243 to continue the scanning of the stream of original-quality MPEG-2 coded data.

In step 250, if the new counter value l+r+1 is equal to "k", then execution branches from step 250 to step 253, to copy the VLC just parsed (which will be a VLC encoding a (run, level) event) from the stream of original-quality MPEG-2 coded data to the stream of reduced-quality MPEG-2 coded data. Next, in step 254, the procedure copies an EOB marker to the stream of reduced-quality MPEG-2 coded data. After step 254, execution continues to step 249, where the procedure parses the input stream of original-quality MPEG-2 coded data until the end of the next EOB marker, and the procedure is finished for the current block.

Figure 15:
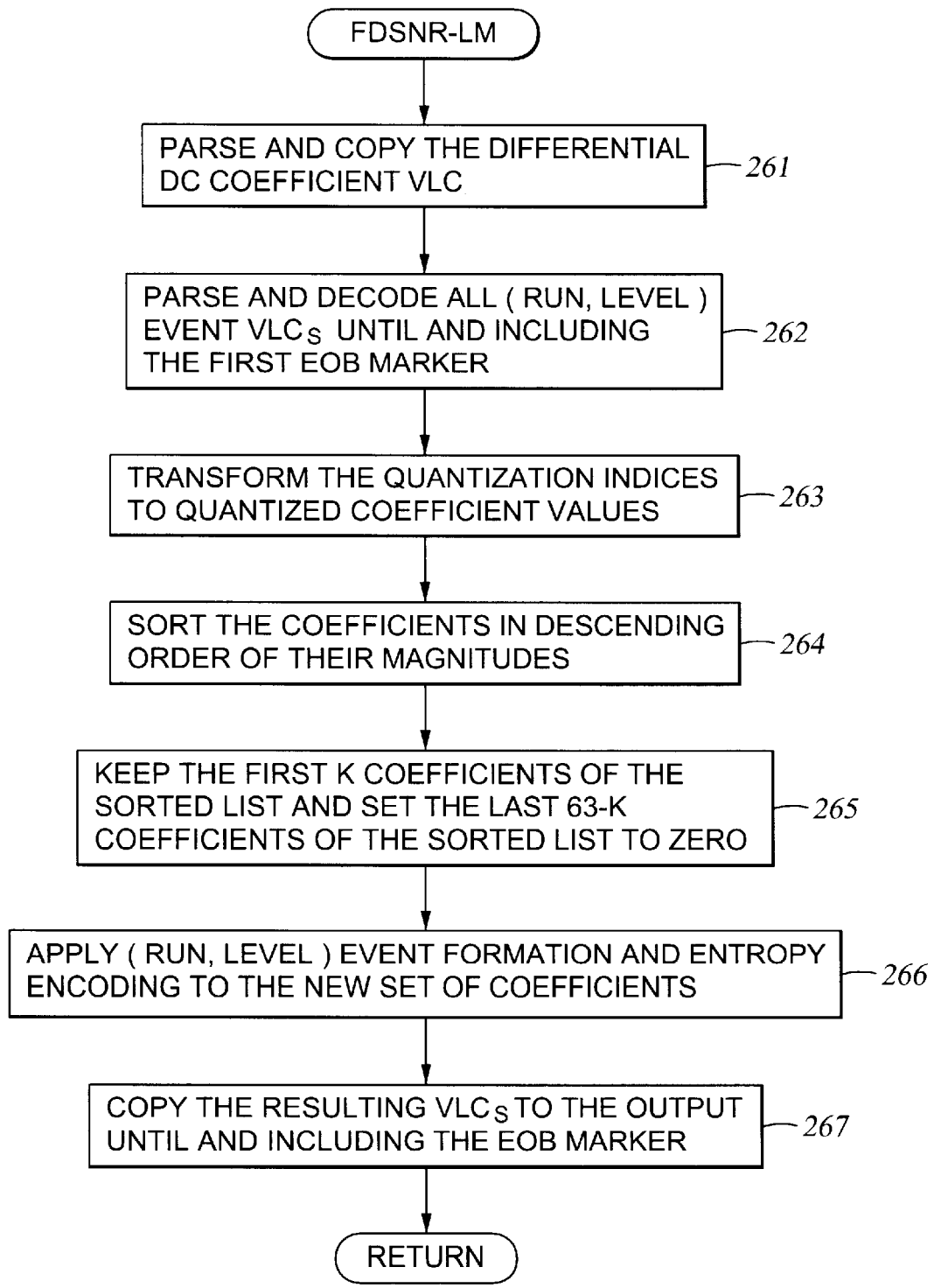
FIG. 15 is a flowchart of a procedure for signal-to-noise ratio scaling MPEG-2 coded video using a frequency-domain largest-magnitude coefficient selection (FDSNR_LM) technique.

FIG. 15 is a flowchart of a procedure for scaling MPEG-2 coded video using the largest magnitude based frequency-domain signal-to-noise ratio (FDSNR_LM) scaling technique. This routine is successively called, and each call processes coefficient data in the input stream for one 8×8 block of pixels. No more than a specified number "k" of largest magnitude AC DCT coefficients are copied for the block, and a different number "k" can be specified for each block.

In a first step 261 in FIG. 15, the procedure parses and copies the input stream of original-quality MPEG-2 coded data to the output stream of lower-quality MPEG-2 data up to and including the differential DC coefficient variable-length code (VLC). Then in step 262 all (run, level) event VLCs are parsed and decoded until and including the EOB marker of the current block. The decoding produces coefficient identifiers and corresponding quantization indices representing the quantized coefficient values. In step 263, the quantization indices are transformed to quantized coefficient values. In step 264, the (quantized) coefficients are sorted in descending order of their magnitudes. In step 265, the first "k" coefficients of the sorted list are preserved and the last 63-k AC DCT coefficients in the sorted list are set to zero. In step 266, (run, level) event formation and entropy coding (VLC encoding) are applied to the new set of coefficient values. Finally, in step 267, the VLCs resulting from step 266 are copied to the output stream until and including the EOB marker.

The sorting step 264 of the FDSNR_LM procedure can consume considerable computational resources. It is important to notice that not a full sorting of the quantized AC coefficients with respect to their magnitudes but rather a search for a specified number "k" of largest magnitude AC coefficients is all that is required. This task can be performed exactly or approximately in different ways so as to avoid the complexity associated with a conventional sorting procedure. In general, a relatively large number of the 63 AC DCT coefficients will have a quantized value of zero. Only the non-zero coefficients need be included in the sorting process. Moreover, if there are "n" non-zero coefficients and only "k" of them having the largest magnitudes are to be preserved in the output stream, then the sorting process may be terminated immediately after only the largest magnitude "k" coefficients have been found, or equivalently immediately after only the smallest magnitude "n-k" coefficients have been found. Moreover, the sorting procedure itself can be different depending on a comparison of "k" to "n" in order to minimize computations.

Figure 16:
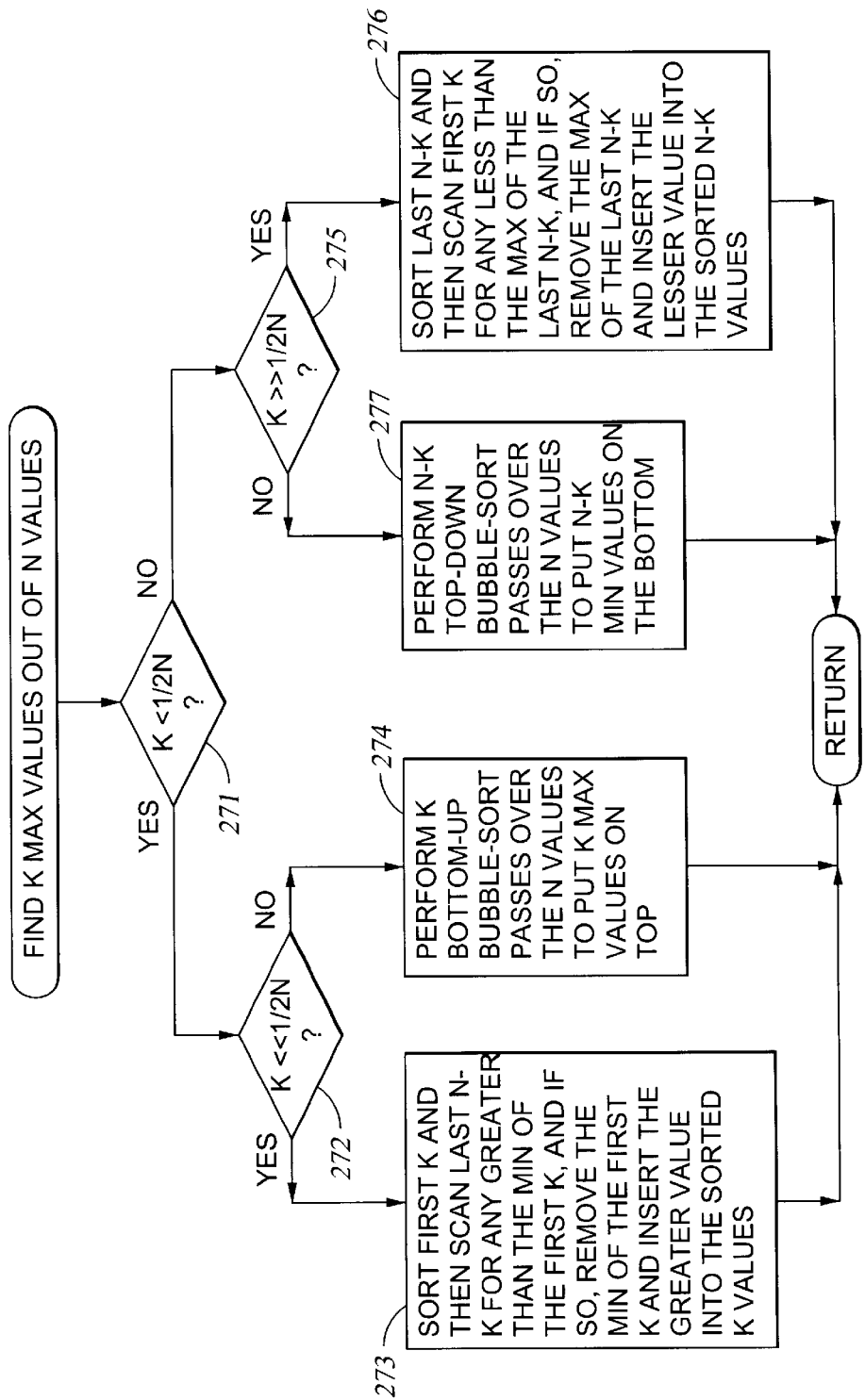
FIG. 16 is a flowchart of a procedure that selects one of a number of techniques for finding a certain number "k" of largest values out of a set of "n" values.

With reference to FIG. 16, there is shown a flowchart of a procedure that selects one of a number of techniques for finding a certain number "k" of largest values out of a set of "n" values. In a first step 271, execution branches to step 272 if "k" is less than ½ "n." In step 272, execution branches to step 273 if "k" is much less than ½ "n." In step 273, the first "k" values are sorted to produce a list of "k" sorted values, and then the last "n-k" values are scanned for any value greater than the minimum of the sorted "k" values. If a value greater than the minimum of the sorted "k" values is found, then that minimum value is removed and the value greater than the minimum value is inserted into the list of "k" sorted values. At the end of this procedure, the list of sorted "k" values will contain the maximum "k" values out of the original "n" values. A specific example of this procedure is described below with reference to FIG. 17.

In step 272, if "k" is not much less than ½ "n", then execution branches to step 274. In step 274, a bubble-sort procedure is used, including "k" bottom-up bubble-sort passes over the "n" values to put "k" maximum values on top of a sorting table. An example of such a bubble-sort procedure is listed below:

```
/* TABLE(0) to TABLE(n-1) INCLUDES n VALUES */
/* MOVE THE k LARGEST OF THE n VALUES IN
   TABLE TO THE RANGE
TABLE(0) TO TABLE(k-1) IN THE TABLE */
/* k<=½ n */
FOR i=1 to k
  FOR j=1 to n-i
    IF (TABLE(n-j)>TABLE(n-j-1)) THEN(
      /* SWAP TABLE(n-j) WITH TABLE(n-j-1) */
      TEMP←TABLE(n-j)
      TABLE(n-j)←TABLE(n-j-1)
      TABLE(n-j-1)←TEMP
    NEXT j
  NEXT I
```

In step 271, if "k" is not less than ½ "n", then execution branches to step 275. In step 275, if "k" is much greater than ½ "n", then execution branches to step 276. In step 276, a procedure similar to step 273 is used, except the "n-k" minimum values are maintained in a sorted list, instead of the "k" maximum values. In step 276, the last "n-k" values are placed in the sort list and sorted, and then the first "k" values are scanned for any value less than the maximum value in the sorted list. If a value less than the maximum value in the sorted list is found, then the maximum value in the sorted list is removed, and the value less than this maximum value is inserted into the sorted list. At the end of this procedure, the values in the sorted list are the "n-k" smallest values, and the "k" values excluded from the sorted list are the "k" largest values.

In step 275, if "k" is not much greater than ½ "n", then execution branches to step 277. In step 277, a bubble-sort procedure is used, including "n-k" top-down bubble-sort passes over the "n" values to put "n-k" minimum values at the bottom of a sorting table. Consequently, the k maximum values will appear in the top "k" entries of the table. An example of such a bubble-sort procedure is listed below:

```
/* TABLE(0) to TABLE(n-1) INCLUDES n VALUES */
/* MOVE THE n-k SMALLEST OF THE n VALUES IN
   THE TABLE */
/* TO THE RANGE TABLE(k) TO TABLE(n-1) IN THE
   TABLE */
/* n>k>=½ n */
FOR i=1 to n-k
  FOR j=0 to n-i-1
    IF (TABLE(j)<TABLE(j+1)) THEN(
      /* SWAP TABLE(j) WITH TABLE(j+1) */
```

```
TEMP←TABLE(j)
TABLE(j)←TABLE(j+1)
TABLE(j+1)←TEMP
NEXT j
NEXT I
```

Figure 17:
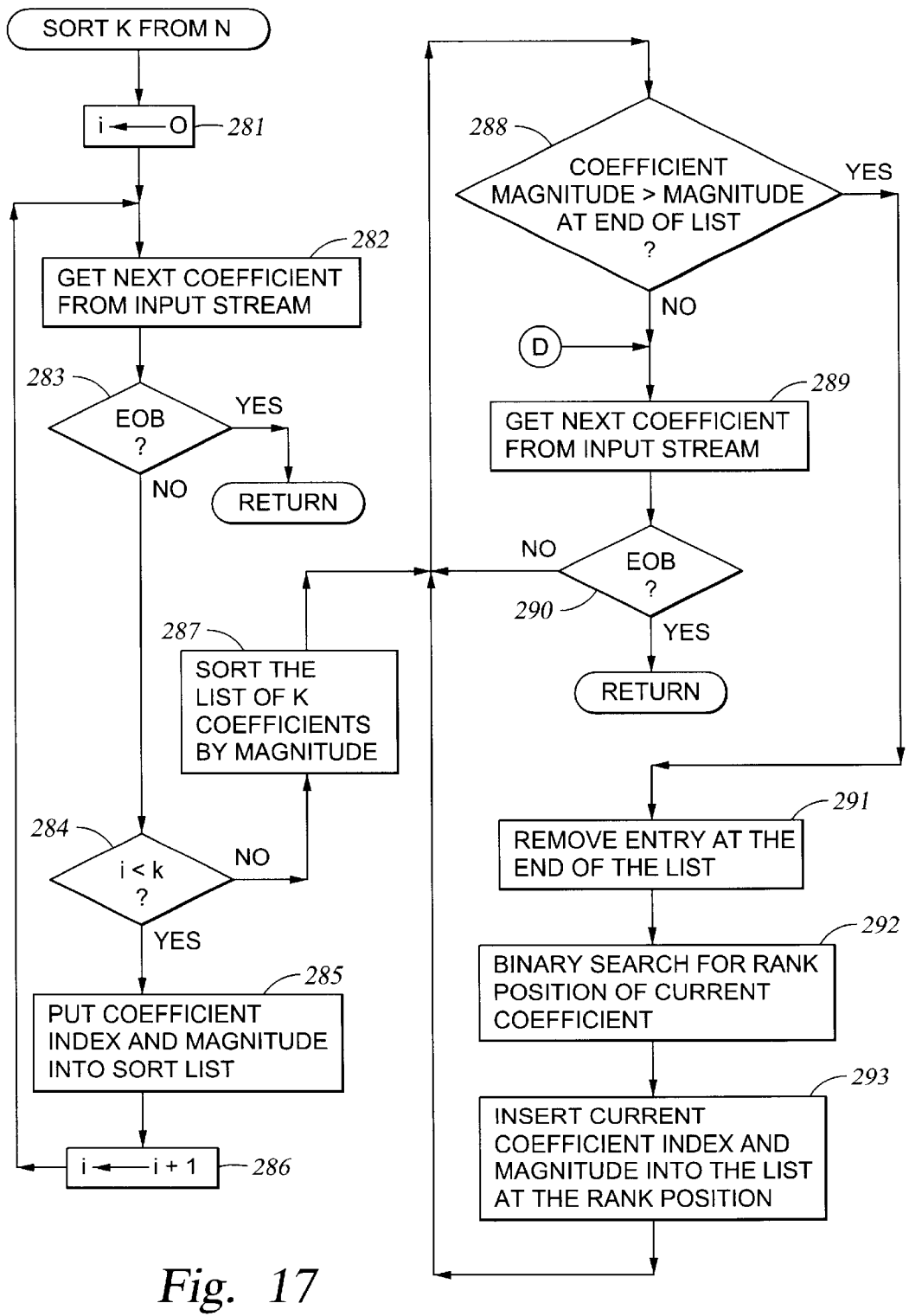
FIG. 17 is a flowchart of a procedure for finding a certain number "k" of largest values from a set of "n" values, which is used in the procedure of FIG. 16 for the case of k<<½ n.

Turning now to FIG. 17, there is shown a flowchart of a procedure for finding up to a specified number "k" of largest magnitude AC DCT coefficients from a set of "n" coefficients, corresponding to the procedure of FIG. 16 for the case of k<<½ n. In a first step 281, a counter "i" is set to zero. In step 282, the next AC DCT coefficient is obtained from the input stream of original-quality MPEG-2 coded data. If an EOB marker is reached, as tested in step 283, then execution returns. In step 284, the counter "i" is compared to the specified number "k", and if "i" is less than "k", execution continues to step 285. In step 285, a coefficient index and magnitude for the AC DCT coefficient is placed on a sort list. In step 286, the counter "i" is incremented, and execution loops back to step 282.

Once the sort list has been loaded with indices and magnitudes for "k" AC DCT coefficients and one additional coefficient has been obtained from the input stream, execution branches from step 284 to step 287. In step 287 the list is sorted by magnitude, so that the minimum magnitude appears at the end of the list. Then in step 288 the coefficient magnitude of the current coefficient last obtained from the input stream is compared to the magnitude at the end of the list. If the coefficient magnitude of the current coefficient is not greater than the magnitude appearing at the end of the list, then execution continues to step 289 to get the next AC DCT coefficient from the input stream. If an EOB marker is reached, as tested in step 290, then execution returns. Otherwise, execution loops back to step 288.

In step 288, if the magnitude of the current coefficient is greater than the magnitude at the end of the list, then execution branches to step 291. In step 291, the entry at the end of the list is removed. In step 292, a binary search is performed to determine the rank position of the magnitude of the current coefficient, and in step 293, the current coefficient index and magnitude are inserted into the list at the rank position. The list, for example, is a linked list in the conventional fashion to facilitate the insertion of an entry for the current coefficient at any position in the list. After step 293, execution loops back to step 288.

Figure 18:
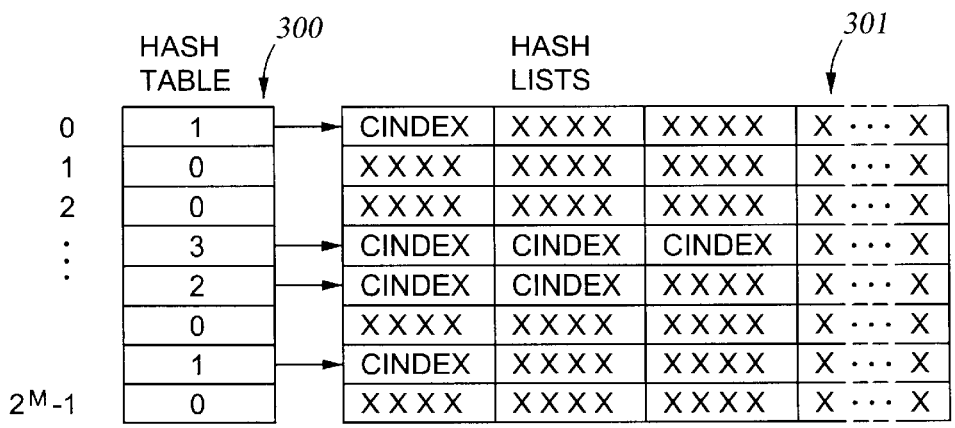
FIG. 18 is a diagram of a hash table and associated hash lists.

An approximation technique of coefficient magnitude classification can be used to reduce the computational burden of sorting by coefficient magnitude. A specific example is the use of hashing of the coefficient magnitude and maintaining lists of the indices of coefficients having the same magnitude classifications. As shown in FIG. 18, a hash table 300 is linked to hash lists 301 storing the indices of classified coefficients. As shown, the hash table 300 is a list of $2^M$ entries, where "M" is three, and an entry has a value of zero if its associated list is empty, and otherwise the entry has a pointer to the end of the coefficients in its associated list. The lists shown in FIG. 18 have fixed memory allocations in which the pointers in the hash table also indicate the number of coefficient indices in the respective hash lists. Alternatively, the hash lists could be dynamically allocated and linked in the conventional fashion.

Figure 19:
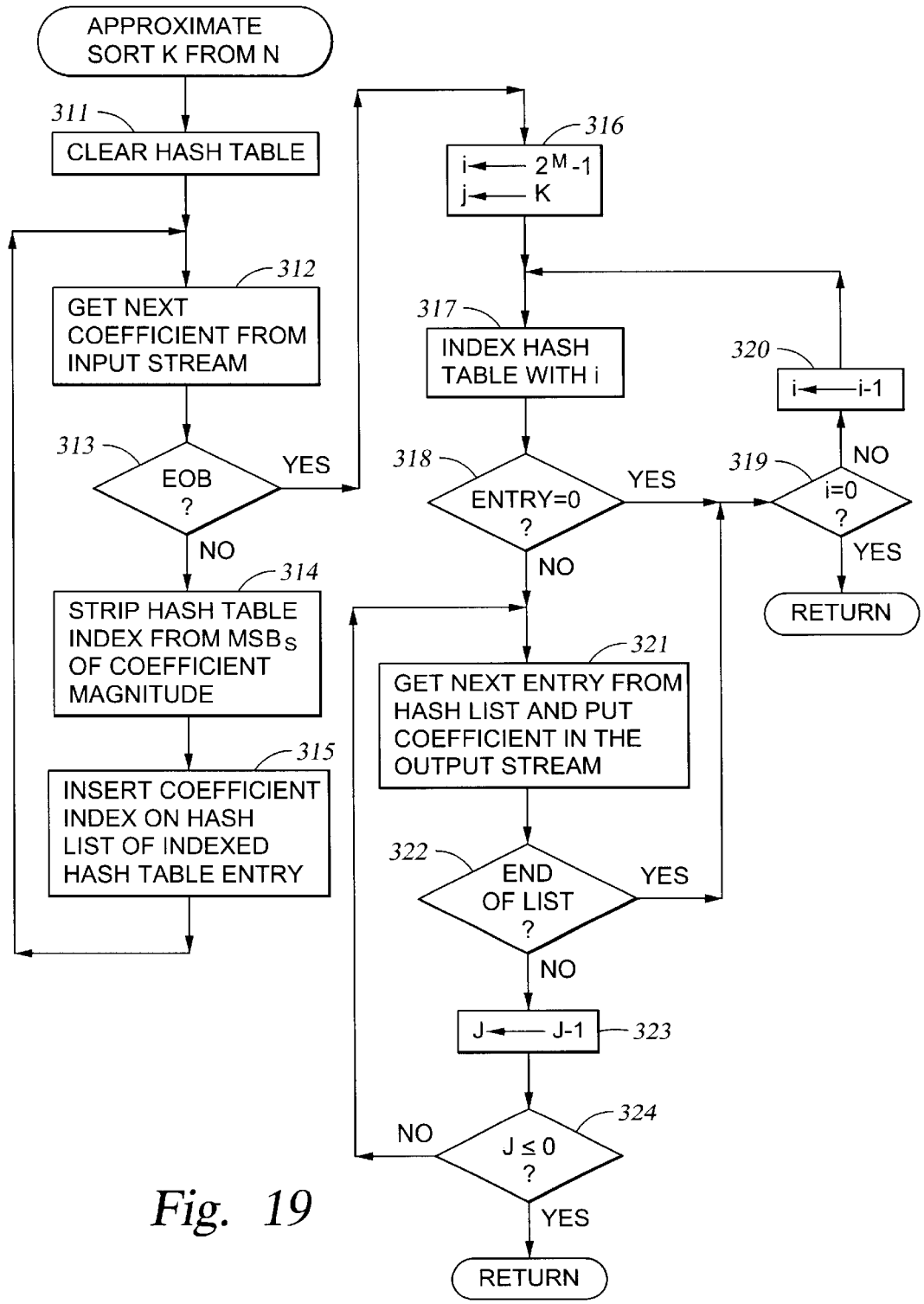
FIG. 19 is a flowchart of a procedure for finding a certain number "k" of values that are not less than the smallest of the "k" largest values in a set of "n" values beyond a certain amount.

FIG. 19 shows a flowchart of a procedure for using the hash table 300 and hash lists 301 of FIG. 18 to perform a sort of "k" coefficients having approximately the largest magnitudes from a set of "n" coefficients. This approximation technique ensures that none of the "k" coefficients selected will have a magnitude that differs by more than a certain error limit from the smallest magnitude value of "k" coefficients having the largest magnitude. The error limit is established by the number of hash table entries, and it is the range of the magnitudes that can be hashed to the same hash table entry.

In a first step 311 in FIG. 19, the hash table is cleared. Then in step 312, the next AC DCT coefficient is obtained from the input stream. If an EOB marker is not reached, as tested in step 313, then execution continues to step 314. In step 314, a hash table index is stripped from the most significant bits (MSBs) of the coefficient magnitude. For the hash table in FIG. 18 having eight entries, the three most significant bits of the coefficient magnitude are stripped from the coefficient magnitude. This is done by a bit masking operation together with a logical arithmetic shift operation. Then in step 315, the coefficient index is inserted on the hash list of the indexed hash table entry. For example, the hash table entry is indexed to find the pointer to where the coefficient index should be inserted, and then the pointer in the hash table entry is incremented. After step 315, execution loops back to step 312. Once all of the AC coefficients for the block have been classified by inserting them in the appropriate hash lists, an EOB marker will be reached, and execution will branch from step 313 to step 316.

Beginning in step 316, the hash table and hash lists are scanned to find approximately the "k" largest magnitude coefficients. The hash lists linked to the bottom entries of the hash table will have the indices j or the largest magnitude coefficients. Each hash list is scanned from its first entry to its last entry, so that each hash list is accessed as a first-in-first-out queue. Therefore, in each magnitude classification, the coefficient ordering in the output stream will be the same as the coefficient ordering in the input stream, and the approximation will have a "low pass" effect in which possibly some lower-frequency coefficients having slightly smaller magnitudes will be retained at the expense of discarding some higher-frequency coefficients having slightly larger magnitudes. (The approximation results from the fact that the last hash list to be scanned is not itself sorted, and to eliminate the error of the approximation, the last hash list to be scanned could be sorted.)

In step 316, a scan index "i" is set to $2^M-1$ in order to index the hash table beginning at the bottom of the table, and a counter "j" is set equal to "k" in order to stop the scanning process after finding "k" coefficients. Next, in step 317, the hash table is indexed with "i". In step 318, if the indexed entry of the hash table is zero, then execution branches to step 319. In step 319, the procedure is finished if "i" is equal to zero; otherwise, execution continues to step 320. In step 320, the index "i" is decremented, and execution loops back to step 317.

If in step 318 the indexed hash table entry is not zero, then execution continues to step 321. In step 321, the next entry is obtained from the indexed hash list, and the coefficient index in the entry is used to put the indexed coefficient in the output stream. Then in step 322 execution branches to step 319 if the end of the indexed hash list is reached in the previous step 321. If the end of the list was not reached in step 321, then execution continues from step 322 to step 323. In step 323 the counter "j" is decremented, and in step 324 the counter "j" is compared to zero. In step 324, if the counter "j" is less than or equal to zero, then the procedure is finished. Otherwise, if the counter "j" is not less than or equal to zero in step 324, execution loops back to step 321.

The FDSNR_LM procedure, as described above, in general provides a significant improvement in peak signal-to-noise ratio (PSNR) over the FDSNR_LP procedure when each procedure retains the same number of non-zero AC DCT coefficients. It has been found, however, that substantially more bits are required for the (run, level) coding of the non-zero AC DCT coefficients resulting from the FDSNR_LM procedure than those resulting from the FDSNR_LP procedure, provided that the same coefficient quantization and scanning method is used. Therefore, the FDSNR_LM procedure provides at best a marginal improvement in rate-distortion (PSNR as a function of bit rate) over the FDSNR_LP procedure unless the non-zero AC DCT coefficients for the FDSNR_LM procedure are quantized, scanned, and/or (run, level) coded in a fashion different from the quantization, scanning, and/or (run, level) coding of the coefficients in the original MPEG-2 clip. A study of this problem resulted in a discovery that it is sometimes possible to reduce the number of bits for (run, level) coding of coefficients for an 8×8 block including a given number of the non-zero largest magnitude AC DCT coefficients if additional coefficients are also (run, level) coded for the block.

The (run, level) coding of the non-zero AC DCT coefficients from the FDSNR_LM procedure has been found to require more bits than from the FDSNR_LP procedure due to an increased occurrence frequency of escape sequences for the (run, level) coding. The increased frequency of escape sequences is an indication that the statistical likelihood of possible (run, level) combinations for the non-zero AC DCT coefficients selected by the FDSNR_LM procedure is different from the statistical likelihood of possible (run, level) combinations for the non-zero AC DCT coefficients produced by the standard MPEG-2 coding process and in particular those selected by the FDSNR_LP procedure.

The MPEG-2 coding scheme assigns special symbols to the (run, level) combinations that occur very frequently in ordinary MPEG-2 coded video. The most frequent (run, level) combinations occur for short run lengths (within the range of about 0 to 5, where the run length can range from 0 to 63) and relatively low levels (about 1 to 10, where the level can range from 1 to 2048). The most frequent of these special symbols are assigned the shortest variable-length code words (VLCs). If a (run, level) combination does not have such a special symbol, then it is coded as an escape sequence including a 6-bit escape sequence header code word followed by a 6-bit run length followed by a 12 bit signed level. An escape sequence requires a much greater number of bits than the special symbols, which have varying lengths depending on their relative frequency. In particular, the escape sequences each have 24 bits, and the special symbols have variable-length code words having a maximum of 17 bits.

There are two (run, level) VLC tables. The first coding table is designated TABLE 0, and the second is designated TABLE 1. These tables specify the (run, level) combinations having special symbols, and the special symbol for each such combination. For each table, the (run, level) combinations having special symbols, and the range of the VLC bit lengths of the special symbols, are summarized below:

SUMMARY OF PROPERTIES OF DCT COEFFICIENT TABLE ZERO (Table Zero is Table B. 14, p. 135 of ISO/IEC 13818-2 1996E)

| Run | Range of Levels | Range of Code Lengths |
|---|---|---|
| 0 | 1 to 40 | 2 to 16 |
| 1 | 1 to 18 | 4 to 17 |
| 2 | 1 to 5 | 5 to 14 |
| 3 | 1 to 4 | 6 to 14 |
| 4 | 1 to 3 | 6 to 13 |
| 5 | 1 to 3 | 7 to 14 |
| 6 | 1 to 3 | 7 to 17 |
| 7 | 1 to 2 | 7 to 13 |
| 8 | 1 to 2 | 8 to 13 |
| 9 | 1 to 2 | 8 to 14 |
| 10 | 1 to 2 | 9 to 14 |
| 11 | 1 to 2 | 9 to 17 |
| 12 | 1 to 2 | 9 to 17 |
| 13 | 1 to 2 | 9 to 17 |
| 14 | 1 to 2 | 11 to 17 |
| 15 | 1 to 2 | 11 to 17 |
| 16 | 1 to 2 | 11 to 17 |
| 17 | 1 | 13 |
| 18 | 1 | 13 |
| 19 | 1 | 13 |
| 20 | 1 | 13 |
| 21 | 1 | 13 |
| 22 | 1 | 14 |
| 23 | 1 | 14 |
| 24 | 1 | 14 |
| 25 | 1 | 14 |
| 26 | 1 | 14 |
| 27 | 1 | 17 |
| 28 | 1 | 17 |
| 29 | 1 | 17 |
| 30 | 1 | 17 |
| 31 | 1 | 17 |

SUMMARY OF PROPERTIES OF DCT COEFFICIENT TABLE ONE (Table One is Table B. 15, p. 139 of ISO/IEC 13818-2 1996E)

| Run | Range of Levels | Range of Code Lengths |
|---|---|---|
| 0 | 1 to 40 | 3 to 16 |
| 1 | 1 to 18 | 4 to 17 |
| 2 | 1 to 5 | 6 to 14 |
| 3 | 1 to 4 | 6 to 14 |
| 4 | 1 to 3 | 7 to 13 |
| 5 | 1 to 3 | 7 to 14 |
| 6 | 1 to 3 | 8 to 17 |
| 7 | 1 to 2 | 8 to 13 |
| 8 | 1 to 2 | 8 to 13 |
| 9 | 1 to 2 | 8 to 14 |
| 10 | 1 to 2 | 8 to 14 |
| 11 | 1 to 2 | 9 to 17 |
| 12 | 1 to 2 | 9 to 17 |
| 13 | 1 to 2 | 9 to 17 |
| 14 | 1 to 2 | 10 to 17 |
| 15 | 1 to 2 | 10 to 17 |
| 16 | 1 to 2 | 11 to 17 |
| 17 | 1 | 13 |
| 18 | 1 | 13 |
| 19 | 1 | 13 |
| 20 | 1 | 13 |
| 21 | 1 | 13 |
| 22 | 1 | 14 |
| 23 | 1 | 14 |
| 24 | 1 | 14 |

-continued

| Run | Range of Levels | Range of Code Lengths |
|-----|-----------------|----------------------|
| 25  | 1               | 14                   |
| 26  | 1               | 14                   |
| 27  | 1               | 17                   |
| 28  | 1               | 17                   |
| 29  | 1               | 17                   |
| 30  | 1               | 17                   |
| 31  | 1               | 17                   |

The FDSNR_LP procedure selected AC DCT coefficients have (run, level) symbol statistics that are similar to the statistics of ordinary MPEG-2 coded video, and therefore the FDSNR_LP AC DCT coefficients have a similar frequency of occurrence for escape sequences in comparison to the ordinary MPEG-2 coded video. In contrast, the FDSNR_LM procedure selects AC DCT coefficients resulting in (run, level) combinations that are less likely than the combinations for ordinary MPEG-2 coded video. This is due to two reasons. First, the FDSNR_LM procedure selects AC DCT coefficients having the highest levels. Second, the FDSNR_LM procedure introduces higher run lengths due to the elimination of coefficients over the entire range of coefficient indices. The result is a significantly increased rate of occurrence for escape sequences. Escape sequences form the most inefficient mode of coefficient information encoding in MPEG-2 incorporated into the standard so as to cover important but very rarely occurring coefficient information.

In order to improve the rate-distortion performance of the scaled-quality MPEG-2 coded video from the FDSNR_LM procedure, the non-zero AC DCT coefficients selected by the FDSNR_LM procedure should be quantized, scanned, and/or (run, level) coded in such a way that tends to reduce the frequency of the escape sequences. For example, if the original-quality MPEG-2 coded video was (run, level) coded using TABLE 0, then the largest magnitude coefficients should be re-coded using TABLE 1 because TABLE 1 provides shorter length VLCs for some (run, level) combinations having higher run lengths and higher levels. It is also possible that re-coding using the alternate scan method instead of the zig-zag scan method may result in a lower frequency of occurrence for escape sequences. For example, each picture could be (run, level) coded for both zig-zag scanning and alternate scanning, and the scanning method providing the fewest escape sequences, or the least number of bits total, could be selected for the coding of the reduced-quality coded MPEG video.

There are two methods having general applicability for reducing the frequency of escape sequences resulting from the FDSNR_LM procedure. The first method is to introduce a non-zero, "non-qualifying" AC DCT coefficient of the 8×8 block into the list of non-zero qualifying AC DCT coefficients to be coded for the block. In this context, a "qualifying" coefficient is one of the k largest magnitude coefficients selected by the FDSNR_LM procedure. The non-qualifying coefficient referred to above, must be lying in between two qualifying AC DCT coefficients (in the coefficient scanning order) that generate the (run, level) combination causing the escape sequence. Moreover, this non-qualifying coefficient must cause the escape sequence to be replaced with two shorter length VLCs when the AC DCT coefficients are (run, level) coded. This first method has the effect of not only decreasing the number of bits in the coded reduced-quality MPEG video in most cases, but also increasing the PSNR.

The qualifying AC DCT coefficient causing the escape sequence that is first in the coefficient scanning order will be simply referred to as the first qualifying coefficient. The qualifying AC DCT coefficient causing the escape sequence that is second in the coefficient scanning order will be simply referred to as the second qualifying coefficient. For example, suppose the qualifying coefficients in zig-zag scan order for an 8×8 block include $C_{51}$ followed by $C_{15}$ having a level of 40. If only the qualifying coefficients were (run, level) coded for the microblock, $C_{15}$ would result in a run length of 3, because there are a total of three non-qualifying coefficients ($C_{42}$, $C_{33}$, and $C_{24}$) between $C_{51}$ and $C_{15}$ in the scan order. Therefore, $C_{15}$ would have to be coded as an escape sequence, because a run of 3 and level of 40 does not have a special symbol. In this example, the escape sequence is in effect caused by a first qualifying coefficient, which is $C_{51}$, and a second qualifying coefficient, which is $C_{15}$. This escape sequence can possibly be eliminated say, if $C_{24}$ is a non-zero, non-qualifying coefficient of the block, $C_{24}$ has a level of 5 or less, and $C_{24}$ is (run, level) coded together with the qualifying coefficients. For example, assuming that $C_{24}$ has a level of 5, and using the MPEG-2 (run, level) coding TABLE 1, then $C_{24}$ has a run length of two and is coded as the special symbol 0000 0000 1010 0s, where "s" is a sign bit, and $C_{15}$ now has a run length of 0 and is coded as the special symbol 0000 0000 0010 00s. Such a consideration clearly applies to the rest of the non-zero non-qualifying coefficients lying in between the two qualifying coefficients producing the escape sequence. In the above example, these non-qualifying coefficients are $C_{42}$ and $C_{33}$.

Whether or not an escape sequence can be eliminated from the (run, level) coding of the qualifying coefficients can be determined by testing a sequence of conditions. The first condition is that the second qualifying coefficient must have a level that is not greater than the maximum level of 40 for the special (run, level) symbols. If this condition is satisfied, then there must be a non-zero non-qualifying AC DCT coefficient that is between the first and second qualifying coefficients in the coefficient scanning order. If there is such a non-qualifying coefficient, then the combination of its level and the run length between the first qualifying coefficient and the non-qualifying coefficient in the coefficient scanning order must be one of the special (run, level) symbols. If so, then the combination of the level of the second qualifying coefficient and the run length between the non-qualifying coefficient and the second qualifying coefficient must also be a special (run, level) symbol, and if so, all required conditions have been satisfied. If not, then the conditions with respect to the non-qualifying coefficient are successively applied to any other non-zero non-qualifying AC DCT coefficient of the block lying in between the two qualifying coefficients, until either all conditions are found to be satisfied or all such non-qualifying coefficients are tested and failed. If there are sufficient computational resources, this search procedure should be continued to find all such non-qualifying coefficients that would eliminate the escape sequence, and to select the non-qualifying coefficient that converts the escape sequence to the pair of special symbols having respective code words that in combination have the shortest length.

Figure 20:
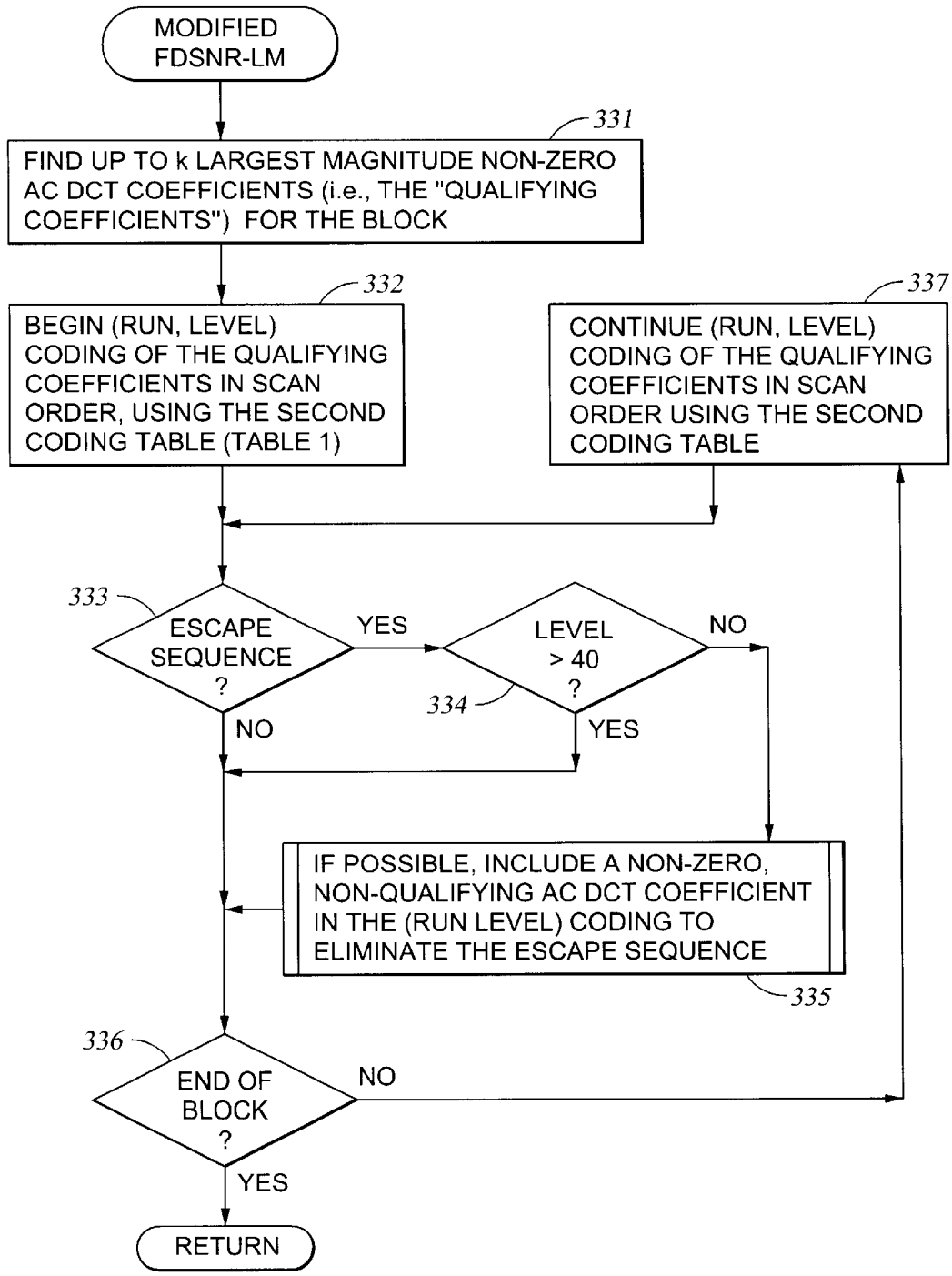
FIG. 20 is a flowchart of modification of the procedure of FIG. 15 in order to possibly eliminate escape sequences in the (run, level) coding of the largest magnitude coefficients.
Figure 21:
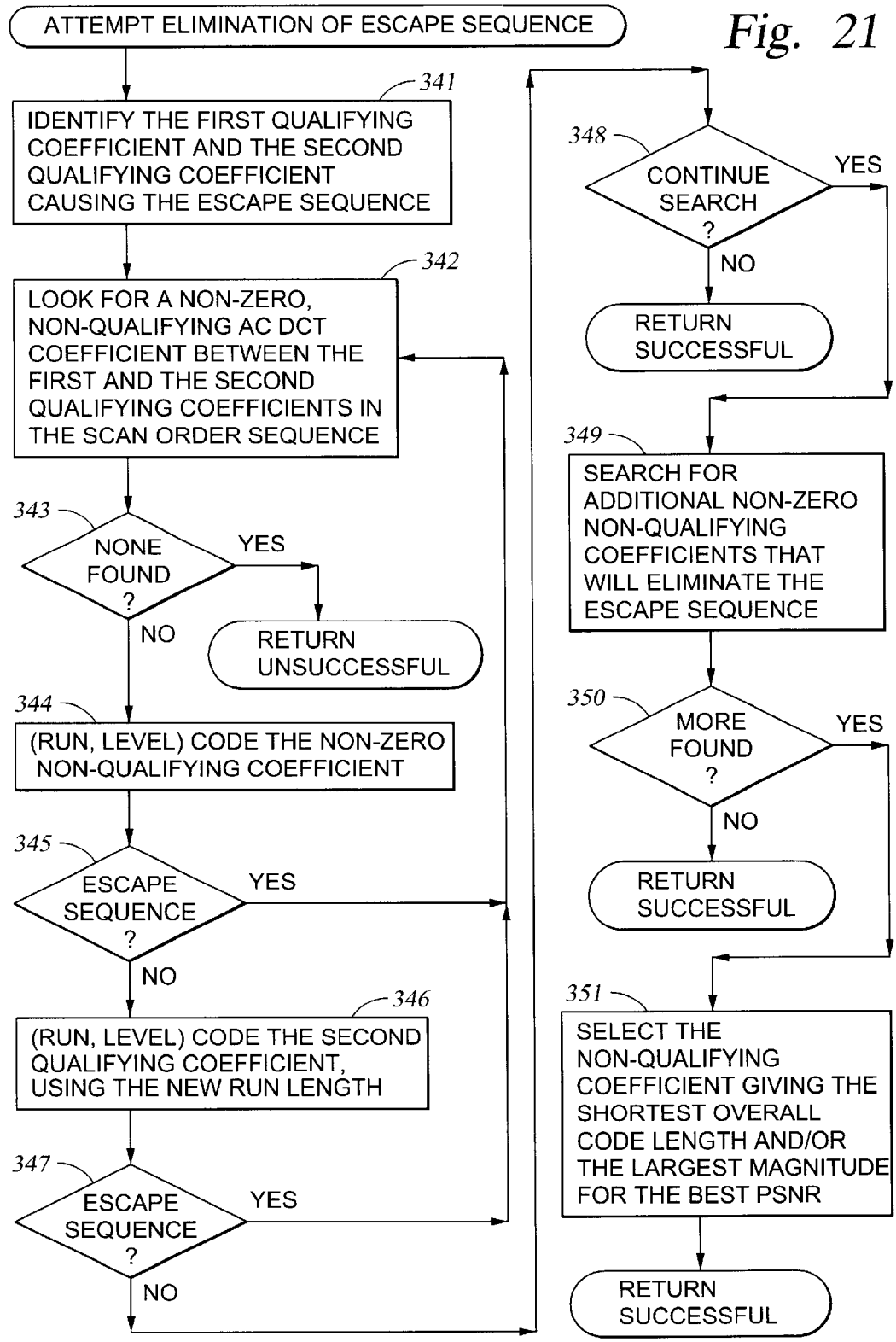
FIG. 21 is a flowchart of a subroutine called in the flowchart of FIG. 20 in order to possibly eliminate an escape sequence.
Figure 22:
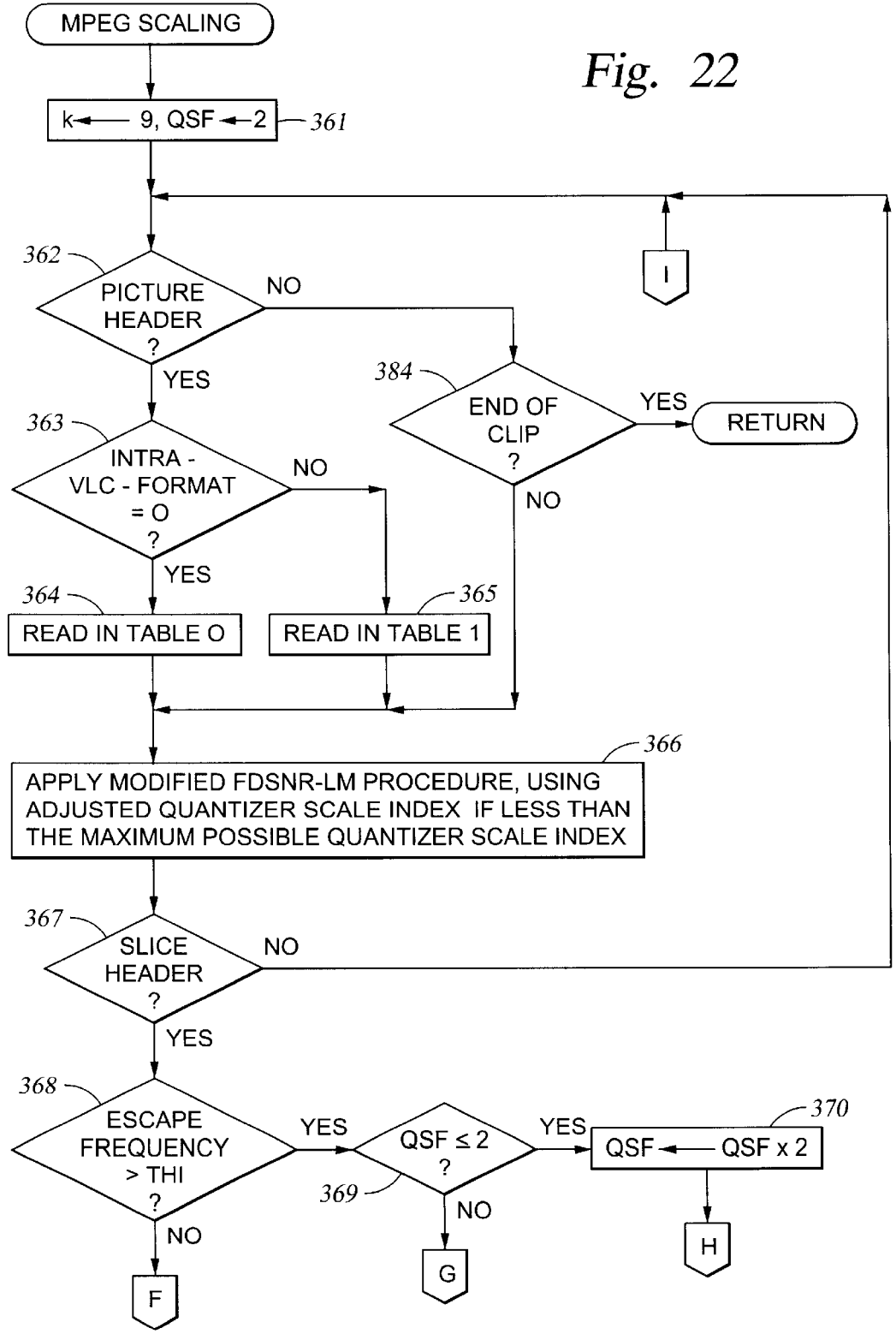
FIG. 22 is a first portion of a flowchart of a procedure for scaling an MPEG-2 coded video data stream using the modified procedure of FIG. 20 while adjusting the parameter "k" to achieve a desired bit rate, and adjusting a quantization scaling factor (QSF) to achieve a desired frequency of occurrence of escape sequences.

A flow chart for a modified FDSNR_LM procedure using the first method is shown in FIGS. 20 and 21. In a first step 331 of FIG. 20, the procedure finds up to "k" largest magnitude non-zero AC DCT coefficients (i.e., the "qualifying coefficients") for the block. (This first step 331 is similar to steps 261 to 265 of FIG. 15, as described above.) In step 332, (run, level) coding of the qualifying coefficients is begun in the scan order using the second coding table (Table 1). This (run, level) coding continues until an escape sequence is reached in step 333, or the end of the block is reached in step 336. If an escape sequence is reached, execution branches from step 333 to step 334. If the level of the second qualifying coefficient causing the escape sequence is greater than 40, execution continues from step 334 to step 336. Otherwise, execution branches from step 334 to step 335 to invoke a subroutine (as further described below with reference to FIG. 21) to possibly include a non-zero non-qualifying AC DCT coefficient in the (run, level) coding to eliminate the escape sequence. The subroutine either returns without success, or returns such a non-qualifying coefficient so that the escape sequence is replaced with the two new (run, level) codings of the first qualifying coefficient and the non-qualifying coefficient and then the non-qualifying coefficient and the second qualifying coefficient. From step 335, execution continues to step 336. Execution returns from step 336 if the end of the block is reached. Otherwise, execution continues from step 336 to step 337, to continue (run, level) coding of the qualifying coefficients in the scan order using the second coding table (TABLE 1). This (run, level) coding continues until an escape sequence results, as tested in step 333, or until the end of the block is reached, as tested in step 336.

With reference to FIG. 21, there is shown a flow chart of the subroutine (that was called in step 335 of FIG. 20) for attempting to find a non-zero, non-qualifying AC DCT coefficient that can be (run, level) coded to eliminate an escape sequence for a qualifying coefficient. In a first step 341, the procedure identifies the first qualifying coefficient and the second qualifying coefficient causing the escape sequence. For example, the subroutine of FIG. 21 can be programmed as a function having, as parameters, a pointer to a list of the non-zero AC DCT coefficients in the scan order, an index to the first qualifying coefficient in the list, and an index to the second qualifying coefficient in the list. In step 342, the subroutine looks for a non-zero non-qualifying AC DCT coefficient between the first and the second qualifying coefficients in the scan order. For example, the value of the index to the first qualifying coefficient is incremented and compared to the value of the index for the second qualifying coefficient, and if they are the same, there is no such non-qualifying coefficient. Otherwise, if the new coefficient pointed to (by incrementing the index of the first qualifying coefficient) is a non-zero coefficient then it becomes a candidate non-qualifying coefficient deserving further testing. If however the new coefficient pointed to (by incrementing the index of the first qualifying coefficient) has a value zero then it is not a candidate non-qualifying coefficient. If no such (candidate) non-qualifying coefficients are found, as tested in step 343, then execution returns from the subroutine with a return code indicating that the search has been unsuccessful. Otherwise, execution continues to step 344.

In step 344, the non-qualifying coefficient is (run, level) coded, to determine in step 345 whether it codes to an escape sequence. If it codes to an escape sequence, then execution loops back from step 345 to step 342 to look for another non-zero non-qualifying AC DCT coefficient in the scan order between the first and second qualifying coefficients. If it does not code to an escape sequence, then execution continues from step 345 to step 346. In step 346, the second qualifying coefficient is (run, level) coded, using the new run length, which is the number of coefficients in the scan order between the non-qualifying coefficient and the second qualifying coefficient. If it codes to an escape sequence, as tested in step 347, then execution loops back from step 347 to step 342 to look for another non-zero non-qualifying AC DCT coefficient in the scan order between the first and second qualifying coefficients. If it does not code to an escape sequence, then execution continues from step 347 to step 348.

In step 348, execution returns with a successful search result unless a continue search option has been selected. If the continue search option has been selected, then execution branches from step 348 to step 349 to search for additional non-zero non-qualifying AC DCT coefficients that would eliminate the escape sequence. In other words, steps 342 to 347 are repeated in an attempt to find additional non-zero non-qualifying AC DCT coefficients that would eliminate the escape sequence. If no more such non-qualifying coefficients are found, as tested in step 350, execution returns with a successful search result. Otherwise, execution branches from step 350 to step 351 to select the non-qualifying coefficient giving the shortest overall code word length and/or the largest magnitude for the best PSNR, and execution returns with a successful search result. For example, for each non-qualifying coefficient that would eliminate the escape sequence, the total bit length is computed for the (run, level) coding of the non-qualifying coefficient and the second qualifying coefficient. Then a search is made for the non-qualifying coefficient producing the shortest total bit length, and if two non-qualifying coefficients which produce the same total bit length are found, then the one having the largest level is selected for the elimination of the escape sequence.

A second method of reducing the frequency of occurrence of the escape sequences in the (run, level) coding of largest magnitude AC DCT coefficients for an 8×8 block is to change the mapping of coefficient magnitudes to the levels so as to reduce the levels. Reduction of the levels increases the likelihood that the (run, level) combinations will have special symbols and therefore will not generate escape sequences. This second method has the potential of achieving a greater reduction in bit rate than the first method, because each escape sequence can now be replaced by the codeword for one special symbol, rather than by the two codewords as is the case for the first method. The second method, however, may reduce the PSNR due to increased quantization noise resulting from the process producing the lower levels. Therefore, if a desired reduction of escape sequences can be achieved using the first method, then there is no need to perform the second method, which is likely to reduce the PSNR. If the first method is used but not all of the escape sequences have been eliminated, then the second method could be used to possibly eliminate the remaining escape sequences.

The mapping of coefficient magnitudes to the levels can be changed by decoding the levels to coefficient magnitudes, changing the quantization scale factor (qsi), and then re-coding the levels in accordance with the new quantization scale factor (qsi). The quantization scale factor is initialized in each slice header and can also be updated in the macroblock header on a macroblock basis. Therefore it is a constant for all blocks in the same macroblock In particular, the quantization scale factor is a function of a q_scale_type parameter and a quantizer_scale_code parameter. If q_scale_type=0, then the quantizer scale factor (qsi) is twice the value of q_scale_code. If q_scale_type=1, then the quantizer scale factor (qsi) is given by the following table, which is the right half of Table 7-6 on page 70 of ISO/IEC 13838-2:1996(E):

| quantizer scale code | quantization scale factor (qsi) |
| --- | --- |
| 1 | 1 |
| 2 | 2 |
| 3 | 3 |
| 4 | 4 |
| 5 | 5 |
| 6 | 6 |
| 7 | 7 |
| 8 | 8 |
| 9 | 10 |
| 10 | 12 |
| 11 | 14 |
| 12 | 16 |
| 13 | 18 |
| 14 | 20 |
| 15 | 22 |
| 16 | 24 |
| 17 | 28 |
| 18 | 32 |
| 19 | 36 |
| 20 | 40 |
| 21 | 44 |
| 22 | 48 |
| 23 | 52 |
| 24 | 56 |
| 25 | 64 |
| 26 | 72 |
| 27 | 80 |
| 28 | 88 |
| 29 | 96 |
| 30 | 104 |
| 31 | 112 |

In a preferred implementation, to reduce the coefficient levels, the quantization scale factor is increased by a factor of two, and the levels of the non-zero AC DCT coefficients are reduced by a factor of two, so long as the original value of the quantization scale factor is less than or equal to one-half of the maximum possible quantization scale factor. For q_scale_type=1, a factor of two increase in the quantization scale factor (qsi) is most easily performed by a table lookup of a new quantization_scale_code using the following conversion table:

| Original quantization scale code | New quaitization scale code |
| --- | --- |
| 1 | 2 |
| 2 | 4 |
| 3 | 6 |
| 4 | 8 |
| 5 | 9 |
| 6 | 10 |
| 7 | 11 |
| 8 | 12 |
| 9 | 14 |
| 10 | 16 |
| 11 | 17 |
| 12 | 18 |
| 13 | 19 |
| 14 | 20 |
| 15 | 21 |
| 16 | 22 |
| 17 | 24 |
| 18 | 25 |
| 19 | 26 |
| 20 | 27 |
| 21 | 28 |
| 22 | 29 |
| 23 | 30 |
| 24 | 31 |

In a preferred method for generation of trick mode files, the quantization scale factor is adjusted in order to achieve a desired reduction in the escape sequence occurrence frequency resulting from the modified FDSNR_LM procedure, and the number (k) of largest magnitude coefficients is adjusted in order to achieve a desired reduction in bit rate. A specific implementation is shown in the flow chart of FIGS. 22–23. In a first step 361, the number (k) of largest magnitude AC coefficients per 8×8 block is initially set to a value of 9, and the quantization scaling factor (QSF) is initially set to a value of 2. Then conversion of the I frames of an original-quality MPEG-2 coded video clip to a lower quality level begins. When a picture header is encountered in step 362, indicating the beginning of a new I frame, execution continues to step 363. In step 363, execution branches depending on the value of the intra_vlc_format parameter in the picture header of the original-quality MPEG-2 coded video clip. This value is either 0, indicating that the first (run, level) coding table (TABLE 0) was used for coding the picture, or 1, indicating that the second (run, level) coding table (TABLE 1) was used for coding the picture. In either case, the down scaled quality picture will be coded with the second (run, level) coding table. If the intra_vlc_format parameter is equal to 0 execution continues from step 363 to step 364 where TABLE 0 is read in for (run, level) symbol decoding in the original-quality MPEG-2 coded clip. Otherwise, if the intra_vlc_format parameter is equal to 1, then execution continues from step 363 to step 365 where TABLE 1 is read in for (run, level) symbol decoding in the original-quality MPEG-2 coded clip.

After steps 364 and 365, execution continues to step 366. In step 366, the modified FDSNRS_LM procedure is applied to the 8×8 blocks of the current slice, using the adjusted quantization scale index, if the adjusted quantization scale index is less than the maximum possible quantization scale index. In step 367, execution loops back to step 362 to continue 8×8 block conversion until a new slice header is encountered, indicating the beginning of a new slice. Once a new slice is encountered, execution continues from step 367 to step 368. In step 368, the average escape sequence occurrence frequency per block for the last slice is compared to a threshold TH1. If the escape sequence occurrence frequency is greater than the threshold, then execution branches to step 369. In step 369, if the quantization scaling factor (QSF) is less than or equal to a limit value such as 2, then execution branches to step 370 to increase the quantization scaling factor (QSF) by a factor of two.

Figure 23:
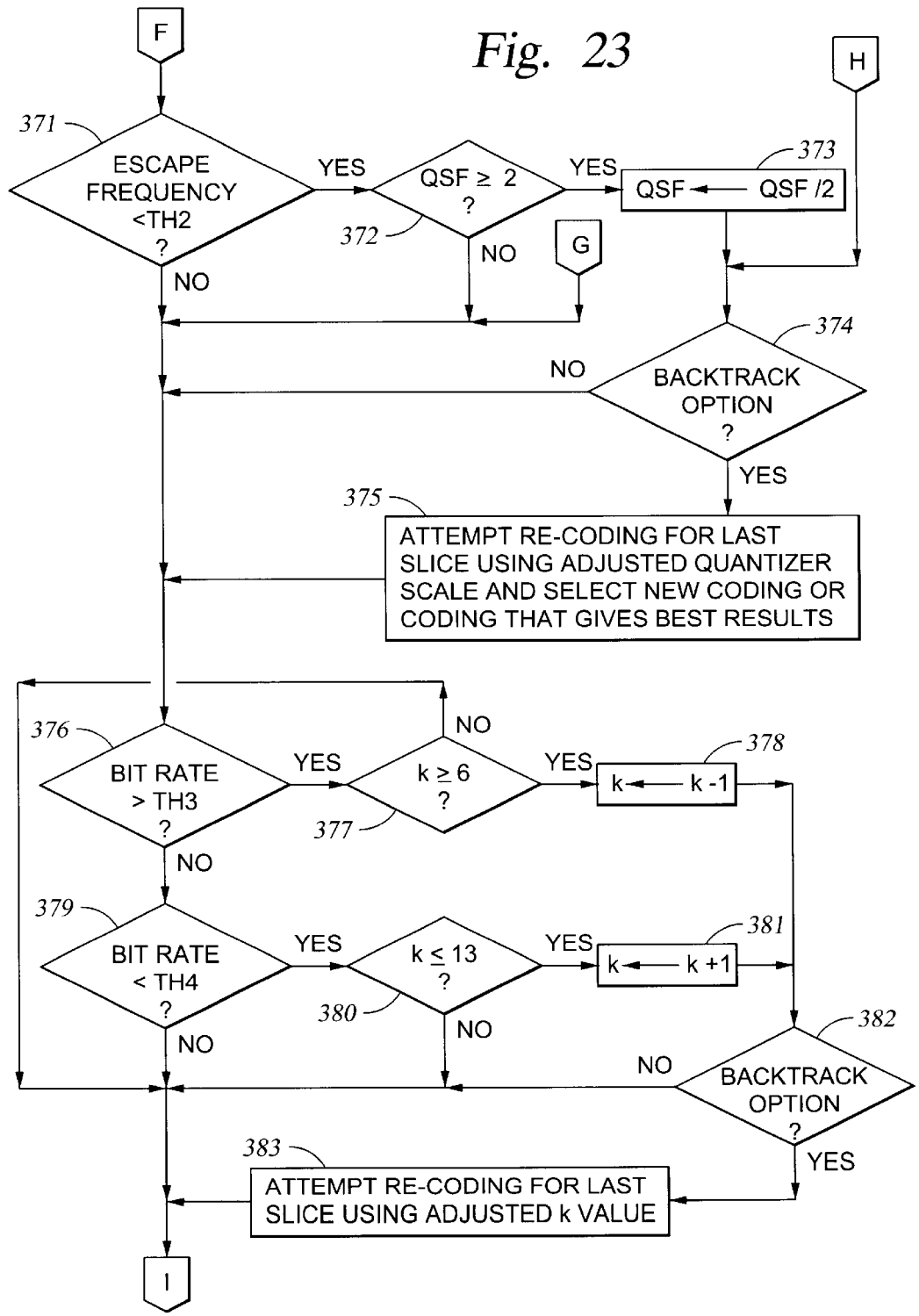
FIG. 23 is a second portion of the flowchart begun in FIG. 22.

In step 368, if the escape sequence occurrence frequency is not greater than the threshold TH1, then execution continues to step 371 of FIG. 23. In step 371, the average escape sequence occurrence frequency per 8×8 block for the last slice is compared to a threshold TH2. If the escape sequence occurrence frequency is less than the threshold TH2, then execution branches to step 372. In step 372, if the quantization scaling factor (QSF) is greater than or equal to a limit value such as 2, then execution branches to step 373 to decrease the quantization scaling factor (QSF) by a factor of two. After step 373, and also after step 370 of FIG. 22, execution continues to step 374 of FIG. 23. In step 374, execution continues to step 375 if a backtrack option has been selected. In step 375, re-coding for the last slice is attempted using the adjusted quantization scale factor. The new coding, or the coding that gives the best results in terms of the desired reduction of escape sequence occurrence frequency, is selected for use in the scaled quality picture. After step 375, execution continues to step 376. Execution also continues to step 376 from: step 369 in FIG. 22 if the quantization scaling factor (QSF) is not less than or equal to 2; step 371 in FIG. 23 if the escape sequence occurrence frequency is not less than the threshold TH2; step 372 in FIG. 23 if the quantization scaling factor (QSF) is not greater than or equal to 2; and from step 374 in FIG. 23 if the backtrack option has not been selected.

In step 376, the average bit rate of the (run, level) coding per 8×8 block for at least the last slice is compared to a high threshold TH3. Preferably this average bit rate is a running average over the already processed segment of the current scaled quality I-frame, and the high threshold TH3 is selected to prevent video buffer overflow in accordance with the MPEG-2 Video Buffer Verifier restrictions. If the average bit rate exceeds the high threshold TH3, then execution continues to step 377, where the number (k) of non-zero largest magnitude AC coefficients per 8×8 block is compared to a lower limit value such as 6. If the number (k) is greater than or equal to 6, then execution continues to step 378 to decrement the number (k).

In step 376, if the average bit rate is not greater than the threshold TH3, then execution continues to step 379. In step 379, the average bit rate is compared to a lower threshold TH4. If the average bit rate is less than the threshold TH4, then execution branches from step 379 to step 380, where the number (k) of non-zero largest magnitude AC DCT coefficients per 8×8 block is compared to a limit value of 13. If the number (k) is less than or equal to 13, then execution continues to step 381 to increment the number (k). After step 378 or 381, execution continues to step 382. In step 382, execution continues to step 383 if a backtrack option is selected. In step 383, an attempt is made to re-code the last slice for the scaled quality picture using the adjusted value of the number (k) of non-zero largest magnitude AC DCT coefficients per block. After step 383, execution loops back to step 362 of FIG. 22 to continue generation of the scaled quality clip. Execution also loops back to step 362 of FIG. 22 after: step 377 if the value of (k) is not greater than or equal to 6; step 379 if the average bit rate is not less than the threshold TH4; step 380 if the value of (k) is not less than or equal to 13; and step 382 if the backtrack option has not been selected. Coding of the scaled quality clip continues until the end of the original quality clip is reached in step 364 of FIG. 22, in which case execution returns.

In a preferred implementation, a fast forward trick mode file and a fast reverse trick mode file are produced from an original-quality MPEG-2 coded video main file when the main file is ingested into the video file server. As shown in FIG. 24, a volume generally designated 390 is allocated to store the main file 391. The volume 390 includes an allocated amount of storage that exceeds the real file size of the main file 391 in order to provide additional storage for meta-data 392, the fast forward trick file 393, and the fast reverse trick file 394. The trick files are not directly accessible to clients as files; instead, the clients may access them thorough trick-mode video service functions. With this strategy, the impact on the asset management is a minimum. No modification is needed for delete or rename functions.

Because the volume allocation is done once for the main file and its fast forward and fast reverse trick mode files, there is no risk of lack of disk space for production of the trick files. The amount of disk blocks to allocate for these files is computed by the video service using a volume parameter (vsparams) specifying the percentage of size to allocate for trick files. A new encoding type is created in addition to types RAW for direct access and MPEG2 for access to the main file. The new encoding type is called EMPEG2, for extended MPEG2, for reference to the main file plus the trick files. The video service allocates the extra file size only for these files.

For the transfer of these files to archive or to another video file server, it would be useful to transfer all the data even if it is a non-standard format. For the FTP copy-in, a new option is added to specify if the source is in the EMPEG2 format or if it is a standard MPEG2 file. In the first case, the copy-in should provide the complete file 390. In the second case, the video service allocates the extra size and the processing is the same as for a record. For the copy-out, the same option can be used to export the complete file 390 or only the main part 391. The archiving is always done on the complete file 390.

The trick mode file production is done by a new video service procedure. This procedure takes as input the speed-up factor (or the target trick mode file size) along with the number of freeze (P or B) frames to insert in between the scaled I frames and then generates both the fast forward file 393 and the fast reverse file 394 for this speed-up factor (or target trick mode file size) and with the specified number of interleaving freeze frames. Since the bandwidth of the original clip (in the main file) and the bandwidths of the two trick mode clips (in the fast forward and fast reverse files) are the same, the speed-up factor and the target trick mode file size are equivalent pieces of information. A default speed-up factor (system parameter) can be used. The main file is read and the trick mode files are produced. If a trick mode file already exists with the same speed-up factor, it is rewritten or nothing is done depending on an option. Multiple trick mode files could be created with different speed-up factors. But it is preferred to permit only one set of fast forward and fast reverse trick mode files to be produced at a time (i.e., no parallel generation with different speed-up factors). The current speed-up factor is a parameter of the volume parameters (vsparams).

As stated above another parameter to be provided to the video service procedure in charge of trick mode file generation is the number of freeze frames to be inserted in between consequent scaled I frames. The preferred values for this parameter are 0 and 1, although other positive integer values greater than I are also possible. The inclusion of freeze frames due to their very small sizes spare some bandwidth which can then be used to improve the quality of scaled I frames. Hence, the freeze frames in this context provide a mechanism to achieve a trade-off between the scaled I frame quality and the temporal (motion) sampling. Depending on the speed-up factor (or the target trick mode file size) and also the number of interleaving freeze frames to be inserted, the video service procedure in charge of trick mode file generation determines a sub-sampling pattern (closest to uniform) to choose the original I frames which will be scaled and included in the trick mode files. For example, the case of an original clip with 10 frames per GOP, a trick mode file size which is 10% of the main file together with 0 freeze frames, implies the use of all original I frames for being scaled and included in the trick mode file. This will typically result in a low quality scaling. As another example, the case of an original clip with 10 frames per GOP, a trick mode file size which is 10% of the main file together with I freeze frame, implies the use of a 2 to 1 (2:1) sub-sampling on the original I frames which will choose every other original I frame for being scaled and included in the trick mode file.

FIG. 25 is a more detailed diagram of the volume 390, showing additional meta-data and related data structures. The I node 401 includes 4 disk blocks containing a file-system oriented description of the file. The Meta-data (MD) directory 402 includes 4 disk blocks describing each entry of the meta-data area 392. The entries of the meta-data area 392 include a description of the MPEG-2 meta-data 403, a description of the trick files header meta-data 404, and a description of the GOP index meta-data 405. The MPEG-2 meta-data 403 includes 15 disk blocks maximum.

The trick files header 404 includes I disk block, which specifies the beginning of free area (end of last trick file) in blocks, the number of trick files couple (FF FR), and for each trick file, a speed-up factor, a block address of the GOP index, a block address of the trick file forward, a byte length of the trick file forward, a block address of the trick file reverse, a byte length of the trick file reverse, a frames number of the trick file, and a number of GOP of each trick files.

The GOP index includes 2024 disk blocks. The GOP index specifies, for each GOP, a frame number, a pointer to the MPEG-2 data for the GOP in the main file, and various flags and other attributes of the GOP. The flags indicate whether the GOP entry is valid and whether the GOP is open or closed. The other attributes of the GOP include the maximum bit rate, the average bit rate, the AAU size in bytes, the APU duration in seconds, the audio PES packet starting locations, the AAU starting locations, the AAU PTS values, and the decode time stamp (DTS) and the value of the program clock reference (PCR) extrapolated to the first frame of the GOP. The size of all the data preceding the main file is, for example, 1 megabyte.

There is one GOP index 406 for both the fast forward file 393 and the fast reverse file 394. The GOP index 406 of the trick files is different than the GOP index 405 of the main file. The GOP index 406 of the trick files contains, for each GOP, the byte offset in the trick file forward of the TS packet containing the first byte of the SEQ header, the frame number in the fast forward file of the GOP (the same value for the fast reverse file can be computed from this value for the fast forward file), the frame number in the original file of the first frame of the GOP, and the byte offset in the original file of the same frame (to resume after fast forward or reverse without reading the main GOP index).

Figure 26A:
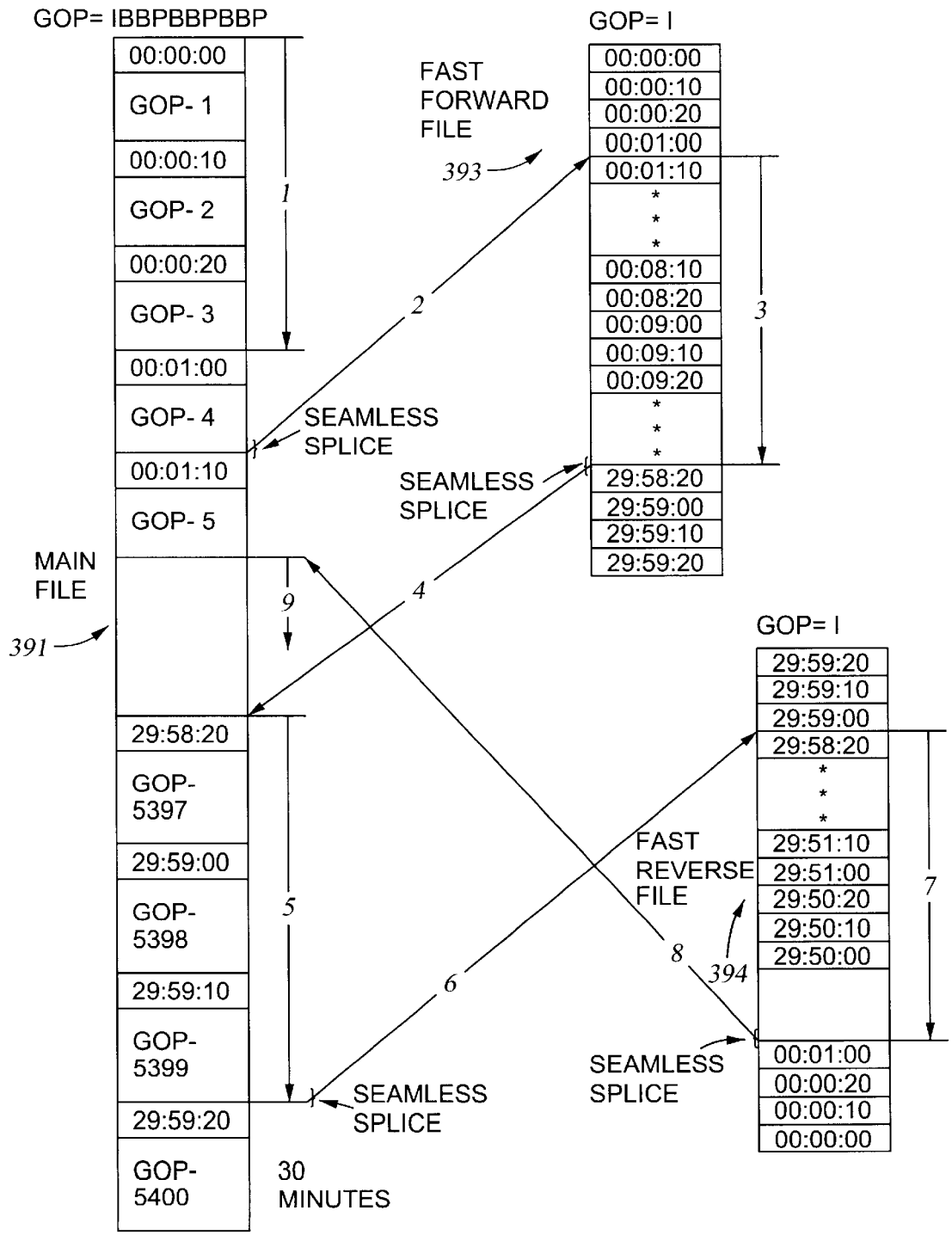
FIG. 26A is a diagram showing video file access during a sequence of video operations including transitions between the main file, the related fast forward file, and the related fast reverse file.

The GOP index 405 for the main file and the GOP index 406 for the fast forward and fast reverse trick files provides a means for rapidly switching between the normal video-on-demand play operation during the reading of the main file, and the fast-forward play during the reading of the fast-forward file, and the fast-reverse play during the reading of the fast reverse file. For example, FIG. 26A illustrates the read access to various GOPs in the main file, fast forward file, and fast reverse file, during a play sequence listed in FIG. 26B. Due to the presence of down-scaled I frames and possibly consequent freeze frames in the trick mode files, the video buffer verifier (VBV) model for a trick mode file is different than the VBV model of the main file. Consequently, the mean video decoder main buffer fullness levels can be significantly different for these files. For example, a transition from the main file to one of the trick files will usually involve a discontinuity in the mean video decoder main buffer fullness level, because only the I frames of the main file correspond to frames in the trick files, and the corresponding I frames have different bit rates when the trick mode I frames are scaled down for a reduced bit rate. An instantaneous transition from a trick file back to the main file may also involve a discontinuity especially when freeze frames are inserted between the I frames for trick mode operation. To avoid these discontinuities, the seamless splicing procedure of FIGS. 3 to 6 as described above is used during the transitions from regular play mode into trick mode and similarly from trick mode back into the regular play mode. Through the use of the seamless splicing procedure to modify the video stream content, for example for the "Seamless Splice" locations identified in FIG. 26A, the video decoder main buffer level will be managed so as to avoid both overflows and underflows leading to visual artifacts.

It is desired to copy in and out of the volume 390 with or without the meta-data 392 and the trick files 393, 394. This is useful to export and/or import complete files without regenerating the trick files. The file encoding type is now recognized as a part of the volume name. Therefore there can be multiple kinds of access to these files. The read and write operations are done by derivations of the class file system input/output (FSIO) which takes into account the proper block offset of the data to read or write. There is one derivation of FSIO per encoding type, providing three different access modes. EMGP3, MPEG2, and RAW. EMPEG2 accesses the whole volume from the beginning of the meta-data array, and in fact provides access to the entire volume except the i node 401, but no processing is done. MPEG2 access only the main part of the asset with MPEG processing, including file analyze and meta-data generation in a write access. RAW access only the main part of the asset without processing. These access modes are operative for read and write operations for various access functions as further shown in FIG. 27.

During a record operation, the video service allocates a volume and computes the number of block to allocate using the volume parameter giving the percentage to add for the trick files. Then, the size in blocks given to the stream server is the main part size only without the extension for the trick files. This avoids using the reserved part of the volume when the effective bit rate is higher than the requested bit rate. At the end of a record operation or a FTP copyin operation, the video service calls a procedure CMSPROC_GETATTR, and the stream server returns the actual number of bytes received and the actual number of blocks used by the main file plus the meta-data. The same values are returned for both MPEG2 and EMPEG2 files. The video service computes again the file extension to manage the trick files and adjust the number of allocated blocks.

Both trick files forward and reverse are generated by the same command. First, the trick file forward is generated by reading the main file. The trick file GOP index is built and kept in memory. During this generation, only the video packets are kept. PCR, PAT and PMT will be regenerated by the MUX in play as for any other streams. The audio packets are discarded. This ensures that there is enough stuffing packets for the PCR reinsertion. For this, a stuffing packet is inserted every 30 milliseconds.

Then using the GOP index, the trick file forward is read GOP by GOP in reverse order to generate the trick file reverse. The same GOPs are present in both files. The only modification done is an update of the video PTS, which must be continuous. Then, the GOP index is written on disk. This avoids reading again the file while generating the second trick file. The GOP index size is: 24 times the GOP number. In the worst case (the file is assumed not to be I frame only), there are 2 frames per GOP and 30 frames per second. So for 1 hour in fast forward, the GOP index size is: (24×3600× 30)/2=1296000 bytes. This will be the case for a 4 hour film played at 4 times the normal speed. Therefore, this GOP index can be kept in memory during the trick file generations without risk of memory overflow.

The read and write rate are controlled to conserve bandwidth on the cached disk array. The bandwidth reserved for these generations is a parameter given by the video service. It is a global bandwidth for both read and writes. The number of disk 1/0 per seconds is counted so as not to exceed this bandwidth.

The trick files header update is done once when both the fast forward and fast reverse trick files and the GOP index have been successfully written.

Playing a file is done with the CM_MpegPlayStream class. Fast forward (reverse) can only be requested when we are in the paused state. The current frame on which we are paused is known from the MpegPause class. This frame is located in the GOP index of the trick file. Then the clip start point and length are modified in the Clip instance with the trick file position computed from the beginning of the clip. So, the Clip class handle these trick files in a manner similar to the main file. The current logical block number is updated with the block address in the trick file recomputed from the beginning of the main clip. In fact, a seek is performed in the trick file as it was part of the main file, which is totally transparent for the ClipList and Clip classes. The transition from fast forward to pause is handled in a similar fashion. The clip start and length and the logical block number are again updated. The smooth transitions from pause to fast forward and from fast forward to pause are done in the same way as for regular play. There is a splicing from the pause stream to the play stream.

Figures 26B, 27, 28:
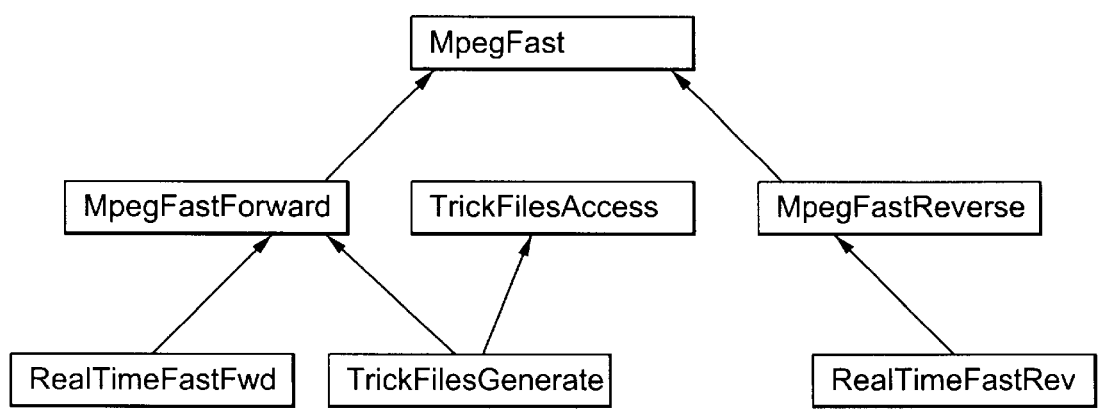
FIG. 26B shows a script of a video command sequence producing the sequence of video play shown in FIG. 26A.
FIG. 27 is a table of read and write access operations upon the volume of FIG. 24 and access modes that are used for the read and write access operations.
FIG. 28 is a hierarchy of video service classes associated with the fast forward file and the fast reverse file in the volume of FIG. 25.

The class hierarchy for trick file handling is shown in FIG. 28. The MpegFast, MpegFastForward and MpegFastReverse class handles the GOP generation from the initial file. This is the common procedure for building the GOP whatever the source and the destination. RealTimeFastFwd and RealTimeFastRev are the class instantiated when a real time fast forward (reverse) has to be done. They manage the real-time buffer flow to the player. There is a derivation of the methods takeBuffer and returnBuffer which uses the base class to build the GOP in the buffer to be played. The main file access is done using a buffer pool.

TrickFilesGenerate is the class instantiated to generate trick files forward and reverse. It inherits from TrickFileAccess the methods for reading the original file some buffers and for writing the trick file and its meta-data. It inherits from MpegFastForward the methods for building the GOP and for managing the advance in the file.

The computation of the next I frame to play is done by MpegFast, MpegFastForward and RealTimeFastFwd. When a trick file generation command is invoked, a thread is created and started and the generation itself is done off-line. A call-back is sent to the video service when the generation is completed. The class TrickFilesGenerate generates the trick file forward, and then, using the GOP index built in memory, the class TrickFiles Generate generates the trick file reverse.

When there is a transition from play to pause, the only latency issue is related to the buffer queue handled by the player and to the GOP size. The stream can build immediately the active pause GOP, and then this GOP will be sent at the end of the current GOP with a splicing between these two streams.

When there are transitions from pause to regular play or fast forward and fast reverse, a seek in the file is done. This means that the current buffer pool content is invalidated and the buffer pool is filled again. Play can start again while the buffer pool is not completely full, as soon as the first buffer is read. The buffer pool prefilling can continue as a background process. The issue here is that there is a risk to generate an extra load on the cached disk array as well as on the stream server side when the buffer pool is being prefilled.

To avoid too frequent transitions from play to fast forward and fast reverse, there is a limitation of the number of requests per second for each stream. This limitation is part of the management of the video access commands. A minimum delay between two commands is defined as a parameter. If the delay between a request and the previous one is too small, the request is delayed. If a new request is received during this delay, the new request replaces the waiting one. So the last received request is always executed.

The volume parameter (vsparams) file contains these new parameters for the trick mode files:

TrickFileExtensionSize:<percent>:
DefaultFastAcceleration:<acceleration>:
DMtrickFileGen:<mask of reserved DM> (This parameter is a mask of the stream servers that can be chosen to perform the trick file generation. The default value is 0xfffc: all of the stream servers.)
DMtrickFileGenBW:<bandwidth used for trick file generation>(This parameter is the value of the bandwidth effectively used by the stream server for the trick files generation.)

The video service routines are modified to operate upon the EMPG2 files, and in particular to compute the size of the EMPG2 files, to allocate the volume for the main file and the trick files, and to generate the trick files. The volume creation functions (VAPP) and volume access functions (RRP) use the EMPEG2 files in the same way as MPEG2 files. This means that a MPEG2 volume is created on the stream server. Both MPEG2 and EMPEG2 files can be used in the same session or play-list. The session encoding type is MPEG2. In record (or copy-in), the number of blocks allocated for an EMPEG2 file is computed using the percentage of size to add. At the end of record (or copy-in), the number of blocks is adjusted using the number of blocks returned by the stream server (by CMSPROC_GETATTR) and adding the percentage for trick files. The trick files validity and generation date are stored by the video service in the asset structure. The bandwidth allocated to the TrickFilesGenerate command is defined in the volume parameters (vsparams or vssiteparams). The selection of a stream server to generate the trick files takes into account this bandwidth only. If preferred stream servers are specified in vsparams (or vssiteparams), then the selected stream server will be one of these specified stream servers.

In a preferred implementation of the video service software, a new encoding type is created. The encoding type enum becomes:

```
enum encoding-t{
    ENC_UNKNOWN  = 0,   /* unknown format */
    ENC_RAW      = 1,   /* uninterpreted data */
    ENC_MPEG1    = 2,   /* constrained MPEG1 */
    EMC_MPEG     = 3,   /* generic MPEG */
    ENC_EMPEG2   = 4,   /* MPEG2 with trick files extension */
};
```

The encoding information accessible by VCMP_EXTENDEDINFO includes information about trick files:

```
struct trickFilesInfo_t{
    ulong_t       generationDate;  /* date/time of the generation of
        the trick files */
    rate_factor_t acceleration;    /* acceleration factor */
    ulong_t       framesNumber;    /* frames number in each trick
        file (FWD and REV) */
    ulong_t       gopNumber;       /* GOP number of each file */
};
struct EMPEG2info_t{
    MPEG2info_t       MPEG2info;
    trickFilesInfo_t  trickFiles<>;
};
union encodingInfo_3t switch (encoding-t enc){
    case ENC_MPEG:
        MPEG2info_t    MPEG2info;
    case ENC_EMPEG2:
        EMPEG2info_t   EMPEG2info;
    default:
        void;
};
```
The video service software includes a new procedure
(VCMP_TRICKFILESGEN) for trick file generation, which uses the
following structures:
```
struct VCMPtrickgenres_t{
    VCMPstatus_t  status;
    tHandle_t     handle;
};
struct VCMPtrickfilesargs_t{
    name_t   clipname;
    bool_t   overwriteIfExists;
```

-continued

```
    rate_factor_t  acceleration;
};
VCMPtrickgenres_t    VCMP_TRICKFILESGEN
    (VCMPtrickfilesargs_t) = 36,
```

If the trick files already exist and if the boolean overwriteIfExists is true, then the trick files are generated again, in the other case nothing is done. Acceleration is the acceleration as defined and used for the controlled speed play function. It is a percentage of the normal speed, it must be greater than 200 and smaller than 2000. The special value of 0 can be used to generate files with the default acceleration defined in vssiteparams. The procedure starts the generation process. The completion is notified by a callback.

The video service includes a new option to copyin and copyout. The option is added to allow a user to copy all the file or the main asset only. For compatibility with old client programs, the following new procedures are added:

```
VCMPcopyres_t  VCMP_FULL_COPYIN   (copyinargs2_t)   = 37,
VCMPcopyres_t  VCMP_FULL_COPYOUT  (copyoutargs2_t)  = 38,
```

These new procedures take the same interface as the existing one, but are used to copy-in the complete file: meta-data+Asset+trick files.

The video service includes a new procedure VCMP_TRICKFILESGENCOMPLETED, which uses the following structures:

```
struct VCMPtrickfilescomplete_t{
    tHandle_t     handle;
    VCMPstatus_t  status;
};
VCMPstatus_t TRICKFILESGENCOMPLETED
    (VCMPtrickfilescomplete_t) = 10,
```

The video service includes new procedures are added for handling trick mode generation arguments, which uses the following structures:

```
struct cms_trick_gen_args {
    Handle_t       Vshandle;
    name_t         name;
    bool_t         overwriteIfExists;
    rate_factor_t  acceleration;
    bandwidth_t    reservedBw;
};
cms_status    CMSPROC_GEN_TRICK_FILES (cms_trick_gen_args)       = 34,
struct trick_gen_completed_args {
    Handle_t      Vshandle;
    cms_status    status;
};
void CTLPROC_TRICKGENCOMPLETED (trick_gen_completed_args)        = 8,
```

The video service includes the following option to force the regeneration of trick files even if they exist:
   nms_content—gentrick <name> [<-f>] [acceleration]
   Without this option, an error code is returned if the trick files exist. "Acceleration" is an acceleration factor. If it is not present, the default value is taken in vsparams.
The video services include a encoding information access function (nms_content-m). This function produces a displayed output containing, for each trick file generated, the acceleration, the generation date and time, the frames number, and the GOP number.

For the use of an FTP copy function with the trick files, the following new commands are added:

nms_content—copyinfull <same arguments as—copyin>
nms_content—copyoutfull <same arguments as—copyout>

Figure 29:
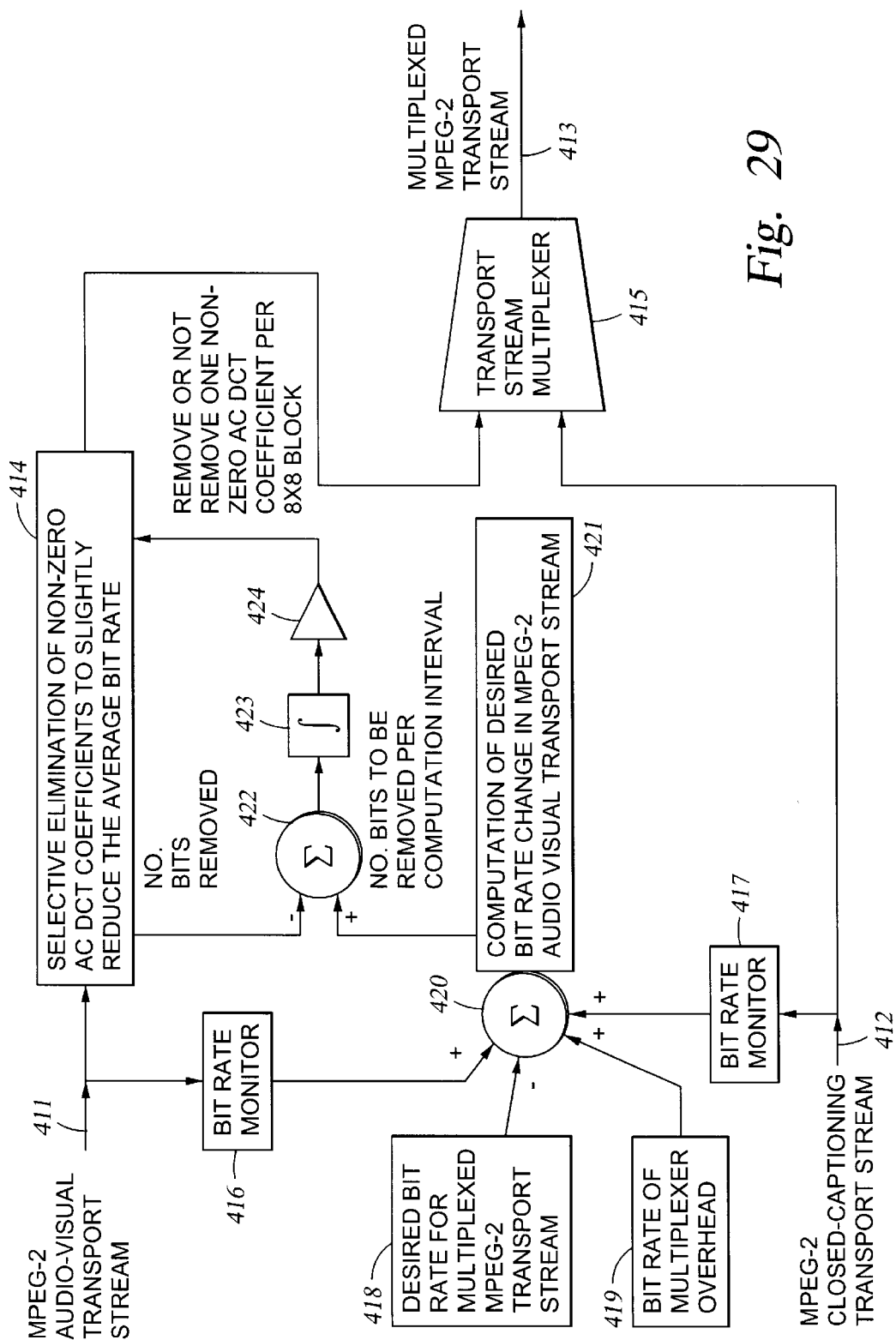
FIG. 29 shows a system for modifying and combining an MPEG-2 audio-visual transport stream with an MPEG-2 closed-captioning transport stream to produce a multiplexed MPEG-2 transport stream having the same bit rate as the original MPEG-2 audio-visual transport stream.

Another application of the SNR scaling of the invention is to reduce the bit rate of an MPEG-2 transport stream in order to allow combining multiple MPEG-2 transport streams to match a target bit rate for a multiple program transport stream. For example, FIG. 29 shows a system for combining an MPEG-2 audio-visual transport stream 411 with an MPEG-2 closed-captioning transport stream 412 to produce a multiplexed MPEG-2 transport stream 413. In this case, the closed captioning transport stream 412, containing alphanumeric characters and some control data instead of audio-visual information, has a very low bit rate compared to the audio-visual transport stream 411. Assuming that the target bit rate for the multiplexed transport stream 413 is the same as the bit rate of the audio-visual transport stream 411, there need be only a slight decrease in the bit rate of the audio-visual transport stream, and this slight decrease can be obtained by occasionally removing one non-zero AC DCT coefficient per 8×8 block. Therefore, in the system of FIG. 29, the audio-visual transport stream 411 is processed by a program module 414 for selective elimination of non-zero AC DCT coefficients to slightly reduce the average bit rate of this transport stream. A transport stream multiplexer 415 then combines the modified audio-visual transport stream with the closed captioning transport stream 412 to produce the multiplexed MPEG-2 transport stream 413.

In order to determine whether or not any non-zero AC DCT coefficient should be eliminated from a next 8×8 block in the audio-visual transport stream 411, a module 421 is executed periodically to compute a desired bit rate change in the audio-visual transport stream 411. For example, respective bit rate monitors 416, 417 may measure the actual bit rate of the audio-visual transport stream 411 and the closed captioning transport stream 412. Alternatively, if it is known precisely how these transport streams are generated, presumed values for the bit rates of these transport streams may be used in lieu of measured bit rates. The computation of the desired bit rate change also includes the desired bit rate 418 for the multiplexed MPEG-2 transport stream, and a bit rate 419 of multiplexer overhead, representing any net increase in bit rate related to the multiplexing of the audio-visual transport stream 411 with the closed captioning transport stream 412. An adder/subtractor 420 combines the various bit rate values from the inputs 416, 417, 418, and 419 to compute the desired bit rate change in the audio-visual transport stream 411. From the adder/subtractor 420, the module 421 converts the desired change in bit rate to a desired number of bits to be removed per computational cycle (e.g., per millisecond). This number of bits to be removed per computational cycle is received in an adder/subtractor 422, and the output of the adder/subtractor is received in an integrator 423. A limiter 424 takes the sign (positive or negative) of the integrated value to produce a flag indicating whether or not one non-zero AC DCT coefficient should be removed from the coefficients for the next 8×8 block, assuming that the next block has at least one non-zero AC DCT coefficient. (Alternatively, a non-zero AC DCT coefficient could be removed only if the 8×8 block has more than a predetermined fraction of the average number of AC DCT coefficients per 8×8 block.) The particular non-zero AC DCT coefficient to remove in each case can be selected using any of the methods discussed above with reference to FIGS. 14, 15, or FIG. 20. For example, the coefficient to remove could be the last non-zero AC DCT coefficient in the scan order. Alternatively, the non-zero AC DCT coefficient having the smallest magnitude could be removed so long as its removal does not cause an escape sequence.

When the module 414 removes a non-zero AC DCT coefficient from a 8×8 block, it sends the number of bits removed to the adder/subtractor 422. In a preferred implementation, the operations of the adder/subtractor 422, integrator 423, and limiter 424 are performed by a subroutine having a variable representing the integrated value. During each computational cycle, the variable is incremented by the number of bits to be removed per computational interval, and whenever the module 414 removes a non-zero AC DCT coefficient from a 8×8 block of the audio-visual transport stream, the variable is decremented by the number of bits removed.

Although the system in FIG. 29 has been described for achieving a slight reduction in bit rate of the MPEG-2 audio-visual transport stream 411 for combining multiple transport stream to produce a muliplexed MPEG-2 transport stream, it should be apparent that it could be used for obtaining relatively large reductions in bit rate. In this case, the module 414 would use the procedure of FIGS. 14, 15 or preferably FIG. 20, and a multi-level comparator 424 would be used instead of a single-level comparator 424. The multi-level comparator would determine a desired number of non-zero coefficients to discard per 8×8 block based on the value of the output of the integrator 423. The maximum number of non-zero AC coefficients to keep for each 8×8 block (i.e., the value of the parameter "k"), for example, would be determined by subtracting the number of non-zero AC DCT coefficients in the 8×8 block from the desired number to discard, and limiting this difference to no less than a predetermined fraction of the average number of non-zero AC coefficients per 8×8 block.

In view of the above, there have been described methods of efficient SNR scaling of video originally present in a high-quality and nonscalable MPEG-2 transport stream. To reduce bandwidth of non-scalable MPEG-2 coded video, certain non-zero AC DCT coefficients for the 8×8 blocks are removed from the MPEG-2 coded video. In one implementation, high-frequency AC DCT coefficients are removed at the end of the coefficient scan order. This method requires the least computation and is most desirable if the reduced-bandwidth MPEG-2 coded video is to be spatially sub-sampled. In another implementation, the smallest-magnitude AC DCT coefficients are removed. This method may produce an undesirable increase in the frequency of occurrence of escape sequences in the (run, level) coding. This frequency of escape sequences can be reduced by retaining certain non-zero AC DCT coefficients that are not the largest magnitude coefficients and would otherwise be removed, and by increasing the quantization scale factor to reduce the coefficient levels. The reduced-bandwidth MPEG-2 coded video can be used for a variety of applications, such as browsing for search and play-list generation, bit stream scaling for splicing, bit-rate adjustment via video quality alteration for services with limited resources, and bit rate control of multiplexed transport streams.

What is claimed is:

1. A method of scaling non-scalable MPEG-2 coded video to produce reduced-bandwidth, reduced-quality MPEG-2 coded video, the non-scalable MPEG-2 coded video including a set of non-zero AC discrete cosine transform (DCT) coefficients for 8×8 blocks of the non-scalable MPEG-2 coded video, said method including the step of removing non-zero AC DCT coefficients from the non-scalable MPEG-2 coded video so that there are no more than a selected number of non-zero AC DCT coefficients in the reduced-quality MPEG-2 coded video for each of the 8×8 blocks, which includes inspecting magnitudes of the non-zero AC DCT coefficients to sort at least some of the non-zero AC DCT coefficients in each 8×8 block in terms of magnitude for retaining up to the selected number of largest magnitude non-zero AC DCT coefficients for said each 8×8 block, and removing any additional non-zero AC DCT coefficients for said each 8×8 block.

2. The method as claimed in claim 1, wherein the method includes, for each 8×8 block having a number of non-zero AC DCT coefficients greater than the selected number, executing a selected one of a plurality of procedures for finding the selected number of largest magnitude non-zero AC DCT coefficients for the 8×8 block, the selected one of the plurality of procedures being selected based on the number of non-zero AC DCT coefficients that said each 8×8 block has in the non-scalable MPEG-2 coded video.

3. The method as claimed in claim 2, which includes comparing the selected number to the number of non-zero AC DCT coefficients for said each 8×8 block to select the selected one of the plurality of procedures.

4. The method as claimed in claim 3, wherein at least one of the procedures sorts at least the selected number of the non-zero AC DCT coefficients for the 8×8 block.

5. A method of scaling non-scalable MPEG-2 coded video to produce reduced-bandwidth, reduced-quality MPEG-2 coded video, the non-scalable MPEG-2 coded video including a set of non-zero AC discrete cosine transform (DCT) coefficients for 8×8 blocks of the non-scalable MPEG-2 coded video, said method including the step of removing non-zero AC DCT coefficients from the non-scalable MPEG-2 coded video so that there are no more than a selected number of non-zero AC DCT coefficients in the reduced-quality MPEG-2 coded video for each of the 8×8 blocks, which includes inspecting magnitudes of the non-zero AC DCT coefficients to order at least some of the non-zero AC DCT coefficients in each 8×8 block in terms of magnitude for retaining up to the selected number of the non-zero AC DCT coefficients for said each 8×8 block that differ in magnitude from up to the selected number of largest magnitude non-zero AC DCT coefficients for said each 8×8 block by no more than a certain limit.

6. The method as claimed in claim 5, wherein the ordering of at least some of the non-zero AC DCT coefficients in terms of magnitude includes classifying the non-zero AC DCT coefficients for each 8×8 block into groups having magnitudes that are substantially the same.

7. The method as claimed in claim 6, wherein the ordering of at least some of the non-zero AC DCT coefficients in each 8×8 block in terms of magnitude includes performing a hashing operation upon magnitudes of the non-zero AC DCT coefficients for said each 8×8 block.

8. The method as claimed in claim 6, which includes maintaining a list of the non-zero AC DCT coefficients for each group, the non-zero AC DCT coefficients in each list being ordered by a scan order of the AC DCT coefficients in the non-scalable MPEG-2 coded video, the non-zero AC DCT coefficients that are retained in the reduced-quality MPEG-2 coded video being read from the lists in the scan order.

9. A method of scaling non-scalable MPEG-2 coded video to produce reduced-bandwidth, reduced-quality MPEG-2 coded video, the non-scalable MPEG-2 coded video including a set of non-zero AC discrete cosine transform (DCT) coefficients for 8×8 blocks of the non-scalable MPEG-2 coded video, said method including the step of removing non-zero AC DCT coefficients from the non-scalable MPEG-2 coded video so that there are no more than a selected number of non-zero AC DCT coefficients in the reduced-quality MPEG-2 coded video for each of the 8×8 blocks, and which further includes selecting an initial set of the non-zero AC DCT coefficients to include in the reduced-quality MPEG-2 coded video, (run, level) coding the initial set of the non-zero AC DCT coefficients, and upon finding an escape sequence in the (run, level) coding of the initial set of the non-zero AC DCT coefficients, searching for a non-zero AC DCT coefficient of the non-scalable MPEG-2 coded video that is not in the initial set of the non-zero AC DCT coefficients and that would eliminate the escape sequence when included in the reduced-quality MPEG-2 coded video, and upon finding such a non-zero AC DCT coefficient of the non-scalable MPEG-2 coded video, including such a non-zero AC DCT coefficient in the reduced-quality MPEG-2 coded video.

10. The method as claimed in claim 9, wherein the initial set of the non-zero AC DCT coefficients includes, for each 8×8 block, up to a certain number of non-zero AC DCT coefficients that differ in magnitude from up to the certain number of largest magnitude non-zero AC DCT coefficients by no more than a certain limit.

11. The method as claimed in claim 10, wherein the initial set of the non-zero AC DCT coefficients includes, for each 8×8 block, up to the certain number of largest magnitude non-zero AC DCT coefficients.

12. The method as claimed in claim 9, which further includes increasing a quantization scale for the reduced-quality MPEG-2 coded video in order to reduce levels of the non-zero AC coefficients retained in the reduced-quality MPEG-2 coded video.

13. The method as claimed in claim 9, which includes adjusting a quantization scale for the reduced-quality MPEG-2 coded video in order to achieve a desired frequency of escape sequences in the reduced-quality MPEG-2 coded video.

14. The method as claimed in claim 13, which includes adjusting the selected number to obtain a desired average bit rate for the reduced-quality MPEG-2 coded video.

15. The method as claimed in claim 9, wherein the non-zero AC DCT coefficients are removed from the non-scalable MPEG-2 coded video in order to obtain a reduction in bit rate of a first MPEG2-transport stream containing the MPEG-2 coded video for combining the first MPEG-2 transport stream with at least a second MPEG-2 transport stream to produce a multiplexed transport stream having a desired bit rate.

16. A method of scaling non-scalable MPEG-2 coded video to produce reduced-bandwidth, reduced-quality MPEG-2 coded video, the non-scalable MPEG-2 coded video including a set of non-zero AC discrete cosine transform (DCT) coefficients for 8×8 blocks of the non-scalable MPEG-2 coded video, said method including the step of removing non-zero AC DCT coefficients from the non-scalable MPEG-2 coded video by selecting an initial set of the non-zero AC DCT coefficients to include in the reduced-quality MPEG-2 coded video, (run, level) coding the initial set of the non-zero AC DCT coefficients, and upon finding an escape sequence in the (run, level) coding of the initial set of the non-zero AC DCT coefficients, searching for a non-zero AC DCT coefficient of the non-scalable MPEG-2 coded video that is not in the initial set of the non-zero AC DCT coefficients and that would eliminate the escape sequence when included in the reduced-quality MPEG-2 coded video, and upon finding such a non-zero AC DCT coefficient of the non-scalable MPEG-2 coded video, including such a non-zero AC DCT coefficient in the reduced-quality MPEG-2 coded video.

17. The method as claimed in claim 16, wherein the initial set of the non-zero AC DCT coefficients includes, for each 8×8 block, up to a certain number of non-zero AC DCT coefficients that differ in magnitude from up to the certain number of largest magnitude non-zero AC DCT coefficients by no more than a certain limit.

18. The method as claimed in claim 17, wherein the initial set of the non-zero AC DCT coefficients includes, for each 8×8 block, up to the certain number of largest magnitude non-zero AC DCT coefficients.

19. The method as claimed in claim 16, which further includes increasing a quantization scale for the reduced-quality MPEG-2 coded video in order to reduce levels of the non-zero AC coefficients retained in the reduced-quality MPEG-2 coded video.

20. The method as claimed in claim 16, which includes adjusting a quantization scale for the reduced-quality MPEG-2 coded video in order to achieve a desired frequency of escape sequences in the reduced-quality MPEG-2 coded video.

21. The method as claimed in claim 20, which includes precluding each of the 8×8 blocks in the reduced-quality MPEG-2 coded video from having more than a selected number of non-zero AC DCT coefficients, wherein the selected number is adjusted to obtain a desired average bit rate for the reduced-quality MPEG-2 coded video.

* * * * *